US011968326B2

(12) United States Patent
Soundar

(10) Patent No.: US 11,968,326 B2
(45) Date of Patent: *Apr. 23, 2024

(54) SYSTEM AND METHOD IMPROVING INBOUND LEADS AND PHONE CALLS PROCESSING IN SALES AND MARKETING ENGAGEMENT

(71) Applicant: Micro Macro Assets LLC, Salem, NH (US)

(72) Inventor: Senraj Soundar, Salem, NH (US)

(73) Assignee: Micro Macro Assets, LLC, Salem, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/148,115

(22) Filed: Dec. 29, 2022

(65) Prior Publication Data

US 2023/0141679 A1    May 11, 2023

Related U.S. Application Data

(63) Continuation of application No. 17/194,499, filed on Mar. 8, 2021, now Pat. No. 11,575,786, which is a
(Continued)

(51) Int. Cl.
*H04M 3/42* (2006.01)
*H04M 3/00* (2006.01)
(Continued)

(52) U.S. Cl.
CPC .......... *H04M 3/51* (2013.01); *H04M 3/5158* (2013.01); *H04M 3/5183* (2013.01);
(Continued)

(58) Field of Classification Search
CPC ... H04M 3/5158; H04M 3/5183; H04M 3/523
(Continued)

(56) References Cited

U.S. PATENT DOCUMENTS 5,343,518 A    8/1994 Kneipp
5,822,400 A    10/1998 Smith
(Continued)

FOREIGN PATENT DOCUMENTS

JP    H11215528    8/1999
JP    2003333191    11/2003
(Continued)

OTHER PUBLICATIONS

PCT Search Report and Written Opinion for PCT Application No. PCT/US2015/42152, dated Oct. 23, 2015, 9 pages.
(Continued)

*Primary Examiner* — Thjuan K Addy
(74) *Attorney, Agent, or Firm* — Sheehan Phinney Bass & Green PA

(57) ABSTRACT

A system establishes an agent communication with a customer. An agent computer with a first processor and a first memory receives a batch notification identifying a batch of one or more customer records in the agent computer, for communication in the near future. The one or more customer records is associated with one or more customers. A second computer with a second processor and a second memory provides the batch notification identifying the batch of one or more customer records in the agent computer. The system connects the agent with the customer associated with a customer record selected from the batch by the agent.

20 Claims, 30 Drawing Sheets

Related U.S. Application Data continuation of application No. 16/893,980, filed on Jun. 5, 2020, now Pat. No. 10,979,566, which is a continuation of application No. 16/363,111, filed on Mar. 25, 2019, now Pat. No. 10,715,661, which is a continuation of application No. 15/973,871, filed on May 8, 2018, now Pat. No. 10,284,721, which is a continuation of application No. 15/584,769, filed on May 2, 2017, now Pat. No. 9,979,820, which is a continuation of application No. 14/809,213, filed on Jul. 25, 2015, now Pat. No. 9,674,364, which is a continuation-in-part of application No. 14/565,948, filed on Dec. 10, 2014, now Pat. No. 9,237,233, which is a continuation of application No. 14/204,505, filed on Mar. 11, 2014, now Pat. No. 8,938,058, which is a continuation-in-part of application No. 14/057,758, filed on Oct. 18, 2013, now Pat. No. 8,964,963, which is a continuation of application No. 13/278,764, filed on Oct. 21, 2011, now Pat. No. 8,594,308.

(60) Provisional application No. 61/776,351, filed on Mar. 11, 2013, provisional application No. 61/405,587, filed on Oct. 21, 2010.

(51) Int. Cl.
  *H04M 3/51* (2006.01)
  *H04M 3/523* (2006.01)
  *H04M 3/54* (2006.01)
  *H04M 3/58* (2006.01)

(52) U.S. Cl.
  CPC ......... *H04M 3/5191* (2013.01); *H04M 3/523* (2013.01); *H04M 3/5235* (2013.01); *H04M 3/54* (2013.01); *H04M 3/58* (2013.01); *H04M 2201/14* (2013.01); *H04M 2201/36* (2013.01); *H04M 2201/38* (2013.01); *H04M 2203/357* (2013.01); *H04M 2203/404* (2013.01)

(58) Field of Classification Search
  USPC .............. 379/265.12, 265.13, 265.1, 211.02, 379/212.01, 264, 265.05, 266.07, 201.01, 379/242; 370/352
  See application file for complete search history.

(56) References Cited

U.S. PATENT DOCUMENTS

| | | | |
|---|---|---|---|
| 6,141,412 A | 10/2000 | Smith et al. | |
| 6,167,266 A | 12/2000 | Havinis | |
| 6,345,094 B1 | 2/2002 | Khan | |
| 6,721,778 B1 | 4/2004 | Smith | |
| 6,751,310 B1 | 6/2004 | Crossley | |
| 6,879,960 B2 | 4/2005 | Nascenzi et al. | |
| 7,068,642 B1 | 6/2006 | Khan | |
| 7,092,509 B1 | 8/2006 | Mears | |
| 7,149,288 B2 | 12/2006 | Digate et al. | |
| 7,793,141 B1 | 9/2010 | Miller | |
| 7,873,156 B1 | 1/2011 | Blair | |
| 7,873,157 B1 | 1/2011 | Sim | |
| 8,103,531 B2 * | 1/2012 | Wollan | G06Q 10/063 705/7.11 |
| 8,284,920 B2 | 10/2012 | Shaffer | |
| 8,576,835 B2 | 11/2013 | Acharya | |
| 8,594,308 B2 | 11/2013 | Soundar | |
| 8,831,205 B1 | 9/2014 | Wu et al. | |
| 8,938,058 B2 | 1/2015 | Soundar | |
| 8,964,963 B2 | 2/2015 | Soundar | |
| 8,971,519 B1 | 3/2015 | Hoffberg | |
| 9,087,129 B2 | 7/2015 | Messina | |
| 9,195,966 B2 | 11/2015 | Vance | |
| 9,886,487 B2 | 2/2018 | Vance | |
| 2004/0002958 A1 | 1/2004 | Seshadri | |
| 2004/0002988 A1 | 1/2004 | Seshadri | |
| 2004/0098480 A1 | 5/2004 | Sekizawa | |
| 2004/0179672 A1 | 9/2004 | Pagel | |
| 2005/0002515 A1 | 1/2005 | Mewhinney et al. | |
| 2006/0203994 A1 | 9/2006 | Shaffer | |
| 2007/0121859 A1 | 5/2007 | Smelyansky | |
| 2007/0121902 A1 | 5/2007 | Stoica | |
| 2007/0156656 A1 | 7/2007 | Pather | |
| 2007/0286389 A1 | 12/2007 | Hyerle | |
| 2008/0301021 A1 | 12/2008 | Sang | |
| 2010/0303225 A1 | 12/2010 | Shaskov | |
| 2011/0034156 A1 | 2/2011 | Gatti | |
| 2011/0072367 A1 | 3/2011 | Bauer | |
| 2011/0103572 A1 | 5/2011 | Blair | |
| 2011/0116618 A1 | 5/2011 | Zyarko | |
| 2011/0286592 A1 | 11/2011 | Nimmagadda | |
| 2012/0099720 A1 | 4/2012 | Soundar | |
| 2014/0012626 A1 | 1/2014 | Ajmera et al. | |
| 2014/0044253 A1 | 2/2014 | Soundar | |
| 2014/0247933 A1 | 9/2014 | Soundar | |
| 2015/0086002 A1 | 3/2015 | Jain | |
| 2015/0104000 A1 | 4/2015 | Soundar | |
| 2015/0124953 A1 | 5/2015 | Soundar | |

FOREIGN PATENT DOCUMENTS

| | | |
|---|---|---|
| JP | 2010050937 | 3/2010 |
| JP | 2010141804 | 6/2010 |

OTHER PUBLICATIONS

International Search Report and Written Opinion for PCT/US14/23417, dated Jul. 14, 2014.

* cited by examiner

Lead Characteristics Criteria — 560

| Area Code | ⌄ | Equals | ⌄ | 978 | ⌄ | + X |
| State | ⌄ | Equals | ⌄ | MA | ⌄ | + X |
| Lead Status | ⌄ | Equals | ⌄ | New | ⌄ | + X |
| Lead Source | ⌄ | Equals | ⌄ | Tradeshow | ⌄ | + X |

562
564

MTMC Selected for the Lead with above Criteria

566

Select the name of the MTMC to be updated : | Welcome Multi-Touch Campaign ⌄ |

SAVE    CANCEL

FIG. 11

| S.No | Account Name | Contact Name | Phone | Title | Action |
|---|---|---|---|---|---|
| IC | Comford Inn | Brianna Stanford | (317) 636-2478 | VP of Operations | End the Call |
| IC | Best Western Inn | Don Edwards | (317) 586-2135 | Technical Operations | Answer the Call |
| IC | Clarion Inn | Brian Thompson | (317) 245-5421 | Operations Manager | Answer the Call |
| N | Hampton Inn | John Smith | (317) 636-0551 | Supplies Manager | Start Connection Attempt |
| N | Embassy Suites | Susan Brown | (317) 858-2456 | Supplies Manager | Start Connection Attempt |
| N | Holiday Inn | Martina Davis | (317) 624-5896 | Operations Manager | Start Connection Attempt |
| 1 | Steak N Shake Operations Inc | Adam Marshalls | (317) 636-0234 | VP. Of Operations | |
| 2 | Fairfield Inn 7 Suites | Bill Britts | (317) 636-6723 | Chief Financial Officer | |
| 3 | Red Roof Inn | Christina Parker | (317) 677-0584 | IT Manager | |
| 4 | The Dollar Inn | David Miller | (317) 631-5590 | Chief Financial Officer | |
| 5 | Homewood Suites | Paul Anderson | (317) 297-0079 | Technical Operations | |
| 6 | Canterbury Hotel | George Simon | (317) 631-6974 | Operation Manager | |
| 7 | Melody Inn | Henry Ford | (317) 275-6000 | VP of Operations | |
| 8 | JW Marriott Indianapolis | Richard Hall | (317) 872-9790 | Strategy Manager | |
| 9 | Quality Inn | Fran Jones | (888) 345-1904 | Management Advisor | |
| 10 | Hilton Hotel | Elizabeth Parker | (317) 923-4707 | Manager of Operations | |

IC – Denotes a customer record associated with an incoming phone call (waiting in a queue)

N – Denotes a customer record associated with a new customer

SYSTEM AND METHOD IMPROVING INBOUND LEADS AND PHONE CALLS PROCESSING IN SALES AND MARKETING ENGAGEMENT

CROSS-REFERENCE TO RELATED APPLICATIONS

This application is a continuation of co-pending application Ser. No. 17/194,499, filed Mar. 8, 2021 and entitled "Optimizing Next Step Action to increase Overall Outcome in Sales and Marketing Engagement," which is a continuation of application Ser. No. 16/893,980 (Issued as U.S. Pat. No. 10,979,566), filed Jun. 5, 2020 and entitled "Optimizing Next Step Action based on Agent Availability for Effective Sales and Marketing Engagement," which is a continuation of application Ser. No. 16/363,111 (Issued as U.S. Pat. No. 10,715,661), filed Mar. 25, 2019 and entitled "System and Method for Scalable and Efficient Multi-Channel Communication," which is a continuation of application Ser. No. 15/973,871 (Issued as U.S. Pat. No. 10,284,721), filed May 8, 2018 and entitled "Repetition of Communication Attempts based on Communication Outcome for Effective Sales and Marketing Engagement," which is a continuation of application Ser. No. 15/584,769 (Issued as U.S. Pat. No. 9,979,820) filed May 2, 2017 and entitled "Predictive Resource Scheduling for Efficient Sales and Marketing Acceleration," which is a continuation of application Ser. No. 14/809,213 (issued as U.S. Pat. No. 9,674,364), filed Jul. 25, 2015 and entitled "COMPREHENSIVE SYSTEM AND METHOD FOR PROVIDING SALES AND MARKETING ACCELERATION AND EFFECTIVENESS." application Ser. No. 14/809,213 claims the benefit of U.S. Provisional Patent Application Ser. No. 62/029,154, filed Jul. 25, 2014, entitled "COMPREHENSIVE SYSTEM AND METHOD FOR PROVIDING SALES AND MARKETING ACCELERATION AND EFFECTIVENESS," both of which are incorporated by reference herein in their entirety. Application Ser. No. 14/809,213 is also a continuation-in-part of patent application Ser. No. 14/565,948 entitled "SYSTEM AND METHOD FOR PROVIDING SALES AND MARKETING ACCELERATION AND EFFECTIVENESS," filed Dec. 10, 2014, (issued as U.S. Pat. No. 9,237,233), which is a continuation of U.S. patent application Ser. No. 14/204,505 entitled "SYSTEM AND METHOD FOR PROVIDING SALES AND MARKETING ACCELERATION AND EFFECTIVENESS," filed on Mar. 11, 2014 (issued as U.S. Pat. No. 8,938,058), which claims the benefit of U.S. Provisional Patent Application Ser. No. 61/776,351, entitled "SYSTEM AND METHOD FOR SALES AND MARKETING DIAGNOSIS AND EFFECTIVENESS," filed Mar. 11, 2013, and which is a continuation-in-part of patent application Ser. No. 14/057,758, entitled "SYSTEM AND METHOD FOR MAXIMIZING EFFICIENCY OF CALL TRANSFER SPEED," filed Oct. 18, 2013 (issued as U.S. Pat. No. 8,964,963), which is a continuation of U.S. patent application Ser. No. 13/278,764, entitled "SYSTEM AND METHOD FOR MAXIMIZING EFFICIENCY OF CALL TRANSFER SPEED," filed Oct. 21, 2011, (issued as U.S. Pat. No. 8,594,308) which claims the benefit of U.S. Provisional Application No. 61/405,587, entitled "SYSTEM AND METHOD FOR MAXIMIZING EFFICIENT CALL TRANSFER SPEED," filed Oct. 21, 2010, each of which is hereby incorporated by reference in its entirety. It should be noted that a term that is not defined in this document may be defined in the U.S. patent application Ser. No. 14/204,505.

FIELD OF THE INVENTION

The present invention is generally related to call centers, sales and marketing, and more particularly, is related to efficient handling of communication with leads and customers.

BACKGROUND OF THE INVENTION

The prior systems and methods may not provide information associated with a customer to a texting rep prior to transferring a text-based connectivity from being between a texting agent and the customer to being between the texting rep and the customer. However, to allow the texting rep to be prepared in anticipation of the transfer of the text based connectivity with the customer, it is beneficial for the texting rep to access information regarding the customer before such transfer.

The prior systems and methods do not provide an effective solution to optimize contact plans, plan for an agent's availability, and plan for a system resource's availability based on agent availability data, system resource availability data, and volume of leads to be contacted. Further, a lead may require more than one follow up/touch and such more than one touch may not be effectively planned or executed by a contact plan taught by the prior art.

Further, it is desirable to have a system and method that enables compliance to the Telephone Consumer Protection Act (TCPA) rules, and/or automates the tracking of behavior of a user and taking corrective action if necessary. Accuracy of various computer learning methods may need to be evaluated on an on-going basis with new training data set(s), as they become available, to select the optimal computer learning method that may yield optimal prediction. Hence, it is desirable to have a system and method to keep track of how each computer learning method is performing as new training data sets become available and select an optimal computer learning method that may yield optimal prediction.

It is desirable to have a system and method that overcomes one or more of the foregoing limitations. More than one unfulfilled needs and associated shortcomings of the prior art are introduced in relevant contexts under the detailed description. Therefore, there is a need in the industry to address one or more of the abovementioned shortcomings.

SUMMARY OF THE INVENTION

Embodiments of the present invention provide efficient processing of inbound leads and phone calls to increase overall outcome in a sales and marketing. Briefly described, the present invention is directed to a system and method for establishing an agent communication with a customer. An agent computer with a first processor and a first memory receives a batch notification identifying a batch of one or more customer records in the agent computer for communication in the near future. The one or more customer records is associated with one or more customers. A second computer with a second processor and a second memory provides the batch notification identifying the batch of one or more customer records in the agent computer. The system connects the agent with the customer associated with a customer record selected from the batch by the agent.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principals of the invention.

It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. In addition, it may be the case that a function may be skipped.

FIG. 11 is an exemplary screen view illustrating an interface to specify criteria associated with lead characteristics to assign a lead to a MTMC, in accordance with an embodiment of a DCA.

FIG. 21 is an exemplary screen view illustrating an interface showing customer records associated with incoming calls waiting in one or more queues, in accordance with an embodiment of system 70 (FIG. 1) that processes incoming calls and have queue visibility functionality.

FIG. 26 is an exemplary screen view illustrating an interface showing a second step when a Purchaser purchases a Product, in accordance with an embodiment of the Ecommerce Functionality.

FIG. 27 is an exemplary screen view illustrating an interface showing a third step when a Purchaser purchases a Product, in accordance with an embodiment of the Ecommerce Functionality.

DETAILED DESCRIPTION

One having ordinary skill in the art would understand and appreciate that the concepts, methods, and systems described in the U.S. patent application Ser. No. 13/278,764, U.S. patent application Ser. No. 14/204,505, and this document are applicable to many different fields, including but not limited to, call center, sales, recruiting, telemarketing, customer relationship management (CRM), phone surveys, census information gathering, political campaigns, fund raising, and the like. Though the many embodiments and variety of examples are provided herein referencing sales process/selling/sales reps, the system and method described in this document may be applicable to other situations such as customer support, recruiting, business to business communication, business to consumer communication, and the like, and accordingly the application of the system and method should not be limited to sales process/selling/sales reps.

One having ordinary skill in the art would understand and appreciate that based on implementation preferences, in the Dialing Agent Module (defined in the U.S. patent application Ser. No. 14/204,505) the order of phone connectivity established with the customer and talker may be reversed or performed concurrently. That is, the Dialing Agent Module may establish a phone connectivity with the talker and then proceed to dial the phone number of the customer (and bridge such customer phone call with the phone connectivity with the talker), or dial the phone number of the customer and then establish phone connectivity with the talker (and bridge the talker phone connectivity with the customer phone call), or concurrently dial the phone number of the customer and establish phone connectivity with the talker (and bridge the customer phone call with the phone connectivity with the talker).

While much of the description in this specification generally refers to voice communication, embodiments of the present invention are not limited to voice communications.

While the following describes the present system and method in detail it is beneficial to provide certain definitions.

Figure 1:
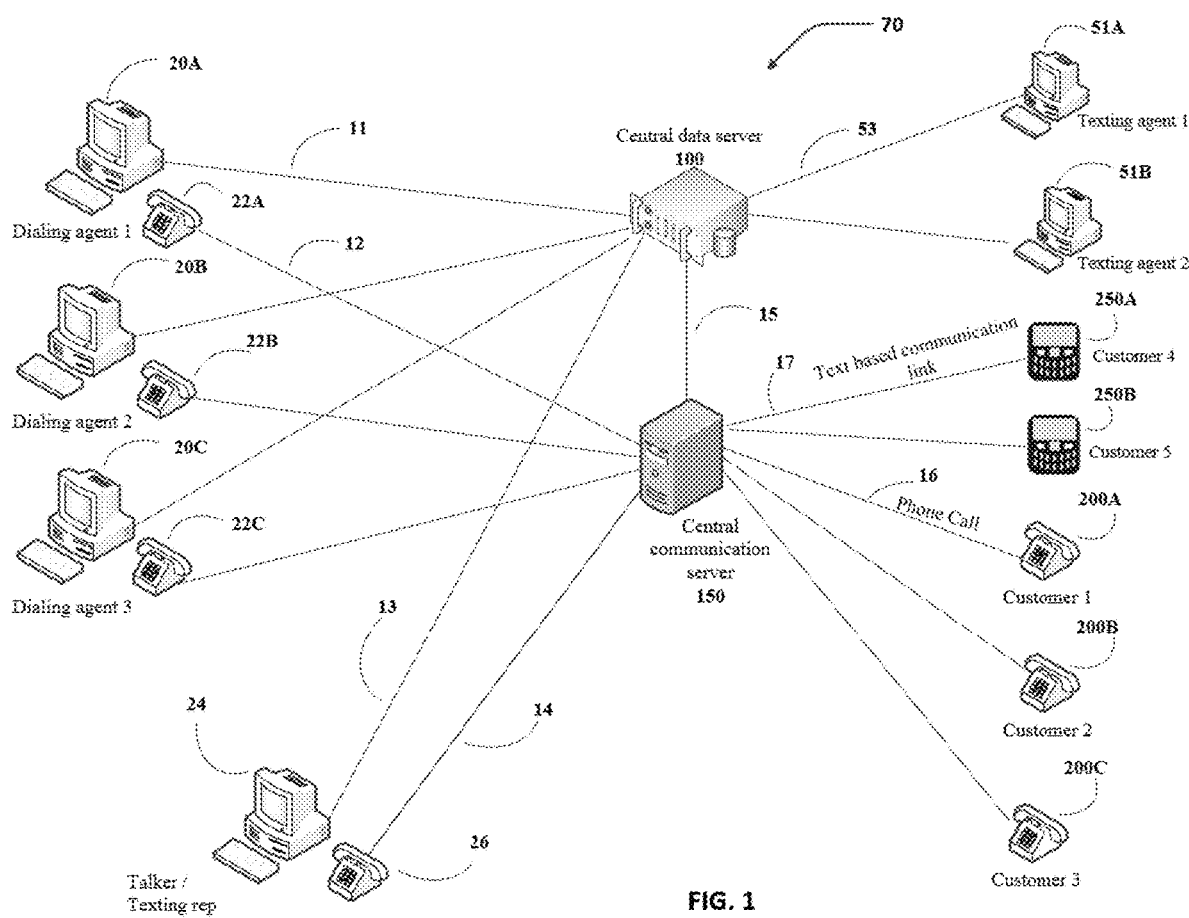
FIG. 1 is a schematic diagram illustrating a system wherein phone call based communication and text based communication are allowed, that is a variation of the system illustrated in FIG. 1 disclosed in the U.S. patent application Ser. No. 13/278,764.

Based on the context, the word "user" refers to a talker, dialing agent, texting rep, texting agent, Call Handler (disclosed in the U.S. patent application Ser. No. 14/204,505), Third Party Call Participant (disclosed in the U.S. patent application Ser. No. 14/204,505) or another user of the System 70 (FIG. 1). For easier writing and understanding, the description may refer to a singular actor or module in the system, as in "a talker," "a dialing agent," "a texting rep," "a texting agent," or "a user." However, one having ordinary skill in the art would appreciate that based on the context such reference may not be limited to singular actor/module and instead it may refer to plurality of actors/modules. It should be noted that the word "actor" refers to a person acting in a role and performing the function(s) associated with the role in the system.

Based on the context, a reference to the term "customer" may mean to include "lead" also.

The term "dialing agent" refers to a person who is the first person that handles a call made to a customer and navigates the call (through phone voice menus, phone operators, voicemails, wrong phone numbers, and the like) until the call reaches the correct target customer on the customer list, while the system may dial the telephone number of the customer and establishes connection between the person's phone and customer in the customer list, where the person transfers a live customer call to a talker, via a central communication server.

The term "talker" refers to a person who accepts a transferred telephone call and speaks to a customer after the transfer of the telephone call.

The term "texting agent" refers to a person who is the first person that handles a text based connectivity with a customer and after certain criteria is met, transfers the connectivity from being between the person and the customer to being between a texting rep and the customer.

The term "texting rep" refers to a person who accepts a transferred text based connectivity with a customer and proceeds to communicate via text with the customer.

The term "connect" refers to connection established between a person using a system (referenced in the context) and a customer, using a communication mode (referenced in the context). For example, in the context of phone call based communication, the term connect refers to a telephone call established between a person using the system and a live customer; in the context of text based communication, the term "connect" refers to a text message based connectivity wherein the customer and a texting agent (or a texting rep) are engaged in communication via text message communication or responding to each other's one or more text messages in a reasonable response time customary in text message based communication (such response time may be customized to qualify as a reasonable response time), which may or may not be in real time.

The term "agent" refers to a person involved in communication (via one or more phone call based or non-phone call based communication modes) with a customer or lead. For example, the term "agent" may refer to a talker, dialing agent, texting rep, texting agent, Call Handler, Third Party Call Participant, or another user of a system, based on the context. An agent or a user in the system may act in a role or act as another user and perform the function(s) associated with the role/another user in the system. If a function of a user is automated in the system, the user may not be a person and instead the function of the user may be automated, for example, in the case of a user acting as an agent, such agent may not be a person and instead the agent may be automated (for example, by a computerized voice/menu system, texting system, or the like).

The term "agent computer" refers to a computer used by the agent.

The term "agent data" refers to one or more attributes/characteristics associated with an agent, including but not limited to personal characteristics. Based on the context, the term "agent data" may refer to such data associated with plurality of agents.

The term "agent availability data" refers to one or more attributes/characteristics associated with time availability of an agent (to perform a function referenced in the context). Based on the context, the term "agent availability data" may refer the said data associated with plurality of agents.

The term "lead" refers to a prospect, customer, past customer, contact person, contact person enquiring about certain information, contact person with a potential opportunity, and the like, based on the context.

The term "lead data" refers to one or more records (each such record is referred to herein as the "lead record") associated with a lead, wherein each such lead record may have one or more attributes. For example, a lead data may be comprised of one or more attributes including but is not limited to, name, physical address, one or more phone numbers (landline, mobile phone, and the like), do-not-call, do not call until, fax number, email address, email opt out, instant messaging address, one or more social media handles/addresses, business name, title, interest, available timings, preferred communication mode(s), preferred time(s) for contacting via one or more communication modes, information submitted by the person associated with the lead via web form or other methods, and the like. Minimum amount of data associated with a lead that allows a user to communicate with the lead via one or more communication modes, is referred to herein as the "minimum lead data." If enough data is not available as part of a lead data for the purpose including, but not limited to, communicating with the lead via one or more communication modes, conducting the necessary data analysis to learn one or more correlations among different attributes of the lead data, and the like, additional data associated with the lead (or business associated with the lead) may be retrieved/gathered from various sources and added/appended to the lead data, and in such case the term "lead data" refers to lead data including the additional data. It should be noted that such additional data may include, but is not limited to, information about one or more technologies (such as technology vendor name, technology product details, how many users using such product, and the like) installed or used by the lead or the business associated with the lead, intent of the lead or the users of the business associated with the lead to purchase specific product or service, and the like. Based on the context, the term "lead data" may refer the said data associated with plurality of leads.

A dialing session, texting session, or a session to execute one or more connection attempts via one or more modes of communication is referred to herein as the "communication session."

The terms "communication," "contact," "connection," and "touch" are used interchangeably to refer to the communication (via one or more phone call based or non-phone call based communication modes) with a customer or lead. For example, in a phone call based communication mode, the term communication/contact/connection/touch refers to a telephone call with a customer or lead. In the context of a marketing activity, the term "communication," "contact," "connection," and/or "touch" may refer to a marketing activity that involves communication with a customer or lead. The term "touch" as used in a context, for example, "third touch in welcome multi-touch marketing campaign" refers to the third touch associated with the welcome multi-touch marketing campaign (not associating with any particular lead), however, the term "touch" as used in a context, for example, "third touch for the lead with a lead identifier 73813 in the welcome multi-touch marketing campaign" refers to the third touch in welcome multi-touch marketing campaign planned/executed for the lead with lead identifier 73813.

The terms "communication attempt," "contact attempt," "connection attempt," and "touch attempt" may be used interchangeably to refer the attempt made to establish communication with a customer or lead.

The term "communication mode" or "contact mode" or "connection mode" or "touch mode" refers to the mode or way or channel or method of communication. Examples of a communication mode include, but are not limited to, a phone call, leaving a voice message, communication using automated phone technology such as an interactive voice response (IVR) system, sending an email, sending a text message, chat, instant message, video, short message service (SMS), multimedia messaging service (MMS), or communicating via any other voice or data (non-voice) based communication mode available now or in the future.

The terms "communication attempt execution time" or "contact attempt execution time" or "connection attempt execution time" or "touch attempt execution time" may be used interchangeably to refer the time when the attempt is made to communicate with a customer or lead.

The terms "communication attempt data," "contact attempt data," "connection attempt data," and "touch attempt data" may be used interchangeably to refer to one or more attributes associated with a connection attempt. Based on the context, the term "connection attempt data" may refer the said data associated with plurality of connection attempts.

The terms "communication outcome," "contact outcome," "connection outcome," and "touch outcome" may be used interchangeably to refer the outcome of the attempt made to establish communication with a customer or lead.

The terms "communication attempt outcome data," "contact attempt outcome data," "connection attempt outcome data," "touch attempt outcome data," and "touch outcome data" may be used interchangeably to refer to one or more attributes associated with outcome of a connection attempt. Based on the context, the term "connection attempt outcome data" may refer the data associated with the outcome of plurality of connection attempts.

The term "agent based touch" refers to a touch that requires an agent during the touch execution.

The term "non agent based touch" refers to a touch that may not require an agent during the touch execution.

The term "system resource" refers to a system resource that is required for communication with a customer, which may include, but not limited to, computer system, phone system, network bandwidth, and the like.

The term "system resource data" refers to one or more attributes/characteristics associated with a system resource. Based on the context, the term "system resource data" may refer such data associated with plurality of system resources.

The term "system resource availability data" refers to one or more attributes/characteristics associated with time availability of a system resource (to perform a function referenced in the context). Based on the context, the term "system resource availability data" may refer the said data associated with plurality of system resources.

The term "multi-touch marketing campaign" or "MTMC" refers to a plan that enables planning and execution of one or more touch/contact/communication with a lead.

The term "communication assistance module" refers to a module that partially or fully automates communication attempt associated with a customer that gets transferred, wherein the communication assistance module partially of fully automates the communication attempt associated with the customer until the communication with the customer meets a specific criteria, and wherein upon the specific criteria is met the customer gets transferred. For example, the communication assistance module may partially or fully automate the function of a dialing agent (in the case of phone call based communication) or a texting agent (in the case of text based communication).

The term "prioritization information" refers to information that may be used to determine the priority or the order of a customer record for contacting via one or more communication modes, wherein the prioritization information may be located in one or more fields associated with the customer record. The term "user update fields" refers to one or more fields associated with a customer record that an agent may be allowed to update.

The term "when-to-call field" refers to one or more fields associated with a customer that specifies whether to contact a customer associated with the customer record during a specific time period or not to contact during the specific time period, via one or more communication modes.

The term "third party communication participant" refers to a person that participates in the communication between an agent and a customer. For example, in the case of phone call based communication, the third party communication participant may participate in the phone call between an agent and a customer.

As used in this document, the term "optimal" refers to an expected/predicted optimal outcome/result, and such outcome/result may or may not be optimal in actuality. For example, the term "optimal" as in " . . . the order of the leads for executing connection attempts may be predicted to yield optimal connection attempt outcomes" refers to the predicted order to yield optimal connection attempt outcomes (for a given circumstance based on the data availability and computer learning method utilized), however, in actuality the predicted order may or may not be yielding optimal connection attempt outcomes. For another example, the term "optimal" as in the context " . . . predicting . . . optimal time period to schedule one or more communication sessions for a given list of leads" refers to predicting the time period to execute communication sessions that may yield optimal connection attempt outcomes (for a given circumstance based on the data availability and computer learning method utilized), however, in actuality such time period may or may not be yielding optimal connection attempt outcomes. For yet another example, the term "optimal" as in " . . . computer learning method that predicts the output with optimal accuracy" refers to a computer learning method to predict the output with optimal accuracy (for a given circumstance based on the data availability and computer learning method utilized), however, in actuality such predicted output may or may not be optimal.

FIG. 1 is a schematic diagram illustrating a system 70 which is a variation of system 10 (FIG. 1) disclosed in the U.S. patent application Ser. No. 13/278,764, wherein the system 70 utilizes phone call based communication and text based communication, and wherein one or more dialing agents/texting agents assist the talker/texting rep to communicate with one or more customers via phone call or text based communication.

Referring to FIG. 1, the system 70 includes dialing agent computers 20A, 20B, 20C having dialing agent software stored therein, dialing agent telephones 22A, 22B, 22C, texting agent computers 51A, 51B, a talker/texting rep computer 24 having talker/texting rep software stored therein, a talker telephone 26, a central data server 100, a central communication server 150, customer telephones 200A, 200B, 200C to handle phone calls, and customer communication devices 250A, 250B to handle text based communication.

Figure 2:
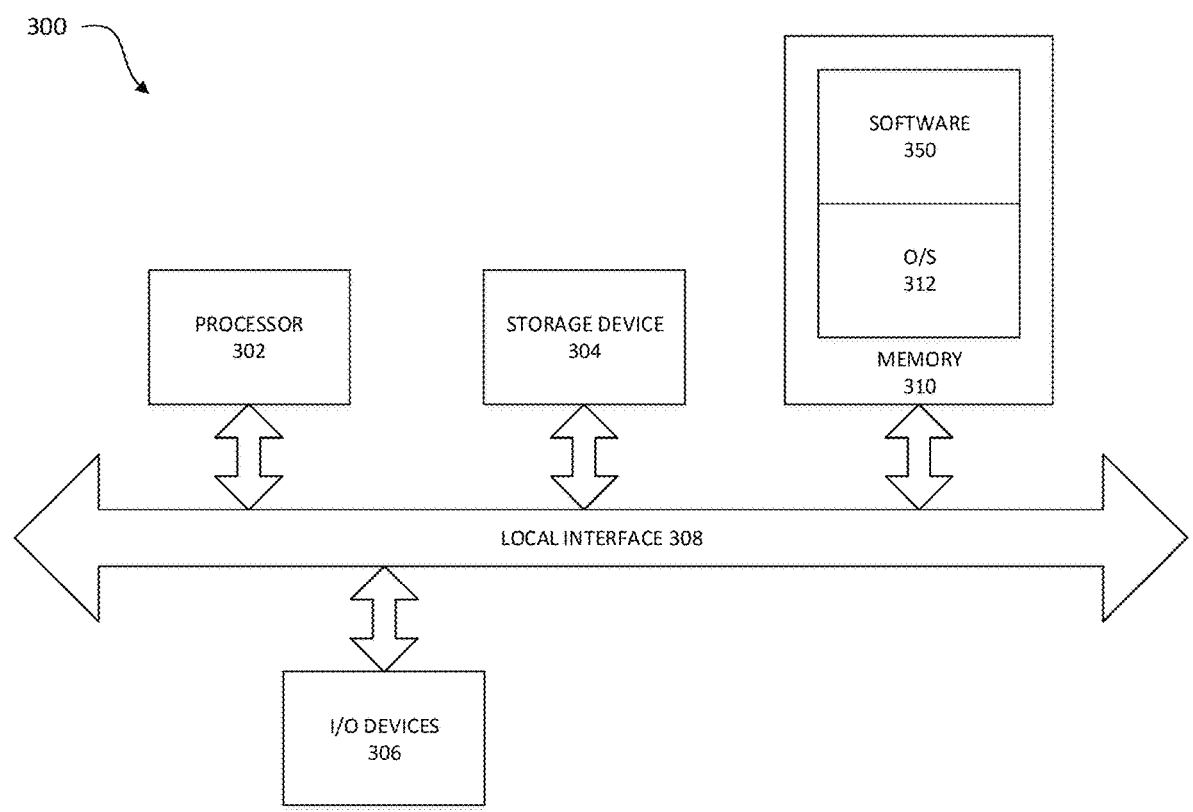
FIG. 2 is a schematic diagram illustrating an example of a system for executing functionality of the present invention.

It should be noted that a computer may be any device having a memory and processor, and being able to store therein functionality associated with software. Examples of computers may include, but are not limited to, a desktop computer, a portable computer such as a laptop computer, tablet computer, smartphone, smartwatch, or a personal data assistant. FIG. 2 is a block diagram further illustrating a general purpose computer. It should be noted that functionality of the present system and method can be implemented in software, firmware, hardware, or a combination thereof.

Returning to FIG. 1, within the system 70 there may be one or more than one dialing agent computer 20A, 20B, 20C, dialing agent telephone 22A, 22B, 22C, talker computer 24, talker telephone 26, central data server 100, central communication server 150, and/or customer telephone 200. For exemplary purposes, FIG. 1 illustrates three dialing agent computers 20A, 20B, 20C, three dialing agent telephones 22A, 22B, 22C, and three customer telephones 200A, 200B, 200C.

In accordance with the present invention, a telephone/phone can be a traditional analog hardware telephone, digital hardware telephone, a software telephone (such as session initiation protocol (SIP) client software), or the like that may be used to communicate human voice and enable phone conversation. Since the capability of a telephone may potentially be implemented using a piece of software executed in a computer, the telephone and computer need not be two different devices and instead, both can be incorporated within one computer device.

The central communication server 150 may be a communication server that has the capability of enabling phone call based communication and text based communication. For example, to enable phone call based communication, the central communication server 150 may have the capability to perform switching functions based on commands received through CTI (Computer Telephony Interface) or software based PBX, or the like; to enable text based communication, the central communication server 150 may have capability to send and receive text messages in such a way that enables text based communication taking place between parties as described in this document.

The central data server 100 may contain components similar to a computer, such as, but not limited to, a memory 310 (FIG. 2), a processor 302 (FIG. 2), a local bus or interface 306 (FIG. 2), input/output devices 306 (FIG. 2), and a storage device 304 (FIG. 2). A detailed description of a generic computer structure is provided herein below. Of course, the storage capability and structure of the storage device within the central data server 100 may be different from that of a standard generic computer storage device, however, one having ordinary skill in the art would know such structure and differences. In accordance with the first exemplary embodiment, the central data server 100 may store therein a list of customers for contacting, as well as data regarding the customers. Such data may include data that is typically used in marketing such as, but not limited to, account name, contact name, address, phone number, date last contacted, notes regarding results of the last communication, and other relevant attributes.

Since the capability of the central communication server 150 could be implemented using software executed in a computer, the central data server 100 and central communication server 150 need not be two different devices and instead both could be in one computer.

Telephone communication links 12, 14, and 16 may be implemented using traditional analog telephone lines or digital telephone lines utilizing various digital communication protocols such as SIP, PRI (Primary Rate Interface), or the like. The links 12, 14, and 16 may also be wireless, for example, but not limited to, WiFi, BlueTooth, microwave, or other wireless voice and/or data protocols. In addition, computer communication links 11, 13, and 53 may be implemented using a LAN (Local Area Network), a WAN (Wide Area Network), mobile network, or the like. A central server communication link 15 may also be provided for communication between the central data server 100 and the central communication server 150. The central server communication link 15 can be implemented using computer communication links or phone communication links described above. Based on implementation preferences and based on the type of device used by texting agent 51, communication link 53 may be implemented using a computer communication link or phone communication link. Based on implementation preferences and based on the type of communication device 250 used by customer, communication link 17 may be implemented using computer communication link or phone communication link.

One having ordinary skill in the art would understand the various types of devices, types of telephone communication links, and computer communication links that could be used in a system 70 (FIG. 1) embodying the present invention, and that other such devices and links may be provided.

FIG. 2 is a block diagram further illustrating a general purpose computer 300. Generally, in terms of hardware architecture, as shown in FIG. 2, the computer 300 includes a processor 302, memory 310, storage device 304, and one or more input and/or output (I/O) devices 306 (or peripherals) that are communicatively coupled via a local interface 308. The local interface 308 can be, for example but not limited to, one or more buses or other wired or wireless connections, as is known in the art. The local interface 308 may have additional elements, which are omitted for simplicity, such as controllers, buffers (caches), drivers, repeaters, and receivers, to enable communications. Further, the local interface 308 may include address, control, and/or data connections to enable appropriate communications among the aforementioned components.

The processor 302 is a hardware device for executing software, particularly that stored in the memory 310. The processor 302 can be any custom made or commercially available processor, a central processing unit (CPU), an auxiliary processor among several processors associated with the computer 300, a semiconductor based microprocessor (in the form of a microchip or chip set), a macroprocessor, or generally any device for executing software instructions.

The memory 310 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 310 may incorporate electronic, magnetic, optical, and/or other types of storage media. Note that the memory 310 can have a distributed architecture, where various components are situated remote from one another, but can be accessed by the processor 302.

The software 350 in the memory 310 may include one or more separate programs, each of which contains an ordered listing of executable instructions for implementing logical functions of the system, as described below. As an example, in the case of the dialing agent computer 20A-C, the software 350 would contain an ordered listing of executable instructions for implementing logical functions required of the dialing agent computer 20A-C, as described below. In addition, in the case of the talker computer 24, the software 350 would contain an ordered listing of executable instructions for implementing logical functions required of the talker computer 24, as described below. Further, in the case of the central data server 100, the software 350 would contain an ordered listing of executable instructions for implementing logical functions required of the central data server 100, as described below.

It should be noted that in accordance with an alternative embodiment of the invention, software of the dialing agent computers 20A-C (FIG. 1), software of the talker computer 24 (FIG. 1), and software of the central data server 100 (FIG. 1) may instead be one software package having separate modules to perform functionality of the dialing agent computer 20A-C (FIG. 1), the talker computer 24 (FIG. 1), and the central data server 100 (FIG. 1), respectively.

Although not required, it is possible for the memory 310 to contain an operating system (O/S) 312. The operating system 312 essentially controls the execution of computer programs and provides scheduling, input-output control, file and data management, memory management, and communication control and related services.

Functionality of the computer may be provided by a source program, executable program (object code), script, or any other entity containing a set of instructions to be performed. When a source program, then the program needs to be translated via a compiler, assembler, interpreter, or the like, which may or may not be included within the memory 310, so as to operate properly in connection with the O/S 312. Furthermore, functionality of the computer can be written as (a) an object oriented programming language, which has classes of data and methods, or (b) a procedure programming language, which has routines, subroutines, and/or functions.

The I/O devices 306 may include input devices, for example but not limited to, a microphone, a keyboard, mouse, scanner, joystick or other input device. Furthermore, the I/O devices 306 may also include output devices, for example but not limited to, a display, or other output devices. The I/O devices 306 may further include devices that communicate via both inputs and outputs, for instance but not limited to, a modulator/demodulator (modem; for accessing another device, system, or network), a radio frequency (RF) or other transceiver, a telephonic interface, a bridge, a router, or other devices that function both as an input and an output.

When the computer 300 is in operation, the processor 302 is configured to execute the software 350 stored within the memory 310, to communicate data to and from the memory 310, and to generally control operations of the computer 300 pursuant to the software 350. The software 350 and the O/S 312, in whole or in part, but typically the latter, are read by the processor 302, perhaps buffered within the processor 302, and then executed.

When the functionality of the computer is implemented in software, as is shown in FIG. 2, it should be noted that the functionality can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The functionality can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, a non-transient electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the functionality of the computer is implemented in hardware, the functionality can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), or other technologies.

As mentioned previously, system 70 (FIG. 1) described herein is a variation of the system 10 (FIG. 1) disclosed in the U.S. patent application Ser. No. 13/278,764. It should be noted that there are many embodiments of the system 10 (FIG. 1) of the U.S. patent application Ser. No. 13/278,764 that have been disclosed in the U.S. patent application Ser. No. 13/278,764 and the U.S. patent application Ser. No. 14/204,505 and all those embodiments are incorporated herein by reference, for the purpose of avoiding repetition of those embodiments herein.

In an exemplary embodiment of the system 70 (FIG. 1) that utilizes phone call based communication, a central data server 100 (FIG. 1) may select an initial batch of customer records for dialing/calling form a customer list and transmits such batch to a talker computer 24 (FIG. 1), and selects one or more customer records (associated with a customer) and transmit to a dialing agent computer 20A-C (FIG. 1) for dialing. Upon the central data server 100 (FIG. 1) selects (or queues) a customer for a dialing agent computer 20A-C (FIG. 1) to dial or upon the dialing agent computer 20A-C (FIG. 1) starts dialing the said selected customer, the talker computer 24 (FIG. 1) distinguishes one or more customer records associated with the said customer, in a first manner, for the purposes of notifying a talker associated with the talker computer 24 (FIG. 1) about the customer that has been selected or queued up for dialing (or started dialing) by a dialing agent associated with the dialing agent computer 20A-C (FIG. 1) and thereby the talker may be able to prepare, in anticipation of the call getting answered by the customer and transferred from being between the dialing agent and the customer to being between the talker and the customer, by reviewing customer records, activity notes history, and other relevant information associated with the said customer, and the like. Upon the dialing agent associated with the dialing agent computer 20A-C (FIG. 1) navigating the phone call (made to contact the said customer) through gatekeeper(s), phone tree(s), voice mail(s), and the like and reaching a live customer (the said customer that has been dialed/called) answering the phone, the dialing agent may transfer the phone call from being between the dialing agent and the customer to being between the talker associated with the talker computer 24 (FIG. 1) and the customer. Upon the said phone call being transferred to the talker, the talker computer distinguishes one or more customer records associated with the customer that has been dialed/called has been transferred, in a second manner, for the purpose of notifying the talker about the customer that has been transferred. It should be noted that, at any given time, the list of customer records and customer data transmitted to or shown on the dialing agent computer 20A-C (FIG. 1) may or may not be the same as that transmitted to or shown on the talker computer 24 (FIG. 1). Upon completing the dialing of a portion of the batch of customers, the central data server 100 (FIG. 1) may select the next batch of customer records for dialing and transmit such next batch to the talker computer 24 (FIG. 1) (and this cycle may continue until the entire customer list is exhausted or the dialing session ends). Upon receiving each batch of customer records for dialing/calling, talker computer 24 (FIG. 1) may append that batch with the previously shown customer records. Based on implementation preferences, to keep computer memory utilization low, the previously dialed/called customer records (that are no longer needed to stay in the dialing agent computer 20A-C (FIG. 1) and/or the talker computer 24 (FIG. 1)) associated with previously dialed/called customers may be removed from the dialing agent computer 20A-C (FIG. 1) and/or talker computer 24 (FIG. 1). It should be noted the word "dialing" and "calling" may mean the same thing and may be used interchangeably. Based on implementation preferences, in the foregoing embodiment, a first computer may transmit a notification to a second computer for the purposes of the second computer identifying/distinguishing one or more customer records associated with a customer, wherein the said notification comprises of: one or more customer records, or one or more unique identifiers associated with the one or more customer records, or a unique identifier associated with the customer.

One having ordinary skill in the art would appreciate that a smart phone, tablet, laptop, smart TV, smart display in a vehicle (for example, a car), and the like (referred to herein as the "mobile computer") may be used to execute one or more components of the System 70 (FIG. 1) and the system described by the present invention. Further, one or more of the mobile computers may be used to in conjunction with other one or more computers to provide the functionality that interacts with one or more users (such as talker, dialing agent, texting rep, texting agent, agent, another user, and the like) of the system 70 (FIG. 1) and the system described by the present invention.

It should be noted that one or more features or advantages of the present invention (described in a context of one or more embodiments or outside a context of an embodiment) may be implemented: (i) as a module to be part of an embodiment of the System 70 (FIG. 1), or (ii) as a separate stand-alone embodiment without one or more features/ advantages of the System 70 (FIG. 1). Further, reference to a particular feature or advantage in the context of an embodiment may or may not be applicable to another embodiment, and one or more features or advantages of the present invention may be combined in any appropriate manner in an embodiment.

One having ordinary skill in the art would appreciate that the present invention may be practiced without one or more features or advantages mentioned herein, and may be practiced as part of another system or method outside the invention mentioned herein. Further, one or more methods described herein may be embodied as a hardware, firmware, or software (stored in computer device or stored in computer readable medium that enables execution of the software) to perform actions to accomplish the described one or more methods.

It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. In addition, it may be the case that a function may be skipped.

Based on the type of technology used for communication between any two components of the system associated with the present invention and choice of the method used for embodying the current invention, a component may act only as a client or may act only a server or may act as both a client and a server. Based on implementation preferences, the functions performed by each component of the system (including but not limited to, central data server, central voice server, talker software, and dialing agent software) could be restructured by removing a specific function (whole function or a portion of a function) from one component and delegating such function to be performed by another component.

One having ordinary skill in the art would appreciate that the system 10 (FIG. 1) disclosed in the U.S. patent application Ser. No. 13/278,764 may utilize one or more modes of communication with a customer involving (i) a mode of communication that requires communication to take place in real time or near real time (such mode of communication is referred to herein as the "Real Time Based Communication"), and/or (ii) a mode of communication that may not require the communication to take place in real time or near real time (such mode of communication is referred to herein as the "Non Real Time Based Communication"). A mode of communication that may not require real time or near real time may include, but is not limited to, a communication mode that involves pre-recorded voice message, pre-recorded video message, short message service (SMS), multimedia messaging service (MMS), text, chat, instant message, email, other type of electronic message based communication, any other communication mode that does not require the communication to take place in real time (or near real time) that is available now or in the future, or the like, or any combination thereof. An example of Real Time Communication is phone call based communication, such as a voice based phone call. An example of Non Real Time Communication is text-based communication.

Returning back to FIG. 1 described herein, the system 70 (FIG. 1) may utilize Real Time Communication modes and Non Real Time Communication modes. For reference purposes, communication with a customer via phone call is referred to herein as the "Phone Call Based Communication." The System 70 (FIG. 1) that uses a phone call to connect with a customer is referred to herein as the "Phone Call Based System 70." The System 70 (FIG. 1) that uses Real Time Based Communication to connect with a customer is referred to herein as the "Real Time Based Communication System 70." The System 70 (FIG. 1) that uses Non Real Time Based Communication to connect with a customer is referred to herein as the "Non Real Time Based Communication System 70." In an embodiment of the system 70 (FIG. 1) that utilizes phone call based and non-phone call based communication, the central communication server 150 may be used to establish communication via one or more phone call based or non-phone call based communication modes. One having ordinary skill in the art would appreciate that when there is a reference to the central voice server 150 in FIG. 1 of U.S. patent application Ser. No. 13/278,764, in a context of non-phone call based communication, it refers to: (i) the central voice server (150) in FIG. 1 of U.S. patent application Ser. No. 13/278,764 having capability to establish communication via non-phone call based communication mode that is referred in the context, or (ii) a central communication server (150) in FIG. 1 described herein having capability to establish communication via non-phone call based communication mode that is referred in the context.

For the purposes of providing an example and ease of understanding, a Non Real Time Based Communication System 70 (FIG. 1) that utilizes text message based communication is described below. In a Non Real Time Based Communication System 70 (FIG. 1) using a text message based communication to connect with a customer, a dialing agent that communicates via text (instead of phone call or in addition to phone call) may be more appropriately referred to herein as the "texting agent" and a talker that communicates via text (instead of phone call or in addition to phone call) may be referred to herein as the "texting rep." A device or software module or application that enables a texting agent, texting rep, or another user of the system to send, receive, review and reply to a text message is referred to herein as the "texting module." One having ordinary skill in the art would appreciate that the texting module may be stored and executed in various computer devices, including but not limited to, smart phone, smart television, computer, laptop computer, tablet computer, and the like; and the texting module may be implemented as part of other software applications including but not limited to, social networking websites and the like. It should be noted that the word "text," "chat," and "instant message" are used interchangeably to mean the same thing. One having ordinary skill in the art would appreciate that SMS, MIMS, text, chat, and instant message are variations of text message based communication. Any computer or device used by a texting rep that enables the texting rep to perform the necessary function is referred to herein as the "texting rep computer," and any computer or device used by a texting agent that enables the texting agent to perform the necessary function is referred to herein as the "texting agent computer."

In an embodiment of Non Real Time Based Communication System 70 (FIG. 1) using a text message based communication, the texting agent may try to reach a customer via text message based communication and upon determining that the customer has met certain criteria (such criteria is referred to herein as the "Potential Transfer Criteria") during the connection attempt of the texting agent with the customer, the texting rep computer may receive a notification (referred to herein as the "potential transfer notification") and the potential transfer notification enables the texting rep computer to distinguish one or more customer records associated with the customer that met the Potential Transfer Criteria, in a first manner. The purpose of such distinguishing of one or more customer records may be to notify the texting rep that during the attempt to reach the customer, the texting agent has determined that the customer has met the Potential Transfer Criteria. It should be noted that the Potential Transfer Criteria may be based on implementation preferences; for example, the Potential Transfer Criteria may include, but is not limited to, the texting agent just establishing a connection with the customer (for example, the customer has just responded to a text message), or the texting agent has determined via text-based communication that the customer has a budget approved but the texting agent is yet to confirm that the purchase is approved, or the texting agent has determined via text-based communication that the purchase is approved but the texting agent is yet to confirm that the customer is ready to receive a proposal, or the like, or any combination thereof. It should be noted that the distinguishing of one or more customer records associated with the customer that met the Potential Transfer Criteria allows the texting rep to review information associated with the customer (including but is not limited to customer data, activity/notes history, text message history including any on-going text messages in the current communication session between the texting agent and the customer, and the like) prior to a potential transfer of the connection from being between the texting agent and the customer to being between the texting rep and the customer and be prepared in anticipation of such potential transfer. Based on implementation preferences, after the texting rep computer distinguishes a customer associated with a potential transfer notification the texting rep may have the option to request (or force) the texting agent to transfer the connection associated with the said customer to being between the texting rep and the customer; such request may be notified to the texting agent; and texting agent may decide and transfer the connection to being between the texting rep and the customer. Further, based on implementation preferences, in the case when the texting rep forces the texting agent to transfer the connection with the customer to being between the texting rep and the customer, the system may generate a notification message to the texting agent and transfer the connection (without providing the option for the texting agent to decide on whether to transfer the connection or not). It should be noted that for a given texting rep, more than one texting agent may be attempting to communicate or communicating with more than one customer concurrently, and in which case there may be one or more potential transfer notifications that enable the texting rep computer to distinguish customer record(s) associated with the one or more customers that met the Potential Transfer Criteria. That is, the potential transfer notification associated with each customer may be received by the texting rep computer separately or a single potential transfer notification may have information associated with more than one customer that met the Potential Transfer Criteria and the associated customer records may be distinguished from other customer records. It should be noted that based on the context the word "customer" may refer to the "one or more customer records" associated with the customer.

Further, in the foregoing embodiment, a texting agent may try to reach a customer via text message based communication and upon determining that the customer has met certain criteria (such criteria is referred to herein as the "Connection Transfer Criteria"), the texting agent may transfer the text message based connection between the texting agent and the customer to being between the texting rep and the customer. The definition of Potential Transfer Criteria should not be confused with the definition of Connection Transfer Criteria, though there may be some similarities. Typically, a subset of customers that meet the Potential Transfer Criteria may meet the Connection Transfer Criteria. However, since the criteria associated with Potential Transfer Criteria and the criteria associated with Connection Transfer Criteria are user defined and customizable, based on implementation preferences, the set of customers that meet the Potential Transfer Criteria may be same as the set of customers that meet the Connection Transfer Criteria. Returning back to the texting agent transferring the text based connection with the customer (that met the Connection Transfer Criteria) to being between the texting rep and the customer, upon such transfer, the texting rep computer may receive a notification (referred to herein as the "connection transfer notification") and connection transfer notification enables the texting rep computer to distinguish one or more customer records associated with the customer associated with the transfer, in a second manner. It should be noted that the Connection Transfer Criteria may be based on implementation preferences; for example, the Connection Transfer Criteria may include, but is not limited to, the texting agent just establishing a connection with the customer (for example, the customer has just responded to a text message), the texting agent determining that having the texting rep communicate with the customer may help facilitate closing a transaction such as a sale, the texting agent determining that the customer has a budget approved, the customer is ready to receive a proposal, a purchase is approved, or the like, or any combination thereof.

Figure 3:
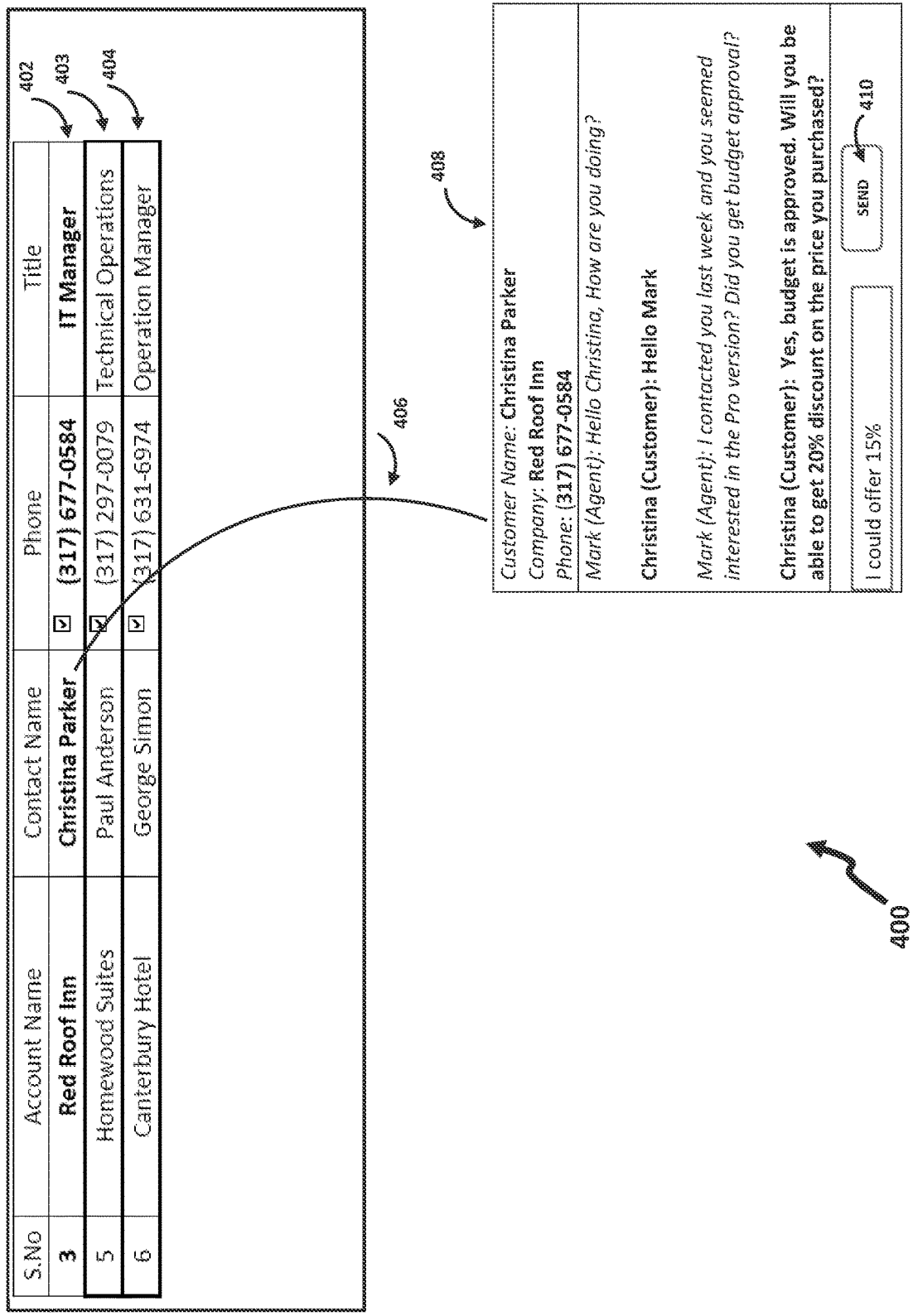
FIG. 3 is an exemplary screen view illustrating an interface provided to a texting rep, for distinguishing two customers in a first manner after their text based connectivity meets Potential Transfer Criteria, and a transferred customer distinguished in a second manner after the text based connectivity with the customer met the Connection Transfer Criteria, in accordance with the system of FIG. 1.

FIG. 3 is an exemplary screen view illustrating an interface 400 provided to a texting rep, wherein two customers are distinguished in a first manner (in this case, shaded using Regular Shade) after their text based connectivity met Potential Transfer Criteria, and a customer that got transferred is distinguished in a second manner (in this case, shaded using Darker Shade) after the text based connectivity with the customer met the Connection Transfer Criteria, in accordance with the foregoing embodiment of the System 70 (FIG. 1) using text based communication. As shown by FIG. 3, the customer record 402 associated with the transferred customer that met the Connection Transfer Criteria is shaded differently to differentiate from the other two customer records 403 and 404 associated with customers that met Potential Transfer Criteria (and not the Connection Transfer Criteria). In addition, a window 408 shows the text messages communicated back and forth with the transferred customer, wherein after the transferred customer is transferred the texting rep composed a message "I could offer 15%" and ready to send to the transferred customer (which may be sent by clicking the send button 410). It should be noted that the window 408 shows the text messages exchanged between the texting agent and the transferred customer prior to transfer as well as the new text message composed by the texting rep after the transfer. Based on implementation preferences, the window 404 may be shown in the texting rep computer only after transferring the said customer associated with the transfer. Further, "Mark (Agent)" be an identifier associated with the texting rep and the same identifier may be shown while the texting agent communicates with a customer, since the texting agent may be communicating with the customer on behalf of the texting rep. The line 406 shows the customer record associated with the text message window 408.

Figure 4:
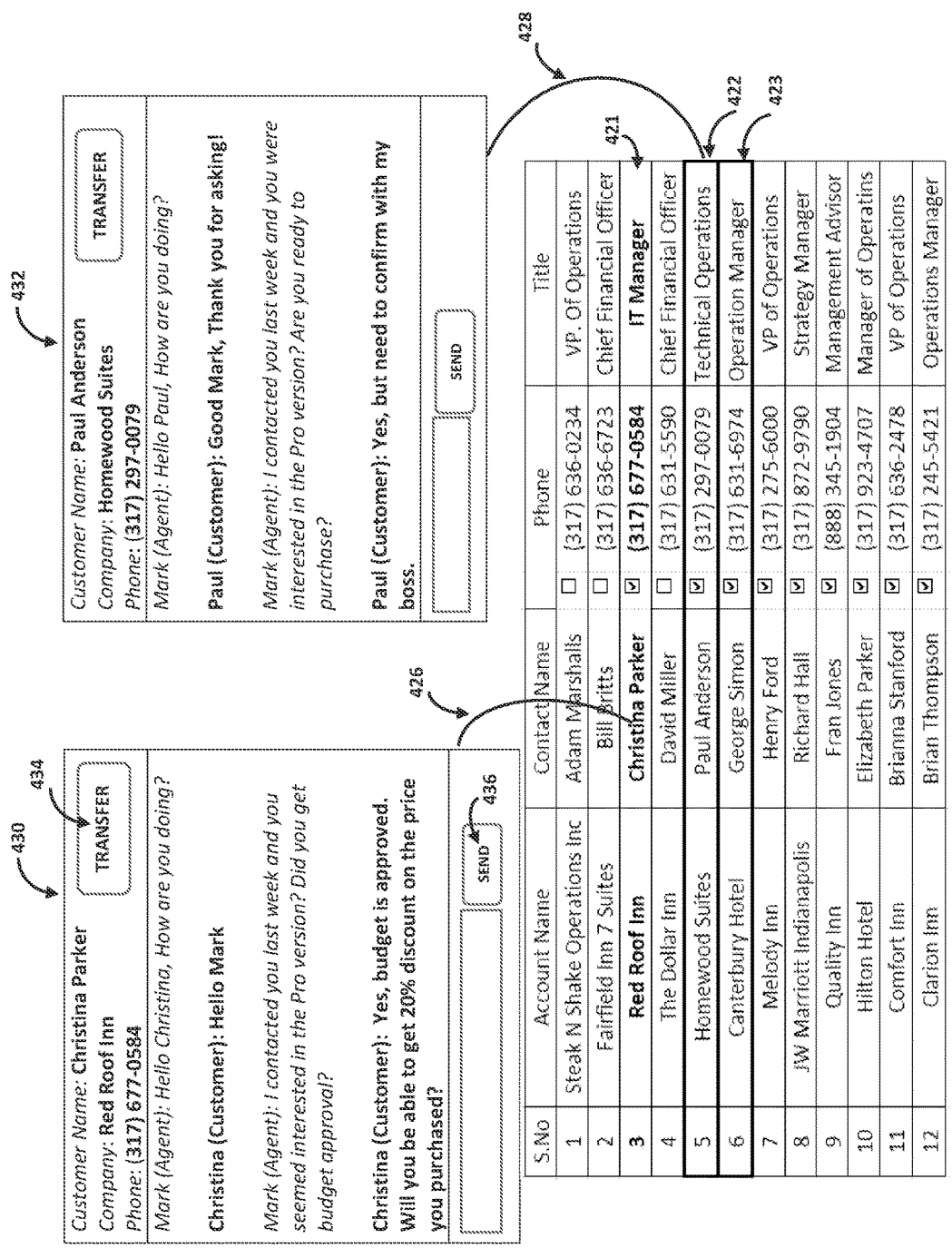
FIG. 4 is an exemplary screen view illustrating an interface provided to a texting agent, wherein two customers that met Potential Transfer Criteria are distinguished in a first manner, and a customer that met Connection Transfer Criteria is distinguished in a second manner, in accordance with the system of FIG. 1.

FIG. 4 is an exemplary screen view illustrating an interface 420 provided to a texting agent, wherein two customers are distinguished in a first manner (in this case, shaded using Regular Shade) after their text based connectivity met Potential Transfer Criteria, and a customer whose text based connectivity met the Connection Transfer Criteria is distinguished in a second manner (in this case, shaded using Lighter Shade) after the text based connectivity with the customer met the Connection Transfer Criteria, in accordance with the foregoing embodiment of the System 70 (FIG. 1) using text based communication. As shown by FIG. 4, two customer records 422 and 423 associated with customers that met Potential Transfer Criteria (and not the Connection Transfer Criteria) are distinguished using Regular Shade, and a customer record 421 associated with a customer that met Connection Transfer Criteria is distinguished differently using Lighter Shade. In addition, a window 430 shows the text messages exchanged between the texting agent and a customer that met Connection Transfer Criteria (since the customer confirmed that the budget is approved). Upon the foregoing customer meeting the Connection Transfer Criteria, the texting agent may click the transfer button 434 to transfer the text based connectivity from being between the texting agent and the customer to being between a texting rep and the customer. A window 432 shows the text messages exchanged between the texting agent and a customer that met Potential Transfer Criteria. It should be noted there may be another window (which is not shown in FIG. 4) that shows the text messages exchanged between the texting agent and the customer associated with customer record 423 that also met Potential Transfer Criteria. The lines 426 and 428 show the association between each text message window and the corresponding customer record in the tabular view. Further, "Mark (Agent)" may be an identifier associated with a texting rep and the same identifier may be shown while the texting agent communicates with a customer, since the texting agent may be communicating with the customer on behalf of the texting rep. Based on implementation preferences, if there are more than one texting reps associated with the texting session, upon transferring the text based connection, in the foregoing situation, the system may transfer the connection to Mark. The texting agent may send a text message to a customer by clicking the send button 436.

Figure 5:
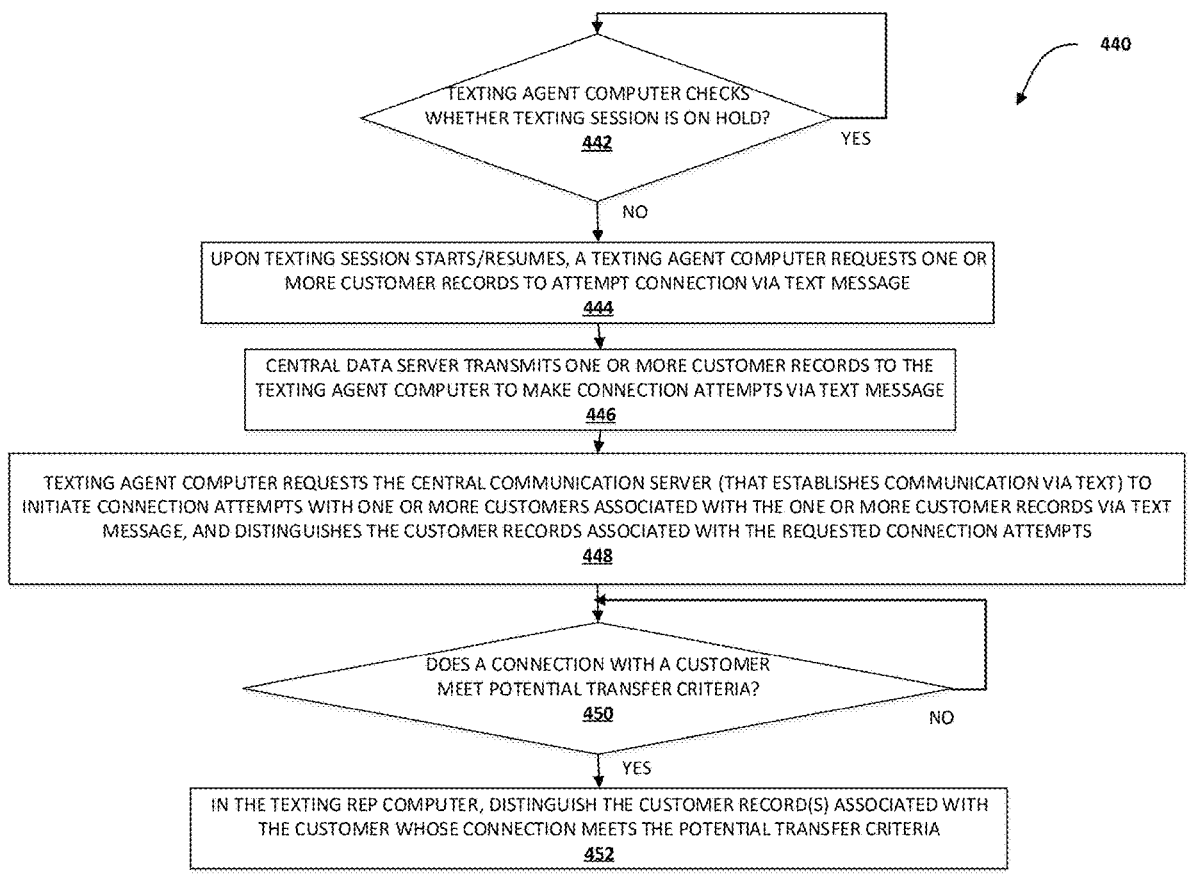
FIG. 5 is a flowchart illustrating actions performed when a texting agent computer receives one or more customer records and initiates connection attempts via text message, in accordance with the system of FIG. 1.

FIG. 5 is a flowchart illustrating actions performed when a texting agent computer receives one or more customer records and initiates connection attempts via text message, in accordance with an embodiment of system 70 (FIG. 1) utilizing text-based communication. As shown by block 442, the texting agent computer 51 (FIG. 1) checks whether the texting session (associated with the texting agent computer) is on hold. As shown by block 444, once the texting session is not on hold, the texting agent computer 51 (FIG. 1), requests from the central data server 100 (FIG. 1) one or more customer records for attempting to connect via text based communication. As shown by block 446, the central data server 100 (FIG. 1) responds to the texting agent computer by transmitting one or more customer records for attempting to connect via text based communication. Concurrently, based on the implementation preferences, the center data server 100 (FIG. 1) may or may not transmit the same one or more customer records to the texting rep computer. As shown by block 448, the texting agent computer requests the central communication server 150 (FIG. 1) to initiate text based connection attempts with the one or more customers associated with the customer records received as shown by block 446. Also, the texting agent computer may distinguish the customer records associated the connection attempts. As shown by block 450, the texting agent determines whether a text based connectivity with a customer meets Potential Transfer Criteria. Based on implementation preferences, such determination may be performed automatically by the system or determined based on input from the texting agent.

As shown by block 452, upon the text based connectivity with the customer meeting the Potential Transfer Criteria, the texting rep computer distinguishes customer record(s) associated with the customer that met the Potential Transfer Criteria in a first manner. One having ordinary skill in the art would appreciate that the foregoing function can be accomplished in many ways, for example, the texting agent computer transmits to the central data server 100 (FIG. 1) the said customer record(s) or their unique identifiers and the central data server 100 (FIG. 1) further transmits to the texting rep computer the said customer record(s) or their unique identifiers, and the texting rep computer may use the received the customer record(s) or their unique identifiers to distinguish the said customer records in the first manner. It should be noted that the notification transmitted by the texting agent computer may or may not be identical to the notification received by the texting rep computer. Further, it should be noted that the term "first manner" in a context may or may not refer the same "first manner" referred in another context.

It should be noted that whenever a customer record is transmitted from one computer/device to another, instead of transmitting the customer record the transmitting computer/device may transmit a unique identifier associated with the customer record or partial attributes associated with the customer record, and the receiving computer/device may use such unique identifier or partial attributes to fetch the remaining necessary attributes of the customer record.

Figure 6:
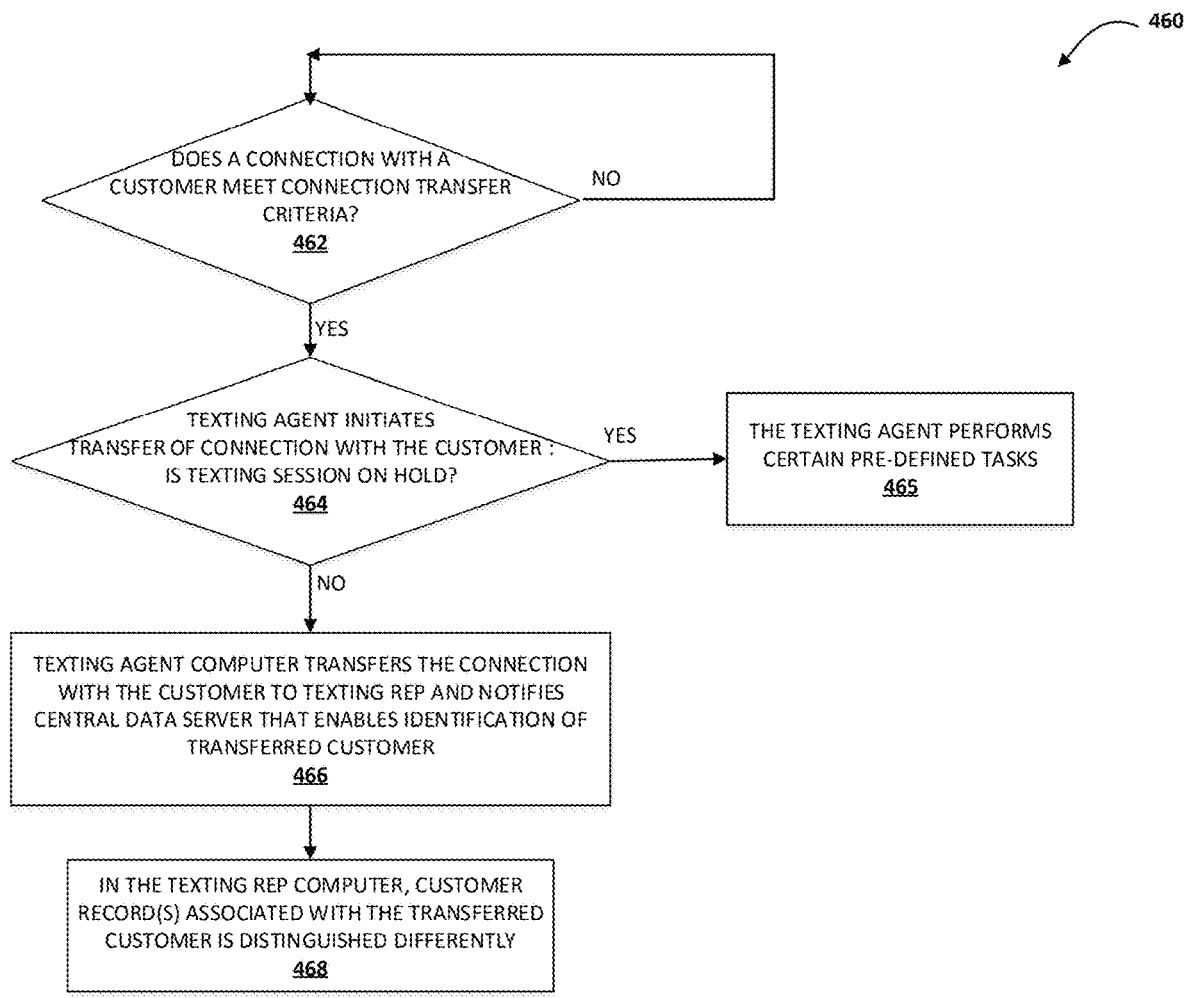
FIG. 6 is a flowchart illustrating actions performed by a texting agent when a text based connection with a customer meets Connection Transfer Criteria, in accordance with the system of FIG. 1.

FIG. 6 is a flowchart illustrating actions performed by a texting agent when a text based connection with a customer meets Connection Transfer Criteria, in accordance with an embodiment of system 70 (FIG. 1) utilizing text-based communication. As shown by block 462, the texting agent checks whether a text based connectivity with a customer meets Connection Transfer Criteria. Based on implementation preferences, such determination may be performed automatically by the system or determined based on input from the texting agent. As shown by block 464, upon the said customer meeting Connection Transfer Criteria, the texting agent computer initiates transfer of the text based connectivity associated with the said customer from being between the texting agent and the customer to being between a texting rep and the customer, and the texting agent computer checks whether the texting session is on hold.

Based on implementation preferences, if more than one texting reps participate in a texting session, then the texting session may be considered to be on hold only when all texting reps are busy (indicating that no further transfer of customers is possible), and if a said customer can be transferred only to a specific texting rep, and if that texting rep is busy, then the texting session may be considered to be on hold. As shown by block 465, upon determining that the texting session is on hold, the texting agent may perform certain pre-defined tasks (for example, exchanging text messages to accomplish Allowable Delay of a reasonably long period, schedule to contact back in the future, or the like).

As shown by block 466, upon determining that the texting session is not on hold, the texting agent (using the texting agent computer) transfers the text based connectivity with the customer that met Connection Transfer Criteria from being between the texting agent and the customer to being between a texting rep and the customer, and sends a notification that enables the central data server 100 (FIG. 1) to identify the customer record(s) associated with the transferred customer. As shown by block 468, after the central data server 100 (FIG. 1) identifies the customer record(s) associated with the transferred customer in the foregoing step, the central data server 100 (FIG. 1) may send a notification that enables the texting rep computer to identify the customer record(s) associated with the transferred customer and distinguish the customer record(s) differently in a second manner.

While FIG. 5 and FIG. 6 are provided with regard to a single texting agent, one having ordinary skill in the art would appreciate that there may be more than one texting agent in the present system, resulting in the steps of FIG. 5 and FIG. 6 being performed by each texting agent.

Based on implementation preferences, a texting rep or another user of the system may configure one or more configuration settings associated with the texting rep and such settings may include, but are not limited to, a maximum number of customers that the texting rep may be able to communicate concurrently, a maximum number of texting agents preferably be actively attempting to reach customers of the texting rep concurrently, a group of one or more texting agents defined by the texting rep which may be defined based on texting agent skill (including but not limited to written communication skill, language skill, or the like), a maximum number of customers that the texting agent may be able to communicate concurrently, or the like. It should be noted that upon the texting rep starting communication with the maximum number of customers (as described in the foregoing sentence), the texting rep may be declared to be busy indicating that no additional connection can be transferred to being between the texting rep and a customer. Further, if all texting reps associated with a text communication session become busy, that text based communication session may be put on hold and no further connection can be transferred to being between any texting rep associated with the communication session and a customer. Based on implementation preferences, when a texting session is on hold the system may or may not allow a certain number of text based communication attempts to be initiated by one or more texting agents. Based on implementation preferences, an authorized user of the system may configure one or more configuration settings associated with a texting agent and such settings may include, but are not limited to, a maximum number of customers that the texting agent may be able to communicate concurrently, the skill of the texting (including but not limited to written communication skill, language skill, or the like), or the like.

It should be noted that the word "connectivity" or "connection" or "connect," as it relates to a connection with a customer via text based communication, refers to a text message based connectivity wherein the customer and a texting agent (or a texting rep) are engaged in communication via text message communication or responding to one or more text messages of the other in a reasonable response time customary in text message based communication (such response time may be customized to qualify as a reasonable response time), which may or may not be in real time.

One having ordinary skill in the art would appreciate that the list of customers that meet the Potential Transfer Criteria may be a subset of the list of customers texting agent(s) are trying to connect with, because all customers attempting to connect with may not be connected and/or all customers attempting to connect with may not meet the Potential Transfer Criteria. Further, the list of customers that meet the Connection Transfer Criteria may be a subset of the list of customers the texting agents are trying to connect with, because all customers attempting to connect with texting agents may not be connected and/or all customers attempted to connect with texting agents may not meet Connection Transfer Criteria. The nature of the system and method described in the foregoing paragraph allows the time of the texting rep to be used effectively. Based on implementation preferences, typically a list of customers that meet the Connection Transfer Criteria may be a subset of a list of customers that meet the Potential Transfer Criteria. However, based on implementation preferences, a list of customers that meet the Connection Transfer Criteria may not be a subset of a list of customers that meet the Potential Transfer Criteria. As a way of example, a company may use a sales process that has seven steps, and upon the texting agent determining that the customer has fulfilled the criteria specified in the first three steps the customer may be considered as meeting the Potential Transfer Criteria, however, only upon the texting agent determining the customer has fulfilled the criteria specified in the first three steps as well as step 4 and step 5 (that is, the first five steps in total) the customer may be considered as meeting the Connection Transfer Criteria. It should be noted, in the foregoing example, after transferring the connectivity between the texting agent and the customer to being between the texting rep and the customer the texting rep may complete the remaining two steps (step 6 and step 7) successfully and completing the sales process. Further, it should be noted that based on implementation preferences, in the foregoing example, after completing the first five steps of the sales process, if the texting rep is busy (and the texting agent may not be able to transfer the connection to being between the texting rep and the customer) the texting agent may be allowed to continue to complete step 6 and then attempt to transfer the connection with the customer to being between the texting rep and the customer (or, if the texting rep is still busy the texting agent may be allowed to complete the remaining step 7 also and complete the sale process, in which case the connection between the texting agent and the customer may never be transferred to being between the texting rep and the customer).

It should be noted that based on implementation preferences, the Potential Transfer Criteria may involve just attempting to connect with the customer, and in which case upon the texting agent attempting to connect with the customer the potential transfer notification may be received by the texting rep computer. Further, the Potential Transfer Criteria may involve just connecting with the customer, and in which case upon the texting agent connecting with the customer (for example, the customer has just responded to a text message) the potential transfer notification may be received by the texting rep computer. Further, based on implementation preferences, the Connection Transfer Criteria may involve just connecting with the customer, and in which case upon the texting agent connecting with the customer (for example, the customer has just responded to a text message) the connection transfer notification may be received by the texting rep computer.

One having ordinary skill in the art would appreciate that, based on implementation preferences, in a Phone Call Based System 70 (FIG. 1) the skill or cost associated with a dialing agent may be lower or equal to when comparing to the skill or cost associated with a talker, and in a Non Real Time Based Communication System 70 (FIG. 1) the skill or cost associated with a texting agent may be lower or equal to when comparing to the skill or cost associated with a texting rep.

There are inherent pros and cons of using non-phone call based communication. For example, based on conventional knowledge, chatting and texting may give adequate time for a sending person to draft what the sending person wants to say (in contrast to a phone or face to face conversation or video conference). Further, when drafting a reply on a chat, the receiving person may see the sending person is in the process of thinking and drafting a text message since the receiving person may see something like "(sender name) is typing" or " . . . " as the sending person writes and before hitting enter. The foregoing behavior of chat may be beneficial since it eases anxiety of the receiving person by knowing that the response will be forthcoming shortly and also the fact the receiving person is not seeing as the sending person is typing every character. However, when the sending person deletes the draft message and does not send that message the receiving person may know about the sending person changing mind and deleting the message. It should be noted that based on implementation preferences, the foregoing behavior of the chat communication may be changed by implementing the system not to notify that the sending person is drafting a reply message and only deliver the message after the sending person confirms to send the message.

It should be noted that typically in a connection established with a customer using phone call in a Phone Call Based System 70 (FIG. 1), the dialing agent or the talker associated with the phone call based connection with a customer may need to respond back to the customer quickly without noticeable delay (or silence) for the purposes of avoiding any negative perception the customer may develop otherwise. However, in a connection established with a customer using a Non Real Time Based Communication, due to the non-real time nature of the communication mode there may be an inherent flexibility including, but is not limited to, allowing a response with a reasonable delay, allowing multi-tasking, and the like.

As a way of example, a texting agent or texting rep may be able to handle more than one connection with customers concurrently. It should be noted that all of such connections may be non-phone call based and/or one of such connection may be phone call based. As a way of another example, when using text message based communication, the texting agent or the texting rep may be able to respond to a text message from a customer after a delay of one or more seconds or minutes that may not affect the customer's perception negatively. As a way of illustrating the non-real time nature of text based communication, exemplary text messages in a communication between a texting agent and a customer are provided below with timestamps, wherein the customer responded to the texting agent within a minute delay and however the texting agent's further response got delayed by 3 minutes (which may be needed since the texting agent had to validate the response message with someone else or the texting agent may be busy in dealing with more than one connection with more than one customer concurrently). Such delay may be acceptable without affecting the customer's perception in a text-based communication; however, such delay may not be acceptable in a phone call based communication.

Texting agent: Are you ready to purchase Pro version of the product?

(Sent by texting agent at 3:22 pm EST on Tuesday)

Customer: Will you be able to get 20% discount on the price you proposed?

(Received by texting agent at 3:23 pm EST on Tuesday)

Texting agent: I could offer 15% discount if you purchase today.

(Sent by texting agent at 3:26 pm EST on Tuesday)

When the texting agent wants to transfer the connection between the texting agent and a customer to being between the texting rep and the customer, the texting rep may not be available to accept such transfer. In such circumstance, the inherent flexibility associated with the possibility of delayed response from the texting agent may allow the texting agent to wait for a period of time (referred to herein as the "Allowable Delay") until the texting rep becomes available and then transfer the connection. An Allowable Delay of reasonably short period may be accomplished by not responding to the customer for a short time that may not affect customer's perception negatively and an Allowable Delay of reasonably long period may be accomplished by executing a pre-determined script (that is, sending one or more pre-determined messages) that makes the customer wait without ending the connection. For example, an Allowable Delay of reasonably long period may be accomplished by having a texting agent send one or more text messages including but is not limited to, "let me take few minutes to review the previous proposal I sent," "I am trying to figure out whether I can give you more discount," "I am waiting for my manager's response to approve an additional 5% discount," or the like. If a connection is transferred to the texting rep after the Allowable Delay of a reasonably long period, the texting rep may review the previous text messages (including but not limited to the text messages used to accomplish the Allowable Delay) and start the communication between the texting rep and the customer in such a way that the customer may not perceive/sense that a transfer of connection took place from the texting agent to the texting rep. In the event, after accomplishing an Allowable Delay, if the texting agent may not be able to transfer the connection due to unavailability of texting rep, the texting agent may accomplish scheduling a follow-up communication event (via text, voice, or other communication modes) between the texting rep and the customer, by executing another pre-determined script. For example, a follow-up phone call or texting connection event may be scheduled by having a texting agent send one or more text messages including but is not limited to, "My manager was planning to rollout a new discount program, I would like to check about that and connect with you," "Sorry, I didn't realize I have another meeting to attend in 2 minutes, can we schedule a connect via phone call or text tomorrow at 10 am?," "Sorry, I need to attend something that came up, can we schedule a connect via phone call or text tomorrow at 10 am?," or the like. Based on implementation preferences, the system may be implemented to recommend one or more text messages to the texting agent that may be used to accomplish the foregoing function, and/or Allowable Delay, and such recommended message may be generated by the system based on intelligence (including but not limited to predictive intelligence) associated with various data, including but is not limited to, effectiveness of one or more set of messages recommended in the past (with the customer or across multiple customers), the response from the customer for the previously recommended message that was sent by the texting agent (if any), activity history with the customer, purchase history with the customer, field associated with the customer, or the like.

It should be noted that in a Phone Call Based System 70 (FIG. 1) a transfer of connection from between a dialing agent and a customer to being between a talker and the customer may not be possible with an Allowable Delay of long period, because if the dialing agent communicates with the customer via voice to accomplish Allowable Delay and then transfers the connection, the customer may notice the transfer of connection taking from the dialing agent to a talker (wherein the customer noticing the transfer taking place is not acceptable). Further, the flexibility associated with the Allowable Delay may allow the implementation of the Non Real Time Based Communication System 70 (FIG. 1) wherein a texting agent in a texting session may be allowed to start attempting to reach a customer using text-based communication before a texting rep is readily available to accept a transfer of the connection and once texting agent provides a potential transfer notification the system may select an available texting rep (authorized to be a texting rep for the texting session) and send the potential transfer notification to the texting rep computer (enabling the texting rep to participate in the texting session), and upon the texting agent transfers the connection the system may transfer the connection from being between the texting agent and the customer to being between the texting rep and the customer. One having ordinary skill in the art would appreciate that based on the number of texting reps available for a given texting session (and the number of concurrent connections currently handled by each texting rep versus the maximum number of concurrent connections that may be handled by each texting rep), the system may allow an appropriate number of connections/connection attempts to take place concurrently between one or more texting agents and customers.

It should be noted that a response to a message received from a customer in a Non Real Time Based Communication System 70 (FIG. 1) using email-based communication may not require as quick a response to a message received from a customer in a Non Real Time Based Communication System 70 (FIG. 1) using text-based communication. The foregoing nature of response time associated with the mode of communication further justifies the need to utilize the benefit of a potential transfer notification in a Non Real Time Based Communication System 70 (FIG. 1) using text-based communication that enables the texting rep to be prepared in anticipation of a potential transfer of a connection from being between a texting agent and a customer to being between a texting rep and the customer. It should be noted that based on a specific mode of communication, including but not limited to, voice, video, text, chat, instant message, SMS, MMS, email, or the like, there may be certain variations in human behavior using such communication mode and accordingly there may be certain variations in the features and benefits of the System 70 (FIG. 1) and all such variations are anticipated by the present invention.

One having ordinary skill in the art would appreciate that, based on implementation preferences, the Non Real Time Based Communication System 70 (FIG. 1) may use a from-address/name associated with a texting rep for the text based communication, for the purposes of having the communication appear to be coming from the texting rep irrespective of whether the communication is taking place between a texting agent and a customer or between a texting rep and the customer. It should be noted that, if necessary, such from-address/name may be customized and such customization may be pre-configured by a texting rep or another user of the system, or dynamically decided by the system before attempting to reach a customer based on one or more fields/attributes associated with the customer. Further, if the customer responds to a text message, such response text message may be received by/routed to a texting module in a text-capable device associated with the texting rep, or a texting module in a text-capable device associated with the texting agent (including the texting agent automated by a module in the system, if applicable), or another module in the system, or any combination thereof, based on implementation preferences.

It should be noted that the Non Real Time Based Communication System 70 (FIG. 1) utilizing text-based communication may be implemented to maintain one or more addresses for a customer that may be used to reach the customer via text message communication (each such address is referred to herein as the "text address"). Such text address may be stored in one more fields/attributes of a customer record. The system may recognize and keep track of whether a customer has a valid text address and use such information to avoid attempting to reach the customer if there is not a valid text address. Further, validity of a text address may be verified by various mechanisms, including but not limited to, comparing the information associated with the text address with a different allowable patterns of a valid text addresses provided by different text message carriers using pattern matching techniques, sending a test text message and verifying that the text message was successfully delivered or not delivered, bounced back, or if delivered, whether a response came from the customer, or the like. In the case of sending text to the smart phone device of a customer via email-to-SMS or email-to-MMS or email-to-text service in the United States of America, the text address may be an email address that starts with a 10-digit phone number of the customer and having the remaining characters of the email address specified by the carrier/service provider of the customer (for example, 10digit-phonenumberof thecustomer txt.att.net). It should be noted that if the system or the user of the system recognizes that the text address is not valid, such information indicating the invalidity may be updated/associated with the customer record, which may be further used to clean-up the invalid text addresses by one or more users of the system or by a module in the system to the extent such clean-up is automated.

Further, the communication with a customer via text message may not require a texting agent or a texting rep with oral/accent/voice communication skill; instead, it may be enough if the texting agent and the texting rep have written communication skill in the language used to communicate with the customer via text message communication. That is, when using text message based communication, a texting agent or a texting rep may be able to pitch a product or service effectively by having capability to understand the one or more text messages sent by the customer and knowing what to respond with via text.

The system may be implemented to predict and suggest one or more messages that may be used by a texting agent or texting rep as a response, and the system may come up with such a suggestion by taking into account various inputs, including but are not limited to, one or more of text messages from the customer, notes history associated with the customer, purchasing history of the customer, intelligence associated with one or more fields/attributes of a customer record associated with the customer, sales stage the customer may be in, marketing intelligence associated with the customer, effectiveness of text messages in similar circumstances in the past, and the like. It should be noted that the texting agent function may be fully or partially automated using a module in the system and in the case of the texting agent function fully automated by the system there may not be a need to have a human texting agent present and/or texting agent computer may not be present. Also, the texting rep function may be fully or partially automated using a module in the system and in the case of the texting rep function fully automated there may not be a need to have a human texting rep present and/or texting rep computer may not be present. For example, a semi-automated function may predict and recommend a menu of stock answers based on one or more keywords (associated with common queries) received from a customer, and a texting agent (or texting rep) may select one or more of such answers for inserting into a response (and may customize, if needed and/or allowed), and once the response is composed the texting agent (or texting rep) may send the response to the customer. Further, in the foregoing example, based on implementation preferences, such a function may be fully automated to select/compose an appropriate answer and automatically send a response to the customer. Further, a function may be implemented that may take appropriate action based on certain designated keywords received from a customer, for example, if a customer message has a keyword "opt out" or "unsubscribe" the function may automatically set a flag that excludes the customer from future connection attempt via text-based communication (and/or any other notification via text message) to the customer, and if the customer message has a keyword "opt in" or "subscribe" the function may automatically flag the customer to enable future communication via text. Based on implementation preferences, such a function may take action automatically or after notifying a user and receiving acknowledgement from the user.

Based on implementation preferences, text-based communication in the Non Real Time Based Communication System 70 (FIG. 1) may be used by a texting agent or texting rep to schedule/arrange a phone call (phone call based communication) which may be taking place between the texting rep (or texting agent) and the customer, in which case the texting rep (or texting agent) may need to have appropriate voice communication skill and playing the role of a talker (or dialing agent) in accordance with the System 70 (FIG. 1). In an embodiment of the System 70 (FIG. 1) utilizing phone call based and text based communication, one person may play the role of a texting agent and dialing agent concurrently, and one person may play the role of texting rep and talker concurrently, to execute text-based and phone call based connection attempts with a customer in the same communication session. For example, a texting agent may connect with a customer via text-based communication, and concurrently while the text-based connection is taking place the texting agent may attempt to connect with the customer on a phone call, and based on implementation preferences, transfer a phone call based connection and/or a text-based connection from being between the texting agent and the customer to being between the texting rep and the customer. In the foregoing example, within the text-based connection or phone call based connection, the point in time when the texting agent transfers the connection to the texting rep may be based on implementation preferences. Further, based on implementation preferences, the texting agent may switch from one communication mode to another communication mode (instead of having more than one connection active at the same time).

A person having ordinary skill in the art would appreciate that a potential transfer notification received by a texting rep computer System 70 (FIG. 1) for the purpose of distinguishing a customer that met the Potential Transfer Criteria, in a System 70 (FIG. 1) using text based communication, is similar to a notification received by a talker computer for the purposes of distinguishing a customer that is being dialed or to be dialed in the near future in the first exemplary embodiment of the System 70 (FIG. 1), wherein the communication with the customer is phone call based. Further, a connection transfer notification received by a texting rep computer for the purpose of distinguishing a customer that met the Connection Transfer Criteria, in a System 70 (FIG. 1) using text based communication, is similar to a notification received by a talker computer for the purposes of distinguishing a customer whose call is being transferred from being between a dialing agent and the customer to being between a talker and the customer, in the first exemplary embodiment of the System 70 (FIG. 1) wherein the communication with the customer is phone call based. It should be noted that distinguishing a customer record may be performed by one or more of many different methods such as, but not limited to, highlighting, changing colors, blinking, circling, shading, changing the border around the customer information, showing the customer information in specific area of the screen, showing the customer information in a different screen, and pointing to customer information shown in the computer. It should be noted that prior to trying to reach a customer using a phone call based communication or text based communication, or other modes of communication, it may be necessary to get prior permission from the customer if required by rules and regulations governing such communication.

One having ordinary skill in the art would understand and appreciate that the reasoning provided for the use of Non Real Time Based Communication in the System 70 (FIG. 1) may also be applicable to the use of Non Real Time Based Communication in the system 50 (FIG. 45) disclosed in the U.S. patent application Ser. No. 14/204,505. In an embodiment of the system 50 (FIG. 45) disclosed in the U.S. patent application Ser. No. 14/204,505 involving Remote Coach functionality, based on implementation preferences, the Call Handler may try to reach a customer via Non Real Time Based Communication (for example, text message based communication) and upon determining that the customer has met certain criteria (such criteria is referred to herein as the "Potential Request Criteria") during the Call Handler's connection attempt with the customer, the Third Party Call Participant computer may receive a notification (referred to herein as the "potential request notification") and potential request notification enables the Third Party Call Participant computer to distinguish a record associated with the Call Handler. It should be noted that the record associated with the Call Handler may include, but is not limited to, the first name of the Call Handler, the last name of the Call Handler, the status of the Call Handler, information related to the customer that the Call Handler is attempting to connect with/in communication with, other relevant fields associated with the Call Handler, and the like. Further, the record associated with the Call Handler may further be expanded to include the one or more customer records associated with the customer that is in connection with the Call Handler. The purpose of such distinguishing of the record associated with the Call Handler may be to notify the Third Party Call Participant that during the connection attempt to reach the customer, the customer has met the Potential Request Criteria which may indicate that there is a potential for the Call Handler to request for assistance from the Third Party Call Participant to participate in the communication between the Call Handler with the customer. It should be noted that the texting agent and/or texting rep may play the role of the Call Handler and/or Third Party Call Participant.

It should be noted that the distinguishing of the record associated with the Call Handler (expanded to include one or more customer records associated with the customer) allows the Third Party Call Participant to review information associated with the Call Handler and/or customer, including but is not limited to information associated with the Call Handler, customer data, activity/notes history, text message history including any on-going text messages in the current communication between the Call Handler and the customer, and the like, and be prepared in anticipation of a potential request for assistance. Further, it should be noted that more than one Call Handler may be communicating with customers concurrently and in which case one or more potential request notifications may enable the Third Party Call Participant computer to distinguish records associated with more than one Call Handler (and information associated with the customers that the Call Handlers are trying to connect with) associated with the potential request notifications. Further, a Call Handler may request assistance from a Third Party Call Participant, and upon such request the Third Party Call Participant computer may receive a notification (referred to herein as the "participation request notification") and a participation request notification enables the Third Party Call Participant computer to distinguish the record associated with the Call Handler (and information associated with the customer that the Call Handler has connected with). Upon such distinguishing, the Third Party Call Participant may proceed to fulfil the participation request and participate in the connectivity between the Call Handler and the customer, following the relevant steps described in the system 50 (FIG. 45) disclosed in the U.S. patent application Ser. No. 14/204,505.

A person having ordinary skill in the art would appreciate that: (i) a Phone Call Based System 70 (FIG. 1) may include one or more inbound calls that are initiated by one or more customers, wherein one or more dialing agents and/or one or more talkers may be connected with a customer via phone call based on such inbound calls, and wherein the inbound calls and/or outbound calls may be processed concurrently, and (ii) a Non Real Time Based Communication System 70 (FIG. 1) may include one or more inbound communications initiated by one or more customers via Non Real Time Based Communication mode, wherein the inbound and/or outbound communications via Non Real Time Based Communication mode may be processed concurrently. For an example of inbound Non Real Time Based Communication, in a Non Real Time Based Communication System 70 (FIG. 1) using text-based communication, one or more texting agents and/or one or more texting reps may be connected with a customer via text-based connection, wherein the customer initiated the communication as an inbound text-based communication.

One having ordinary skill in the art would appreciate that in an embodiment of a Non Real Time Based Communication System 70 (FIG. 1) utilizing text message based communication, a texting rep (or another user) may create a Service Request requesting a Vendor to deliver one or more text messages to one or more customers or leads, and based on the implementation preferences a preferred time to deliver the text message(s) may be specified in the Service Request. Based on implementation preferences, such text message(s) may be delivered in a communication session when the texting rep is present or when the texting rep is not present.

It should be noted that in a Non Real Time Based Communication System 70 (FIG. 1), the system may gather a variety of metrics including, but not limited to, number of connection attempts made to a customer, number of connections established successfully with a customer, number of connections transferred, and the like. For example, in a Non Real Time Based Communication System 70 (FIG. 1) utilizing text message based communication, the system may gather a variety of metrics such as the number of text messages sent, number of text based connections established, number of connections transferred from being between the texting agent and a customer to being between a texting rep and the customer, and the like.

One having ordinary skill in the art would appreciate, in an embodiment of system 70 (FIG. 1) or system 50 (FIG. 45) disclosed in the U.S. patent application Ser. No. 14/204,505 utilizing text based communication mode, based on implementation preferences, the texting rep computer may do one or more of the following: (i) distinguish (in a first manner) the one or more leads that are yet to be attempted for connection (which may be associated with one or more batches of leads or lead identifiers received) differently from the other leads, and (ii) distinguish (in a second manner) one or more leads that are currently being attempted for connection or selected for connection attempt next, differently from the other leads, wherein the currently being attempted for connection or selected lead is part of the one or more batches. Further, if a texting agent is involved in facilitating connection between a texting rep and a lead, the texting rep computer may distinguish (in a third manner) a lead associated with a connection that is currently being transferred from being between the texting agent and the lead to being between the texting rep and the lead, differently from the other leads. The term "distinguishing a lead" may refer to distinguishing one or more lead records associated with the lead, and based on implementation preferences distinguishing may involve highlighting in a particular way.

Businesses create/obtain/receive one or more leads (and associated lead data) through variety of sources including, tradeshows, webinars, marketing campaigns, cold calling, inbound phone call, referrals, web forms filled by website visitors (prospects, customers, past customers, and the like), visitor tracking data, social media, CRM system, other relevant information gathered from third party data sources (including but not limited to, credit information, industry information, information related to economic climate, and the like), and the like. Businesses have an important need to effectively follow-up with leads to accomplish variety of customer relationship related activities for the purposes of, including generating interest in a product/service, identifying new opportunities, making progress in the selling process, closing sale, providing services, maintaining relationships, renewing interest in the products/services, conducting surveys, improving customer satisfaction, and the like. As the volume of leads grows it may become increasingly challenging to effectively manage the lead follow-ups.

Prior systems/methods may provide solutions to create/execute one or more plans to follow-up with a lead (each such plan is referred to herein as the "contact plan"). A contact plan may include a preferred communication time, a preferred communication mode, a backup communication time, and a backup communication mode. Based on the communication mode used to contact/communicate with a lead, a contact plan may or may not require an agent to be available for communicating with the lead. As a way of an example, if the communication mode is phone call based, an agent needs to be available to talk to the lead upon the lead answering the phone, except when the implementation preference allows such communication to take place using automated telephone messaging such as interactive voice response (IVR). As a way of another example, if a communication mode is email (non-phone call based) there may not be a need to have an agent available for such communication to take place, except when the implementation preference requires an agent to review and acknowledge the email before sending. As a way of yet another example, if the communication mode involves text messaging, based on the implementation preferences, there may or may not be a need to have an available agent for such communication to take place.

The prior systems and methods do not provide an effective solution to address one or more of the following:
i) to create and/or update a contact plan based on availability of one or more agents required for contacting/communicating with one or more leads,
ii) to create and/or update a contact plan based on availability of one or more system resources required for communication with leads,
iii) to create and/or update a contact plan based on volume of leads to be contacted/communicated,
iv) to schedule/plan an agent's time based on the volume of leads to be communicated/contacted via one or more communication modes that require the agent's availability,
v) to schedule/plan for a system resource's availability based on the volume of leads to be communicated/contacted via one or more communication modes that require the system resource's availability, and
vi) to create/update a plan that enables effective planning and execution of more than one contact/communication/touch with a lead.

It is desirable to have a system and method that overcomes one or more of the foregoing limitations specified in the foregoing sections (i) through (vi), of prior systems and methods. Such a system and method overcoming the one or more of the foregoing limitations is referred to herein as the "digital communication assistant" or "DCA" which is described in detail below. Various examples and embodiments are provided to describe the foregoing limitations and how to overcome such limitations.

Based on the limitation of the prior systems/methods, when a lead is eligible to be contacted at a specific time using a specific communication mode according to a contact plan associated with the lead, if the communication mode requires an agent's availability and the agent is not available at that specific time the contact attempt may not be performed, and in turn the business objective of contacting the lead at that specific time may not be met. For example, the selected contact plan associated with a lead may propose to make a phone call (involving an agent to have a live conversation with the lead) at a preferred contact time, however, if there is a shortage of agent availability such phone call may not take place. Such fact that the contact attempt is not performed may be realized only after the execution time of the connection attempt has elapsed and still the contact attempt had not been performed. However, in an embodiment of the DCA, the system may predict the shortage of agent availability by analyzing agent availability data and update the contact plan to replace a communication mode associated with a touch that requires agent's availability (for example, phone call) with another communication mode which may not require availability of an agent (for example, via email), wherein based on implementation preferences, the update may or may not take place after receiving acknowledgement from a user of the system to proceed with changing the communication mode. In the present invention, such an update may take place ahead of time comparing with a timeline in a prior art wherein the prior art system may need to wait to execute a touch that request agent's availability (phone call in the foregoing example), figure out that the execution of that touch did not take place within the proposed time (due to agent availability shortage), and then, if needed, reactively change the communication mode to another communication mode that does not require agent availability (email in the foregoing example). Updating/replacing a touch proactively ahead of time has a significant benefit because it creates an opportunity to have the updated/replaced touch to being executed sooner than later, if necessary, and thereby the customer (or lead) may be engaged much more effectively in a timely manner (for example, in the case of replacing an agent-based phone call to a non-agent based email allows the email to be delivered sooner instead of waiting to figure out at a later time that the phone call is not taking place due to lack of agent availability and then reactively send an email). The reasoning similar to the foregoing reasoning provided for shortage of an agent's time availability may be applicable to shortage of one or more system resources required for a communication mode. It should be noted that the agent availability data may be gathered from one or more sources that may provide agent availability data such as time planning/tracking system, HR system, payroll system, an embodiment of the Scheduling App, and the like, or the agent availability data may be predicted using a computer learning method by analyzing and learning historical agent availability data.

In an embodiment of DCA, a machine learning method may be used to predict the order of connection attempts to be executed among the eligible touches that are ready for execution at any given point in time, and based on the agent availability, the connection attempts may be scheduled and/or queued up at appropriate times to yield optimal connection attempt outcomes.

Further, in the foregoing embodiment, based on implementation preferences, when the future agent availability data is not available or reliable, a computer learning method may be used to predict the future agent availability and based on such predicted agent availability connection attempts may be scheduled and/or queued up at appropriate times, to yield optimal results. It should be noted that in accordance to the DCA, if the agent availability (predicted agent availability data or agent availability from various sources) is not sufficient to execute the volume of connection attempts that need to be executed at a specific points in time, the system may update/replace one or more agent based touches with one or more touch modes that do not require agent involvement, and such update/replacement may yield optimal balance between agent availability and volume of agent based touches that are planned to be executed at various points in time, which in turn may yield optimal results. It should be noted that since the update/replacement of an agent based touch (that is predicted to be not executed in a timely manner) to a non-agent based touch may be taking place, ahead of the time, it enables the system to take action proactively which in turn may yield optimal outcome, for the given circumstance. One having ordinary skill in the art would appreciate that the term "ahead of the time" in the foregoing sentence refers to a point in time that is prior to a point in time when it is possible to confirm that the execution of a previously planned agent based touch did not take place. As a way of example, 200 leads have been scheduled to be called via phone call on Friday at 11 am, and according to the present invention the system may determine ahead of time (before the said Friday at 11 am) that only 120 leads could be called on Friday at 11 am and decide to send an email on Thursday at 2 pm.

It should be noted that the time of an agent is a reasonably valuable resource and scheduling/planning such resource optimally to accomplish lead follow-ups effectively is of high importance. The same reasoning may apply for the need to optimally schedule/plan system resource(s) associated with lead follow-ups.

When a lead is contacted, there may be a high probability that the overall business goal (such as introducing a product, convincing the lead to get interested in the product, closing a sale, and the like) is not met during that contact with the lead, and there may be a need to have one or more future follow-ups with the lead to achieve the overall business goal. Such follow-ups comprising more than one touch may not be effectively planned/executed by a contact plan taught by the prior system/method. Hence, it may be desirable to have a multi-touch marketing campaign/MTMC that enables effective planning/execution of more than one touch with a lead. In DCA, the term "follow-up" is not limited to refer only the follow-up to contact a lead initially and instead it refers to contacting the lead initially as well future follow-ups until the time when the lead reached a stage that no longer requires a follow-up (for example, when a business entity/person associated with the lead in no longer in business/alive, relationship with the lead is terminated permanently for the foreseeable future, and the like). In an embodiment of DCA, an agent (or more than one agent) may concurrently perform more than one touch associated with the same MTMC or different MTMCs. For example, based on implementation preferences, an agent may be part of a dialing session and a texting session concurrently. Further, a lead may be moved from one MTMC to another MTMC based on certain criteria being met (for example, upon execution of the last touch in a first MTMC or based on certain outcome of a touch in the first MTMC, the associated lead may be moved to a second MTMC). Based on implementation preferences, a lead may be assigned to more than one MTMC contemporaneously. Further, based on occurrence of certain event or criteria being met, a touch may be skipped or replaced, or the order of touches may be changed or a new MTMC be created and the associated lead moved to the newly created MTMC (wherein such newly created MTMC may be custom for one lead or capable of having more than one lead assigned to the newly created MTMC). It should be noted that an MTMC is capable of having one or more leads assigned to the MTMC.

Based on implementation preferences, in the context of a lead assigned to a MTMC, updating/replacing/skipping a touch, changing the order of one or more touches in the MTMC, and the like refers to such action taking place for the referenced lead, and such action may involve moving the lead to an appropriate MTMC that meets the requirement (if such appropriate MTMC does not exist, a new MTMC may be created that meets the requirement and the lead may be assigned to the newly created MTMC). One having ordinary skill in the art would appreciate that if there is only one lead assigned to a MTMC, based on implementation preferences, the foregoing update/action may be made directly to the MTMC associated with the lead (instead of creating a new MTMC or moving the lead to another appropriate MTMC), however, if there is more than one lead assigned to the MTMC, such update to the MTMC may not be suitable due to the fact it may affect the pattern of touches required for the other leads that are assigned to the same MTMC. That is, more than one lead may be assigned to the same MTMC only if the pattern of touches (number of touches, order of the touches, each touch mode, each touch execution time, and the like) of the MTMC is suitable to all such leads.

It should be noted that when more than one lead is assigned to a MTMC, not necessarily all such leads have the same touch as the next touch to be executed. Also, when a lead is assigned to a MTMC, it is not necessarily assigned in such a way to have the first touch of the MTMC to be executed as the first touch to be executed for the lead after the said assignment, for example, the lead may be assigned to the MTMC in such a way that the 3rd touch of the MTMC may be executed as the first touch to be executed for the lead after the lead is assigned to the MTMC.

The terms "marketing campaign" and "multi-touch marketing campaign" mean the same thing. It should be noted the term "update" as in the context "analyzing agent availability data and update . . . " refers to update performed by the system automatically with or without an agent (or another user) involved.

An embodiment of DCA may be implemented, with one or more of the following functionalities:

1) Creating and/or updating of one or more MTMCs by a user, wherein each MTMC comprises of one or more touches. Updating of a MTMC by a user may include but is not limited to: adding or deleting one or more touches, how many times to repeat a particular touch based on touch outcome and time gap between each such repetition, modifying the order of one or more touches, and updating attributes of one or more touches such as touch execution time, touch mode, and the like, which is further described in the immediately following sections 1(a) and 1(b).

a) The system may allow a user to specify the order of the touches within a MTMC and a preferred execution time associated with each touch. Within that order, execution time of a touch may be specified as follows: Touch execution time may be specified in variety of ways such as an absolute time, scheduled time, relative time, time range, the like, and any suitable combination thereof. A relative time may be specified with respect to occurrence of an event associated with a touch or MTMC or another event in the system that may or may not meet certain criteria (including but is not limited to, addition/removal of a lead to a MTMC, creation/deletion of a MTMC, creation/deletion/updating of a lead, timer driven event, and the like). Scheduled execution time may be based on execution of previously scheduled touch, which may be scheduled by an agent (or user), or such scheduled execution time may be decided by the system. An example of time range may be, specifying an execution time between 8 am and 8:30 am on a Friday, or between 10 minutes and 20 minutes after the addition of a lead to the MTMC, or 36 hours after the execution of the previous touch associated with the lead). Based on implementation preferences, a touch may be executed 'upon' or 'immediately' or 'concurrently' when a lead is assigned to a MTMC, and a touch may be executed 'upon' or 'immediately' or 'concurrently' when another touch is executed.

b) The system may allow a user to specify the next step action that may be executed automatically when a situation described below arises (such situation is referred to herein as the "non-optimal situation"):
   i) When a specified touch cannot be performed at the specified time or time range, for variety of reasons including, but are not limited to, due to unavailability of an agent or unavailability of a system resource because of shortage of such agent or resource, the touch attempt may not be performed, and the like.
   ii) After specified number of touch attempts if a required outcome is not achieved.
   Based on implementation preferences, when a non-optimal situation arises due to shortage of agent availability or system resource availability, the system may generate report(s) or send alert(s) to appropriate user(s) for the purpose of notifying such non-optimal situation and take appropriate next step action.
   A next step action may be including, but is not limited to, (i) skipping the touch associated with the non-optimal situation and move the lead to another touch that is part of the same MTMC or move the lead to another MTMC, or (ii) replacing the touch associated with the non-optimal situation with another touch. One having ordinary skill in the art would appreciate that there are variety of ways to select the next touch for the non-optimal situation. Based on implementation preferences, the next step action that involves replacing a touch with another, such replacement of a touch with another may be specific to a lead associated with the non-optimal situation or to the MTMC (which may affect multiple leads associated with the MTMC).

2) The system may automatically assign one or more leads to one or more MTMCs, based on (a) user defined criteria, and/or (ii) agent availability data and/or system resource availability data. For an example in the case of assigning a lead to a MTMC based on user defined criteria, leads that have a contact phone number with area code '781' may be assigned to a specific MTMC that has 'email' as the first touch with a touch execution time of immediately. For another example, leads that have a lead status field value 'new lead' and a lead source field value 'web' may be assigned to a MTMC with a name "Web Lead Welcome Campaign," and in addition to the foregoing field values matching, if the lead preferred communication mode field value matches to 'phone call' and lead preferred communication mode field value matches to 'Within 2 Hours' the lead may be assigned to a MTMC with a name "Web Lead Welcome Campaign—Phone call—2 Hours" wherein the first touch mode is phone call and the first execution time is within 2 hours from the time when the lead is submitted via web form. For yet another example, leads that have a lead status field value 'new lead' and a lead source field value 'webinar' may be assigned to a MTMC with a name 'Webinar Lead Welcome Campaign." For an example in the case of assigning a lead to a MTMC based on agent availability data, a lead may be assigned to a MTMC comprising the first touch as agent based touch only if agent availability data indicates that first touch may be executed in a timely manner, otherwise the lead may be assigned to a MTMC comprising the first touch as non-agent based that may be executed in a timely manner without waiting for an agent's availability.

3) Creating and/or updating criteria involving lead attributes/characteristics, agent attributes/characteristics, and the like that matches one or more leads with one or more agents. Such criteria may be used to assign a touch associated with a lead for execution to an agent that fits the criteria, upon the agent becoming available and the touch becoming eligible for execution based on the touch execution time.

4) Creating and/or updating criteria involving touch attributes/characteristics, agent attributes/characteristics, and the like that matches one or more touches with one or more agents. Such criteria may be used to assign a touch associated with a lead for execution to an agent that fits the criteria, upon the agent becoming available and the touch becoming eligible for execution based on the touch execution time.

5) Automatically planning and/or executing an agent based touch upon such agent based touch becoming eligible for execution and agent availability. A touch that does not require an agent during the touch execution may be executed without the need to have the agent being present, however, such execution may be based on system resource availability. It should be noted that based on implementation preferences, upon an agent becoming available, a touch may be scheduled to be executed immediately at that time and execution starts. Further, if more than one touch may be eligible based on the execution time associated with the touch, the order of the touches may be predicted based on touch specific outcome correlation data and/or marketing outcome correlation data (described elsewhere) to yield optimal outcomes.
   It should be noted, based on implementation preferences, to assign an agent based touch to an agent, the agent may need to fit the criteria that matches between lead characteristics and agent characteristics as well as fit the criteria that matches between the touch characteristics and agent characteristics.

6) Optimal Scheduling of Agents:
   System may analyze and learn any correlation that may exist among lead data, agent data, agent availability data, system resource data, system resource availability data, touch attempt data, derived touch attempt data, touch outcome data, and overall outcome that is of interest to the business (all such data is collectively referred to herein as the "<u>marketing analysis data</u>"). Such learned correlation information is referred to herein as the "<u>marketing outcome correlation data</u>," and such analysis and learning may involve plurality of leads, touch modes, touch attempts, touch outcomes, derived touch attempt data, overall outcomes, agent attributes/characteristics and other relevant information, agent availability data, system resource attributes/characteristics and other relevant information, and system resource availability data. The term "overall outcome" refers to "outcome associated with the overall objective/goal that is of interest to the business" which may include but is not limited to, getting a prospect interested in a product offering, establishing communication with a prospect, moving a lead to a specific step in the marketing/sales process, sale close, increase revenue, increase market share, improving customer satisfaction, and the like.

Further, based on implementation preferences, the data analyzed may or may not have common characteristics (for example, the analyzed data may take into account touch attempts across more than one touch modes, touch attempts associated with a specific touch mode in a specific MTMC or across all MTMCs, and the like). Touch attempt data includes but not limited to, touch mode, touch time, one or more agent information associated with the touch (if applicable), and one or more system resources information associated with the touch (if applicable). If the data analyzed is associated only with a specific touch in a MTMC without involving overall outcomes, the marketing outcome correlation data associated with such data is referred to herein as the "touch specific outcome correlation data."

Analysis and learning may take place for a group of leads having certain common characteristics or no common characteristics. One having ordinary skill in the art would appreciate that analysis and learning may take place using a variety of statistical methods, computational methods, machine learning methods, or algorithmic methods. It should be noted that the analysis and learning may be performed repeatedly (at regular time intervals or scheduled timings) to update the touch specific outcome correlation data and/or marketing outcome correlation data as new data become available.

a) System enables optimal scheduling of an agent's time by taking into account that particular agent's time availability for the execution of agent based touches, agent availability data associated with other agents, marketing outcome correlation data, and the number of agent based touches that may need to be executed at various timeslots, to yield optimal touch outcomes.

Agent's time may be scheduled to be part of a communication session, wherein agent based touches are performed during such communication session. For example, based on a specific agent's time availability, that agent may be available to be part of one or more communication sessions for a total of 2 hours between 8 am to 12noon a Tuesday, and the system may analyze the agent availability data associated with other agents during that time period, marketing outcome correlation data associated with that time period, and volume of agent based touches associated with one or more leads (applicable to that agent) that may need to be executed during that time period, and decide to schedule the agent's time between 8 to 8:30, 9 to 10, and 11:30 to 12, and such scheduling may yield optimal performance for the said availability of the agent for 2 hours total. It should be noted in the foregoing example, without scheduling the 2 hours during the system suggested timeslots, if the said agent schedules the available 2 hours at randomly selected time slots that may not be yield optimal performance.

b) System may show the optimal agent availability requirement (number of agents required) on a given timeslot based on the number of agent based touches (appropriate for a given group of agents with similar characteristics) that may need to be executed according to the execution times of touches associated with various MTMCs, and marketing outcome correlation data. This may allow an agent (or another user) to check the optimal agent availability requirement for various timeslots and make that agent's time available in appropriate timeslots for communication session (s) to yield optimal outcomes. If such feature is not available, the agent may randomly make the agent's time available to the system that may not match with the optimal agent availability required for optimal outcome, which in turn may lead to non-optimal scheduling of agent's time which may yield non-optimal outcomes. It should be noted that as an agent's time is scheduled for a new communication session, the system may keep updating the agent availability for various timeslots, after taking into account the predicted number of agent based touches to be completed by the newly scheduled communication session.

c) When a communication session is taking place, for a given touch mode, the order of the touches (associated with one or more leads) that are ready for execution may be dynamically updated by the system based on the touch specific outcome correlation data, marketing outcome correlation data, overall outcome, and correlation between touch specific outcome correlation data and overall outcome. Such order of execution may further be based on user input and/or prioritization information associated with each lead.

Based on implementation preferences, one or more of the above functionality described in the above sections (1) through (6) may be fully or partially automated. The following sections (i) through (v) describe examples of such automation (with or without partial involvement of a user of the system):

i) creating and/or updating a MTMC, as described by the above section (1) above. Such creating/updating of the MTMC may be based on touch specific outcome correlation data, marketing outcome correlation data, and correlation between touch specific outcome correlation data and overall outcome data.

Touch specific outcome correlation may help to update a touch to yield optimal outcomes at that specific touch, however, the overall outcome may or may not be optimal. For example, the first touch in a MTMC may be sending an email and the corresponding touch outcomes may appear to be optimal and touch specific outcome correlation data shows strong justification to have the email as the first touch, however, the overall outcome may not be as good as when the first touch is a phone call.

ii) creating and/or updating a criterion (instead of allowing a user to define the criterion) to assign a lead to a MTMC, as described by the above section 2. Such creating and/or updating of criteria may be based on correlation learned among two or more of the following: lead characteristics, MTMC characteristics, touch specific outcome correlation data, and marketing outcome correlation data.

iii) creating and/or updating a criteria to assign an agent based touch to an agent, as described by the above section 3. Such creating and/or updating of criteria may be based on correlation learned among two or more of the following: agent characteristics, lead characteristics, touch specific outcome correlation data, and marketing outcome correlation data.

iv) executing one or more touches, as described by the above section 4.

v) allowing an agent sign-in to the system without pre-scheduling the agent's time as described by the above section 5, and optimize the execution of agent-based touches.

In an embodiment of DCA, the system may allow a user to create/update (and/or automate such creation/updating based on correlation learned among two or more of the following: lead characteristics, MTMC characteristics, touch specific outcome correlation data, and marketing outcome correlation data): (i) criteria that matches between lead attributes/characteristics and system resource attributes/characteristics, and/or (ii) criteria that matches between touch attributes/characteristics and system resource attributes/characteristics. Further, the system may enable automatically planning and/or executing a non-agent based touch upon such non agent based touch becoming eligible for execution and system resource availability. One having ordinary skill in the art would appreciate that when agent availability is taken into consideration to execute an agent based touch, based on implementation preferences, system resource availability may or may not be taken into consideration.

It should be noted that whenever there is a reference to the "update" function, the update function may include the delete function. One having ordinary skill in the art would appreciate that an embodiment of DCA may include criteria to match between agent characteristics and one or more of the following: touch characteristics, MTMC characteristics, and system resource characteristics. Further, an embodiment of the DCA may include one or more criteria including, but not limited to, criteria to match between system resource characteristics and one or more of the following: lead characteristics, touch characteristics, and MTMC characteristics. In another embodiment of the DCA, one or more criteria may exist that maps suitable matches among two or more of the following: MTMC characteristics, touch characteristics, lead characteristics, agent characteristics, and system resource characteristics.

One having ordinary skill in the art would appreciate that based on implementation preferences, the System 70 (FIG. 1) may create and keep updating the priority information associated with a customer, wherein the priority information may be stored in one or more fields associated with the customer, and wherein the priority information may be based on the activity history of the lead and/or marketing analysis data (defined elsewhere in this specification). Such priority information is referred to herein as the "priority information." It should be noted that the activity history of the customer refers to variety of activities associated with the customer including, but not limited to, customer activities tracked via a marketing system, web browsing history, whitepaper downloads, webinar attendance, tradeshow attendance, phone call, email, text and other electronic message communication, outcomes of communication attempts via various communication modes, face-to-face meeting, proposal sent, purchase history, how often a particular product was purchased with what quantify and price, and the like.

All or a portion of the functionality associated with DCA may be implemented as a module in the System 70 (FIG. 1), or as a separate stand-alone system. It should be noted that in a context referring to an embodiment of DCA, the term "system" may refer to: (i) a separate stand-alone system that embodies one or more features/benefits of DCA, or (ii) an embodiment of the System 70 (FIG. 1) wherein one or more features/benefits of DCA are implemented as a module. In an embodiment of DCA as a module in the System 70 (FIG. 1), based on implementation preferences, (i) a talker or dialing agent may act as an agent to execute one or more phone call based touches, and (ii) a texting rep or texting agent may act as an agent to execute one or more text-based touches.

In an embodiment of DCA, the system may use any information that is directly or indirectly associated with a lead, and perform one or more of the following functions: (i) automatically select the lead for one or more connection attempts, (ii) automatically select one or more communication modes that are predicted to provide optimal outcome of connection attempt, (iii) automatically start the connection attempt via a selected communication mode, upon meeting the criteria to start such connection attempt via such communication mode, and (iv) the like. The words "any information" in the foregoing sentence refers to information that may include, but is not limited to, activity history information associated with the lead, priority information, geographical location of the lead based on the physical address associated with the lead, geographical location of the lead gathered from a GPS (Global Positioning System) that provides the recent geographical location of the person associated with the lead, one or more attributes/fields associated with one or more lead records associated with the lead, preferred communication mode requested by the lead, other components of the relevant marketing analysis data, current date and time, time zone of the lead, criteria specified by one or more users of the system for selecting the lead for connection attempt, criteria specified by one or more users of the system for allowing the system to start a connection attempt via a specific communication mode, and the like. It should be noted that based on a recent geographical location of a lead gathered from a GPS, the system may select the lead and prioritize for communication attempt to engage the person associated with the lead when the person is in a specific geographical vicinity, wherein the said specific vicinity may be based on certain criteria defined by a user. Based on implementation preferences, the criteria to start a connection attempt via a particular communication mode may include, but is not limited to, configuration settings associated with whether the system is allowed to start a dialing session for phone call based communication without the availability of an agent, configuration settings associated with whether the system is allowed to start a texting session without the availability of a texting rep, if allowed to start a texting session without the availability of a texting rep how many concurrent connection attempts or connections via text may take place concurrently, and the like, and any combination thereof. As a way of an example, in an embodiment of the DCA implemented as a module in the System 70 (FIG. 1), a talker (acting as an agent) may configure the settings to allow the system to start a dialing session only when at least one talker is available for the dialing session, however, the talker may also play the role of a texting rep and the settings may allow the system to start a texting session with up to 5 concurrent connection attempts when no texting rep is available and up to 20 concurrent connection attempts for each available texting rep in the texting session wherein each texting rep is capable of handling 2 text-based connections concurrently, or the like.

Based on implementation preferences, in the foregoing embodiment, there may be one or more communication sessions that are executed concurrently, and the leads may be delivered in one or more batches to each communication session (wherein each batch may consists of one or more lead records or associated identifiers). One having ordinary skill in the art would appreciate, in such embodiment, if a dialing agent (or a texting agent) is involved to assist in establishing communication between the talker/texting rep and the lead as part of a communication session, the one or more features/benefits of the System 70 (FIG. 1), such as a dialing agent/texting agent trying to connect with a lead, and upon connecting with the lead, transferring the connection from being between the dialing agent/texting agent and the lead to being between the talker/texting rep and the lead. Further, there may be more than one dialing agent/texting agent involved concurrently in a communication session to assist in establishing connection between a talker/texting rep and leads, and the talker/texting rep computer may be enabled to distinguish the one or more lead records associated with one or more leads that are being attempted for connection or scheduled to be attempted for connection. Further, upon transferring a connection from being between a dialing agent/texting agent and a lead to being between a talker/texting rep and the lead, the talker/texting rep computer may be enabled to distinguish differently the one or more lead records associated with the lead that is being transferred. It should also be noted that based on implementation preferences, the dialing agent or texting agent function may be fully or partially automated.

One having ordinary skill in the art would appreciate that there are variety of ways of distinguishing a record from other records including, but not limited to, highlighting, shading, changing border, blinking, showing the data in a specific area of the screen, showing the data in a different screen, and the like. It should be noted that the word "connection" in the foregoing paragraphs refers to connecting via a communication mode, including but is not limited to, phone call based communication, and non-phone call based communication. It should be noted that, at any given time, the current date and time may be used along with marketing analysis data to predict whether the chance of the connecting with the lead is optimal at that time, which communication mode for connecting at that time is optimal, and/or the like.

One having ordinary skill in the art would appreciate that in an embodiment of the DCA there may be more than one connection/connection attempts utilizing more than one communication mode taking place concurrently.

It should be noted that the term "event" means any event that may act as a trigger including, but not limited to, timer-based trigger, criterion being met, and the like. An example of a criterion may be the number of communication attempts exceeding 10. Based on implementation preferences, in an embodiment of DCA, the functionality/workload may be distributed among more than one module to update/maintain certain data in the system, for the purposes of executing the functionality of DCA at a faster speed.

As a way of another example, an embodiment of DCA may be implemented to follow-up one or more leads once in a given time period, for example, 90 days, continuously until the lead is moved to another touch or MTMC based on occurrence of certain event or a criteria being met, as follows: The lead is assigned to a MTMC having a first touch specifying that the preferred contact method is phone call, preferred execution time is 90 days after the time when the lead reaches the first touch, wherein the time when the lead reaches the first touch is stored in a specific attribute. Upon the criteria to start a dialing session associated with an agent is met, the system selects the leads associated with the first touch who were last connected via phone call based communication more than 89 days ago, and start dialing such selected leads in the order of priority based on marketing analysis data and current date and time. Further, in the foregoing embodiment, based on implementation preferences, a Prior Marketing Automation System or an Enhanced Marketing Automation System (described in the U.S. patent application Ser. No. 14/204,505) may maintain a lead score for each lead and the system may utilize such lead score (optionally, along with other information) to select a lead for connection attempt at a specific time of the day. Upon successfully connecting with the lead via phone call, if the outcome of the phone call indicates that the lead needs to be contacted after another 90 days, the system may update to repeat the first touch (and this cycle of calling once in 90 days may be repeated many more times as necessary). It should be noted that in the foregoing embodiment, based on implementation preferences, the system may keep track of unsuccessful connection attempts and automatically move the lead, whose unsuccessful connection attempts exceeded a number configured in the system, to another MTMC wherein the lead may be attempted for connection via non-phone call based communication mode once in 30 days.

Further, in an embodiment of DCA, a module may be implemented that creates and/or keeps updating certain information, referred to herein as the "derived information," which may be utilized for selecting and/or prioritizing a lead for executing a touch. It should be noted that derived information may include but is not limited to the priority information, and derived information may be based on analysis of various information directly or indirectly associated/relevant to a lead and/or one or more third party systems (including but not limited to, third party CRM system, third party system that provides variety of market intelligence, and the like). Further, the derived information may be stored in one or more fields and/or indexes to optimize the speed of execution.

One having ordinary skill in the art would understand and appreciate that in an embodiment of DCA, the system may be configured to queue up leads associated with one or more touches and execute the one or more touches in one or more communication sessions concurrently, to communicate with the leads via one or more communication modes, and optionally the system may be implemented to have a dashboard view that allows a user of the system to interact and manage such one or more communication sessions. Further, leads may be delivered in one or more batches to each communication session (wherein each batch may consist of one or more lead records with necessary fields to perform the touch or each batch may consist of one or more identifiers that may be used to identify the associated one or more lead records). It should be noted that after a lead is delivered or queued up for an agent, based on the pace of touch execution if the system learns/predicts that the agent may not be able to execute the connection attempts in a timely manner for a lead queued up for the agent, the system may withdraw the lead from the queue of that agent (and/or communication session) and assign to the queue of another agent (and/or communication session). One having ordinary skill in the art would appreciate there may be more than one agent associated with a queue or communication session. It should be noted that based on the implementation preferences, the reference to "queue up for the agent" may mean to "assign to a queue or communication session associated with the agent." Further, based on implementation preferences, leads queued up to an agent may or may not be executed as part of a communication session. It should be noted that based on implementation preferences, an agent's computer may be enabled to do one or more of the following: (i) show and/or distinguish (in a particular manner) one or more lead records associated with the leads waiting in the queue associated with the agent differently from other lead records, (ii) allow the agent to update one or more fields (including priority information fields) associated with leads waiting in the queue and/or change the order of the leads waiting in the queue, (iii) select the next lead for connection attempt based on the update made by the agent, and (iv) distinguish (in a another manner) the lead that is currently selected/assigned to the agent for connection attempt (or scheduled to be the next) differently from the other leads. It should also be noted that based on implementation preferences, during a communication session associated with an agent, the agent may have capability to: view (or sonically sense) one or more lead records, update one or attributes associated with a lead record (and connection attempt data, connection attempt outcome data), and such update may change the current or future leads associated with one or more batches and/or the order of those leads. Further, based on implementation preferences, upon assigning a lead to an agent, the system may initiate communication automatically. One having ordinary skill in the art would appreciate that in an embodiment of DCA having more than one computers executing the one or more functions associated with DCA, based on implementation preferences there may be one or more notifications taking place, wherein each notification may enable the one or more computers receiving such notification to accomplish one or more actions (for example, including but not limited to, receiving a lead record, showing a lead record, distinguishing a lead record, and the like).

In an embodiment of the system 70 (FIG. 1), DCA may be implemented as a module, wherein an agent may be in a communication session and one or more touches that are eligible for execution are assigned to such a communication session.

It should be noted that selecting an available agent to execute a touch attempt may be implemented in more than one ways. For example, in the case of touch mode being a phone call, the system may first make a call to the agent to establish phone communication with the agent, make a call to the lead to establish phone communication with the lead, and then connect them together thereby allowing communication between the agent and the lead. In another way, the system may first make a call to the lead, make a call to the lead, and then connect those two calls together. In yet another way, the system may pre-establish a phone call connectivity with the agent (and maintain such pre-established phone connectivity for the entire communication session), after making the call to the lead the system may wait until the lead answers the phone, and then connect with the phone call with the lead with the pre-established phone call with the agent. Further, the system may enable the agent's computer to provide necessary lead data to the agent via visually, sonically, and other means such as sensors and/or physical computer interfaces that may communicate certain message to an agent.

Figure 7:
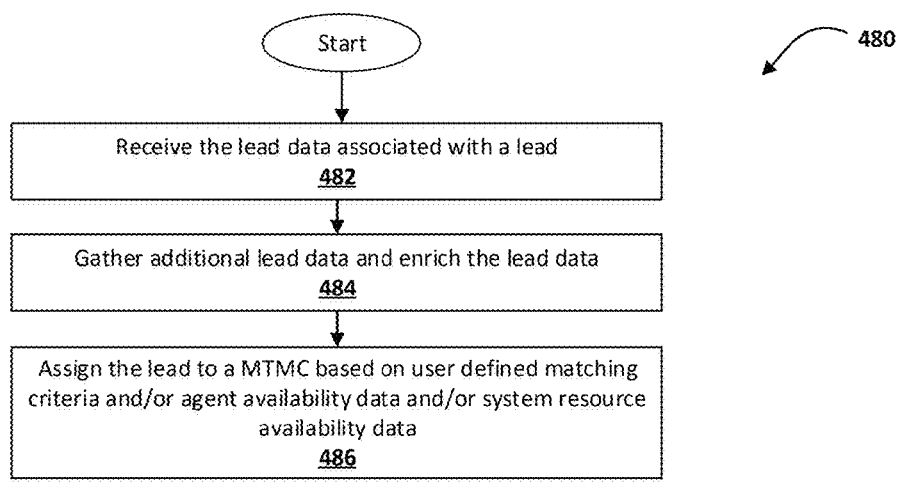
FIG. 7 is a flowchart illustrating actions performed when a lead is assigned to a multi-touch marketing campaign (MTMC), in accordance with an embodiment of a Digital Communication Assistant (DCA).

FIG. 7 is a flowchart illustrating actions performed when a lead is assigned to a MTMC, in accordance with an embodiment of DCA. As shown by block 482, the lead data associated with a lead is received by the system. As shown by block 484, additional lead data associated with the lead is gathered and the lead data is enriched. As shown by block 486, the lead is assigned to a MTMC based on user defined criteria and/or agent availability data and/or system resource availability data.

Figure 8:
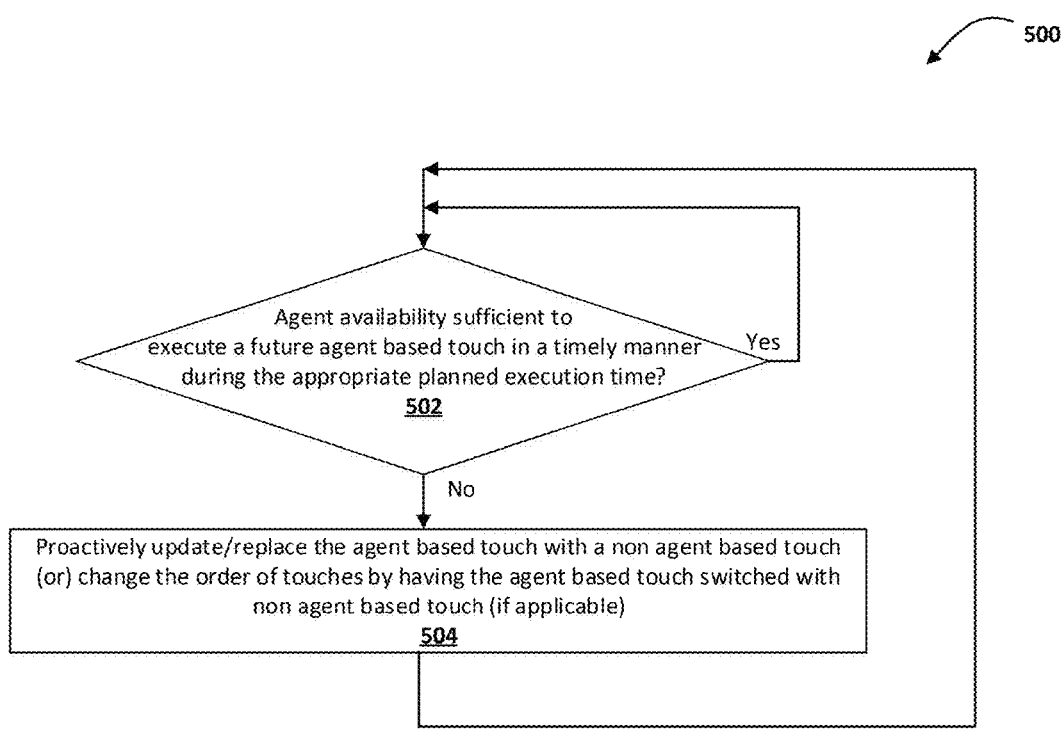
FIG. 8 is a flowchart illustrating actions performed when a touch/connection attempt or a MTMC getting updated proactively based on agent availability, in accordance with an embodiment of a DCA.

FIG. 8 is a flowchart illustrating actions performed when a touch/connection attempt or a MTMC is getting updated proactively based on agent availability, in accordance with an embodiment of DCA. As shown by block 502, the system checks whether sufficient agents are available to execute a future agent based touch in a timely manner during the appropriate planned execution time. As shown by block 504, upon determining that there is not sufficient agents available for executing the agent based touch in a timely manner (during the appropriate planned execution time), the system proactively (i) updates/replaces the agent based touch with a non-agent based touch, or (ii) if applicable, change the order of the touches by having the agent based touch switches with a non-agent based touch.

Figure 9:
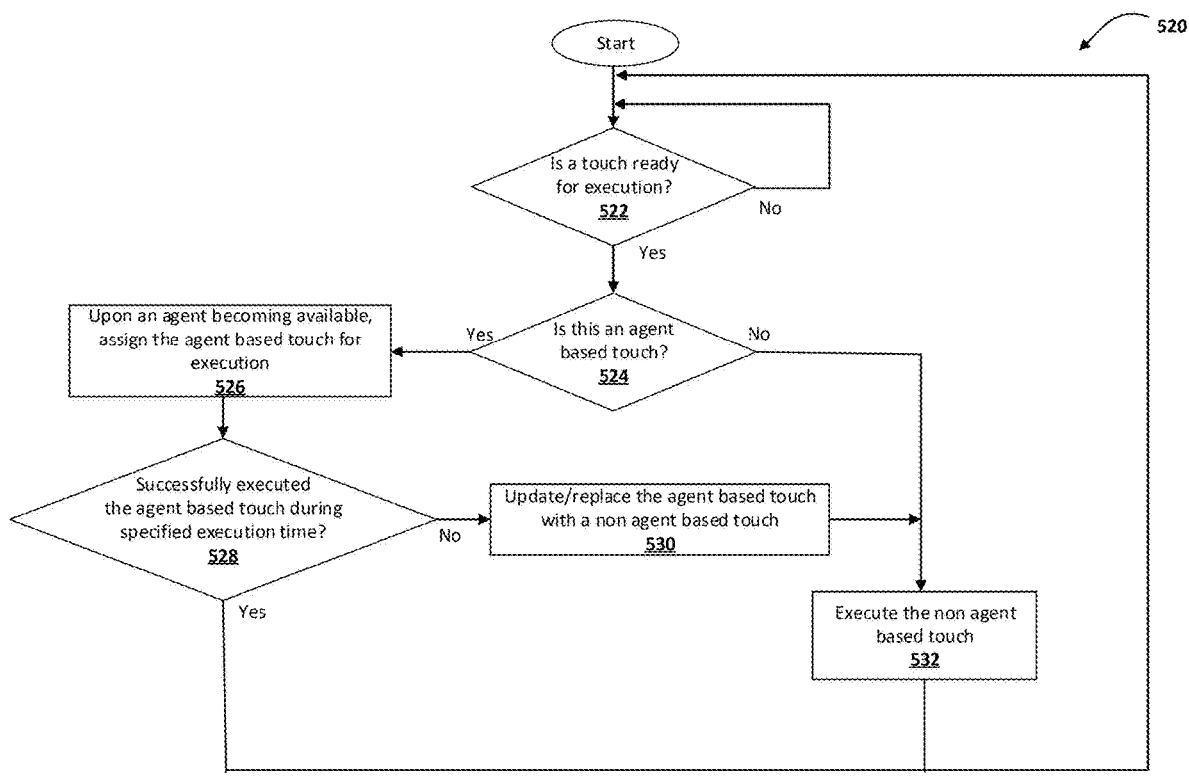
FIG. 9 is a flowchart illustrating actions performed when a touch/connection attempt is executed, in accordance with an embodiment of a DCA.

FIG. 9 is a flowchart illustrating actions performed when a touch/connection attempt is executed, in accordance with an embodiment of DCA. As shown by block 522, the system checks whether a touch is ready for execution. As shown by block 524, upon determining that the touch is ready for execution, the system further checks whether the touch is an agent based touch (that requires an agent's involvement for execution, for example, phone based touch). As shown by block 532, if the touch is non agent based touch, the non-agent based touch is executed. Based on implementation preferences, before executing the non-agent based touch the system may further check whether there is enough system resources to execute the non-agent based touch and if affirmative proceed to execute the non-agent touch. As shown by block 526, upon determining that the touch is an agent based touch, the system assigns the agent based touch for execution. One having ordinary skills in the art would appreciate that such execution may be performed in a variety of ways, for example, the agent based touch may be queued to be part of a communication session (with appropriate communication mode) in an embodiment of the system 70 (FIG. 1). As shown by block 528, the system checks whether the agent based touch is executed during the specified execution time (as per the touch execution time specified by the associated MTMC). As shown by block 530, if the system determines that the agent based touch has not been executed during the specified execution time, the system may update/replace the agent based touch with a non-agent based touch or if applicable, change the order of the touches associated with the MTMC by having the agent based touch switches with a non-agent based touch.

Figure 10:
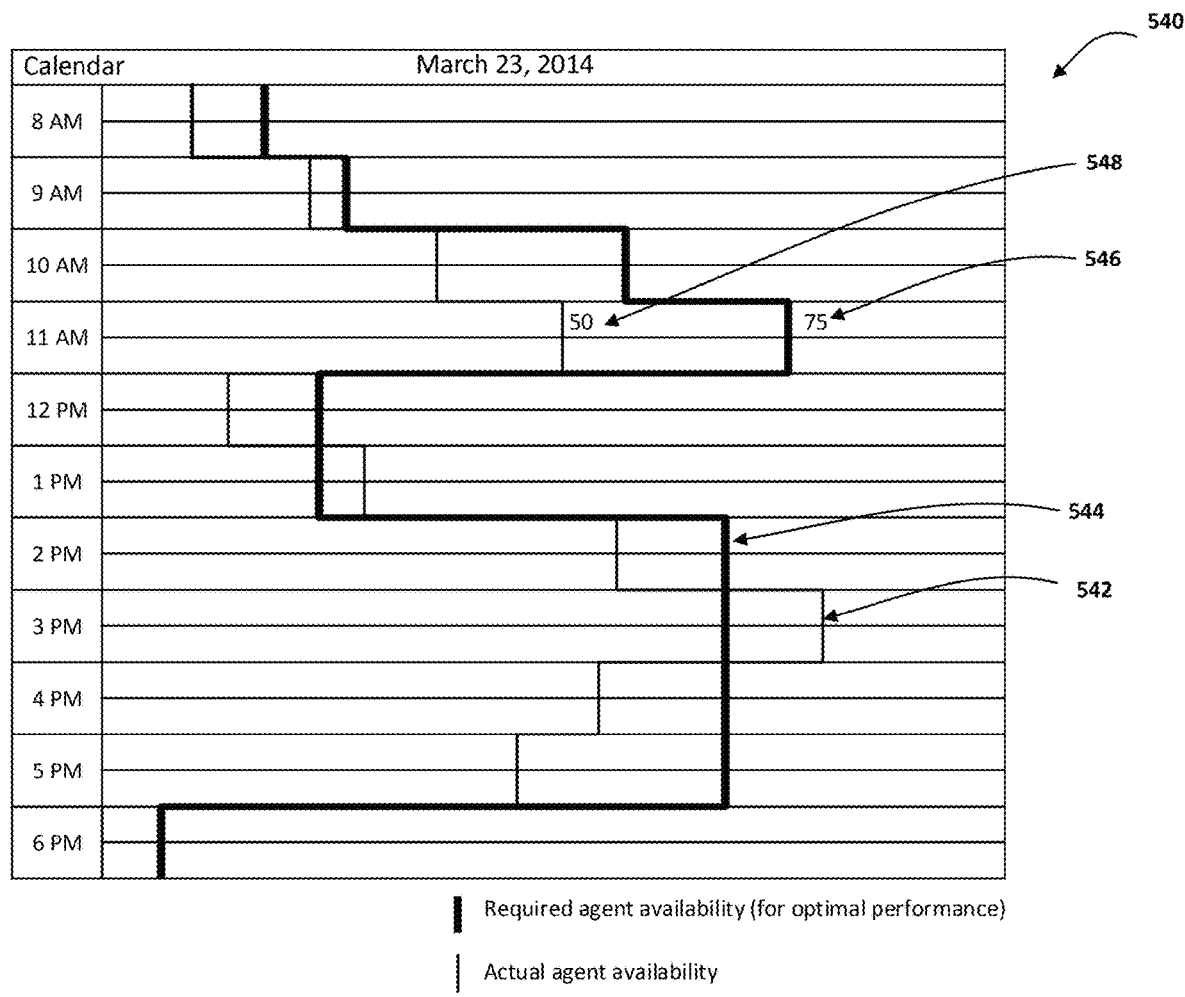
FIG. 10 is an exemplary screen view illustrating an interface showing the required agent availability to execute agent based touches (for optimal performance) versus the actual agent availability, for various timeslots, using a combination of bar and line graph, in accordance with an embodiment of a DCA.

FIG. 10 is an exemplary screen view illustrating an interface showing the required agent availability/required number of available agents to execute agent based touches (for optimal performance) versus the actual agent availability/actual number of available agents, for various timeslots, using a combination of bar and line graph, in accordance with an embodiment of DCA. As shown by FIG. 10, for each time slot on Mar. 23, 2014, the actual agent availability data is shown using a thinner line 542 and the required agent availability data is shown using a thicker line 544. For example, for the time slot from 11 am to 11:30 am, the required number of agents needed is 75 (shown by 546) to execute the agent based touches during that time (and thereby yielding optimal performance) and however only 50 (shown by 548) number of agents actually available during that time.

The foregoing example indicates that there is a shortage of the number agents by 25 (75 minus 50) for the said time slot. Based on implementation preferences, in accordance with DCA functionality, though the system may proactively keep updating (for example, replacing an agent based touch with a non-agent based touch, switching an agent based touch with a non-agent based touch) the touches in a way to maintain only optimal number of agent based touches that can be executed successfully during a time slot, the system may keep track of the required agent availability versus actual agent availability data to draw the bar/line graph as shown in FIG. 10. It should be noted that a user of the system may use the information provided by bar/line graph as shown in FIG. 10 to adjust the actual agents available for each time slot and thereby achieve optimal results (for example, executing the required number of agent based touches and reducing the overall agent cost).

FIG. 11 is an exemplary screen view illustrating an interface to specify criteria associated with lead characteristics to assign one or more leads to a MTMC, in accordance with an embodiment of DCA. As shown by FIG. 11, the area of the screen 562 allows a user to specify the criteria to select one or more leads (in this example, the criteria specified is: Area Code=978 AND State=MA AND Lead Status=New AND Lead Source=Tradeshow). The control 564 allows the user to delete the corresponding criterion by clicking "x" or add a new criterion by clicking "+." The selected one or more leads may be assigned to the MTMC selected/specified in the drop down list control 566.

Figure 12:
FIG. 12 is an exemplary screen view illustrating an interface of a talker communicating with leads using phone call based communication, wherein dialing agent functionality is fully automated, wherein the leads are selected for phone call based communication based on talker/agent availability, in accordance with an embodiment of a DCA.

FIG. 12 is an exemplary screen view illustrating an interface provided to a talker communicating with leads using phone call based communication, wherein dialing agent functionality is fully automated, wherein the leads are selected for phone call based communication based on talker/agent availability, in accordance with an embodiment of DCA. As shown by FIG. 12, the checkbox 582 allows a user to notify the system (by checking off the checkbox) that the user is interested in phone call based communication session, and the user may start the session by clicking the start session button 584. The tabular view 586 shows the list the leads that are selected and queued up for phone call based communication. The lead record that is distinguished with a lighter shade (shown by 588) is associated with the lead that is currently being dialed.

Figure 13:
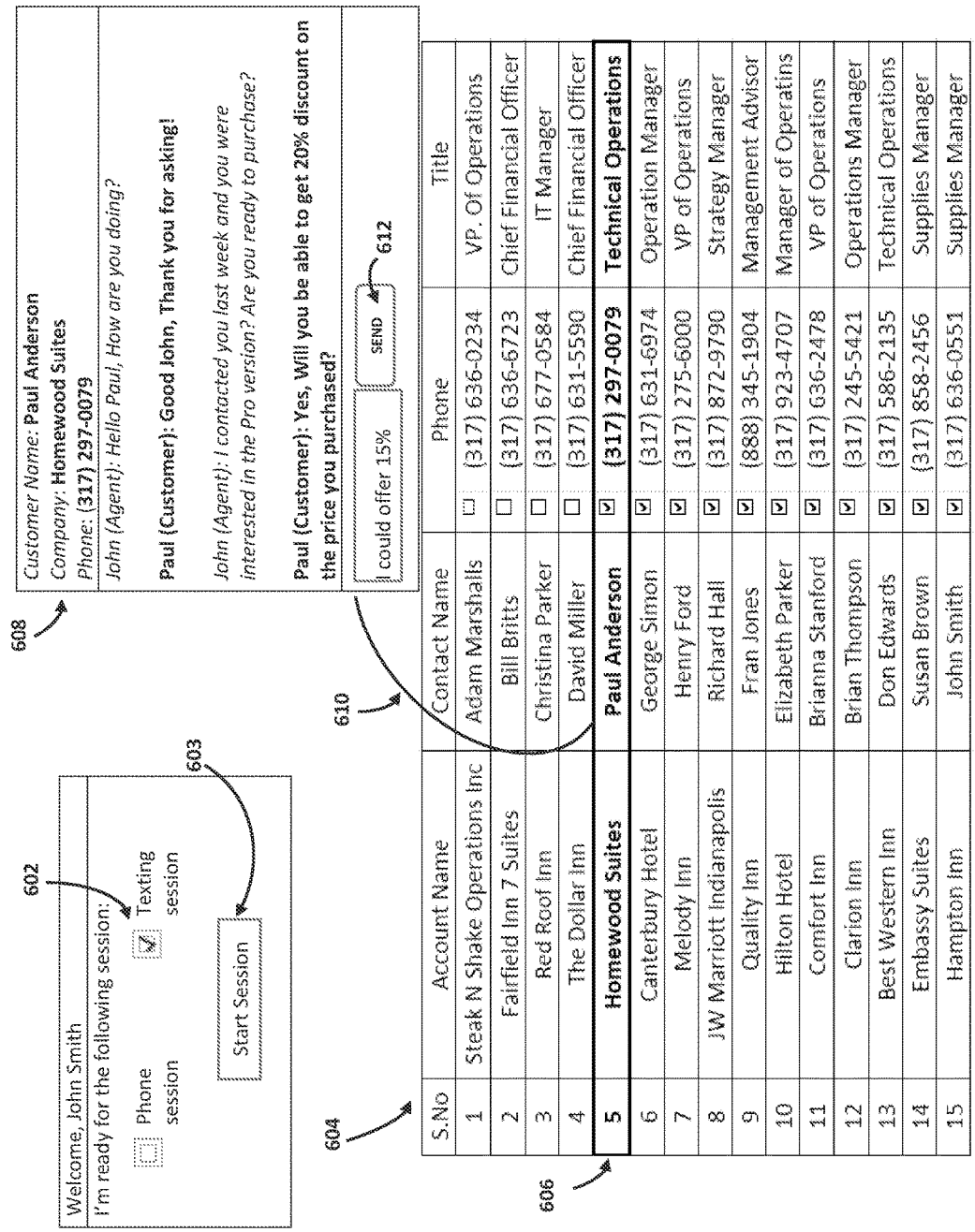
FIG. 13 is an exemplary screen view an interface of a texting rep communicating with leads using text based communication, wherein texting agent functionality is fully automated, wherein the leads are selected for text based communication based on texting agent/agent availability, in accordance with an embodiment of a DCA.

FIG. 13 is an exemplary screen view an interface provided to a texting rep communicating with leads using text based communication, wherein texting agent functionality is fully automated, wherein the leads are selected for text based communication based on texting agent/agent availability, in accordance with an embodiment of DCA. As shown by FIG. 13, the checkbox 602 allows a texting rep to notify the system (by checking off the checkbox) that the texting rep is interested in text based communication session, and the texting rep may start the session by clicking the start session button 603. The tabular view 604 shows the list the leads that are selected and queued up for text based communication. The lead record that is distinguished with a lighter shade (shown by 606) is associated with the lead that is currently being communicated via text based communication. In addition, a window 608 shows the text messages exchanged between the texting rep and the said lead. The line 610 shows the customer record associated with the text message window 608. The texting rep may send a text message to the said lead by clicking the send button 612.

One having ordinary skill in the art would appreciate that the System 70 (FIG. 1) may accept updates/inputs dynamically from a user during a dialing session, texting session, or communication session using a different communication mode. Such update/input is referred to herein as the "user input" which may include, but is not limited to, updates to one or more fields storing information associated with priority information, do-not-call, allowed-to-call, do not call until, phone number, update to the order of records shown in the screen, and the like. It should be noted that based on the context the words "update" and "input" may be used to mean the same thing. The System 70 (FIG. 1) may use all or some portion of the user input to make a decision (or predict outcomes/results) on one or more issues/matters, including but not limited to, selecting one or more leads to make connection attempt next, the order in which such leads may be processed to make connection attempts, how many times to attempt to connect with such one or more leads, an optimal time period to schedule one or more communication sessions for a given list of leads, an optimal communication mode, and the like (each such issue/matter/problem that requires a decision is referred to herein as the "vital issue"). Further, the decision for a vital issue may be time sensitive, that is, the decision for the same vital issue may be different at different time. For example, for yielding optimal outcomes, the order in which a list of leads may be called at 9 am on a Tuesday may be different from the order at 10 am on Tuesday. It should be noted that the communication mode utilized for a connection attempt may be phone call based or non-phone call based. Further, it should be noted that if the system uses a non-phone call based communication mode, any reference to the word "call" or "phone call" may be interpreted as "connect or communicate or link using the non-phone call based communication mode."

A connection attempt may have one or more attributes referred to herein as the "connection attempt data," which may include but not limited to communication mode used for the connection attempt, execution time of the connection attempt, and information associated with an agent (or user) that was involved in the connection attempt (if such user is involved or applicable). It should be noted that execution time of a connection attempt may include all aspects of time when the connection attempt is executed, including but not limited to, time of the day, day of the week, week of the month, month of the year, quarter of the year, or the like. One or more attributes associated with the outcome of a connection attempt is referred to herein as the "connection attempt outcome data." Examples of connection attempt outcome data may include but not limited to: lead answered the call, went to voice mail, no answer, wrong phone number, other connection disposition, and the like.

One or more attributes may be derived from connection attempt data and/or connection attempt outcome data associated with a particular connection attempt or more than one connection attempt, and such one or more derived attributes is referred to herein as the "derived connection attempt data." Connection attempt data, connection attempt outcome data, and derived connection attempt data, are collectively referred to herein as the "historical connection intelligence data" or "HCID." It should be noted that the term "historical connection intelligence data" or "HCID" may refer to data associated with more than one connection attempt, unless specifically referring a specific connection attempt. Further, in certain contexts describing an embodiment, for the purposes of emphasizing the inclusion of the connection attempt outcome data as part of the data referenced, it may be explicitly specified though the connection attempt outcome data is implicitly included. Also, in certain contexts, the connection attempt outcome data may be excluded from the data that is being referenced by explicitly specifying such exclusion. It should be noted that HCID may be updated as new connection attempt data becomes available.

It should be noted that the terms "communication attempt data," "contact attempt data," "connection attempt data," and "touch attempt data" may be used interchangeably to mean the same thing, and the terms "derived communication attempt data," "derived contact attempt data," "derived connection attempt data," and "derived touch attempt data" may be used interchangeably to mean the same thing.

Examples of lead data attributes may include, but not limited to: (i) phone area code or a geographic region the lead belongs to, (ii) a specific industry the lead belongs to, (iii) persona (related to title, job function, and the like) of the lead, (iv) lead type (such as, B2B, B2C, and the like), (v) size of the business the lead belongs to (such as, small, small to midsize, enterprise, and the like), and the like.

Further, in a context where more than one connection attempt is taken into account (for example, to arrive at the derived connection attempt data), such more than one connection attempt may be associated with the same lead or group of leads having commonality or no commonality. As a way of providing an example for a derived connection attempt data attribute, area code may be a derived connection attempt data attribute derived from a phone number attribute. For another example, connection rate associated with a connection attempt in a particular hour may be a derived connection attempt data attribute which is calculated by dividing the number of connection attempts that resulted in establishing successful connections (in the case of phone call based communication, the number of phone calls answered by the leads) during that hour with the total number of connection attempts made during that hour. For yet another example, meeting scheduled rate associated with a connection attempt in a particular hour may be a derived connection attempt data attribute which is calculated by dividing the number of connection attempts that resulted in meetings scheduled during that hour by the total number of connection attempts made during that hour. In the foregoing example, based on implementation preferences, the number of meetings scheduled may be arrived at by counting the number of connect attempts that resulted in a connect attempt outcome/disposition having a value of "meeting scheduled."

One having ordinary skill in the art would appreciate that one or more modules in the System 70 (FIG. 1) may utilize HCID and/or marketing analysis data (defined elsewhere in this specification) to make decision on vital issues and/or update one or more fields of the lead records associated with the prioritization information. Based on implementation preferences, the System 70 (FIG. 1) may use user input in addition to HCID and/or marketing analysis data (defined elsewhere in this specification), or instead of HCID to make decision on vital issues.

It should be noted that the HCID may take into account the data associated with connection attempts made by the System 70 (FIG. 1) and/or connection attempts made outside of the System 70 (FIG. 1). One having ordinary skill would appreciate that the HCID may be derived from market intelligence pertaining to historical rate of connection attempts that resulted in establishing successful connection with leads (in the case of phone call based communication, the number of phone calls answered by the leads, and any associated trends. Such market intelligence may be gathered/derived from various sources including, but not limited to, connection attempt data obtained from the System 70 (FIG. 1) and/or other third party systems.

Based on implementation preferences, one or more attributes of HCID and/or marketing analysis data (defined elsewhere in this specification) may be used to derive intelligence that enables the System 70 (FIG. 1) to predict decisions associated with the vital issues that may yield optimal results. One having ordinary skill in the art would appreciate that HCID and/or marketing analysis data (defined elsewhere in this specification) may be used to train one or more machine learning methods to learn correlation/pattern/relationship among various attributes and use such learning to predict decisions/answers to the one or more vital issues (including but not limited to outcomes of future connection attempts). For example, correlation between connection attempt execution time and connection attempt outcome data for a particular communication mode may be learned by a computer learning method and such computer learning method may be used to predict the connection attempt outcome data associated with various connection attempt execution times in the future, time to execute connection attempts to yield optimal outcomes, and the like. It should be noted that the term "machine learning method" means to include, but is not limited to, machine learning or statistical learning method, model, algorithm, technique, approach, apparatus, and system; and based on the context it may refer to plurality of machine learning methods.

The one or more attributes of HCID, marketing analysis data (defined elsewhere in this specification), and other relevant data used to train a machine learning method is referred to herein as the "training data." One having ordinary skill in the art would appreciate that there are many conventional machine learning methods available that may be trained to provide prediction. Based on implementation preferences, the attributes of HCID may include other attributes (directly or indirectly associated with connection attempt data and lead data) that are not listed herein, and such attributes may be gathered in the System 70 (FIG. 1) or from sources outside the System 70 (FIG. 1). Further, based on implementation preferences, the information associated with an attribute may be stored in one or more fields that are stored locally or remotely (such as a computer or storage device located remotely, in the cloud, and the like) or a combination thereof, and stored in one or more storage format, medium, and devices.

One having ordinary skill in the art would appreciate that the training data may be illustrated in a matrix format having rows and columns, as follows: One may use a notation n to represent the number of distinct observations or instances or data points in the training data (referred to herein as the "training data instance" or "training instance"). A set of training data instances may be referred to herein as the "training data set." Each training data instance may have m number of variables or attributes that may be used in making predictions. In the context of machine learning method, the term "input," "input variable" and "input attribute" may be used interchangeably to mean the same thing, and the word "output" is meant to "output variable on which one wishes to make prediction" based on a given input. For example, an input may have one or more attributes associated with a future connection attempt data and the associated lead data, the output may be the outcome of such future connection attempt which one wishes to predict using a machine learning method. It should be noted that based on implementation preferences, a set of training data instances used to train a machine learning method may be associated with any lead or a group of one or more leads having commonality or no commonality. For example, one or more leads may be grouped together having commonality such as the leads associated with a specific industry, geographic region, or the like.

In an embodiment of the System 70 (FIG. 1), a machine learning method may be used to make effective predictions on vital issues including, but not limited to, predicting which lead to select for connection attempt at a given time that has a higher probability of the connection attempt resulting in establishing a successful connection, among the leads that are assigned or ready to be assigned to a communication session (for example, dialing session for phone call based communication, texting session for text-based communication, and the like). As a way of example, using machine learning method, if the System 70 (FIG. 1) predicts that at around 11:10 am on a Tuesday during the second week of May 2014, a lead that belongs to area code 781 and having a Director level title may have a higher probability of answering a phone call than another lead (for example, that belongs to area code 603 and/or having non-director level title), the lead that belongs to area code 781 may be prioritized and called first to achieve an optimal connection attempt outcome. Based on implementation preferences, similar to predicting which lead to select for the next connection attempt, the order of the leads for executing connection attempts may be predicted to yield optimal connection attempt outcomes.

The goal of a supervised machine learning method is to determine a function that predicts an output for a given instance of input, wherein the output is a close approximation of the actual output, and wherein the function is a close approximation of the actual function that produces the actual output for the given actual input. If sufficient training data instances are available to represent all possible combination of input attributes and output attributes, a computer may learn the relationship between all possible inputs and outputs and create a function that matches the actual function (that produces the actual output for the given actual input). However, it may be difficult to collect all possible combination of input and output values. Hence, the computer learning method may use a smaller subset of possible combinations of input and output attributes to learn and create an approximate function that may predict the output for the a given input attributes. Such predicted output and associated input may not be part of the set of training data instances used to train the computer learning method. When the correlation between the input and output is complex, it may be very difficult (or impossible) to determine the actual function. There may be number of reasons for such difficulty, including but not limited to, all input attributes that influence the output may not be known, known input attributes that influence the output may not be measured, when a known input attribute is measured the quality of such measurement may not be perfect, and the like. Hence, embodiments of the current invention provide a computer learning method that predicts the output with optimal accuracy.

Accuracy of a computer learning method generally depends on the accuracy of training data instances that are used to train a computer learning method. Further, it may be important to continuously train the computer learning method as new training data becomes available because the correlation between the input and the output in training data instances may change over time. For example, a computer learning method that is trained with a second set of training data instances may outperform (in predicting the future output for a given input) the computer learning method that is trained with a first of training data instances which was available in the past. Based on implementation preferences, such new training data set may be utilized along with previously gathered training data set (or utilized independently) to train a computer learning method. Also, performance of various computer learning methods may need to be evaluated on an on-going basis with new training data set, to select the optimal computer learning method that yields optimal prediction. For example, based on the new set of training data instances, a computer learning method that was not previously selected may become the optimally performing computer learning method (which outperforms the previously employed computer learning method). Hence, it is desirable to have the system to keep track of how each computer learning method is performing as new training data set is available and keep employing an optimal computer learning method.

There may be many different sets of training data instances that may be used to train a given computer learning method and the associated prediction accuracy may be different. For a particular computer learning method to analyze and learn correlation in HCID and/or marketing analysis data (defined elsewhere in the specification), and provide prediction, following are some of the examples of set of training data instances associated with HCID that may be used: (i) a set of training data instances associated with last year August month may be the optimal training data set to optimally predict the connection attempt outcomes during this year August, (ii) a set of training data instances associated with the week before Thanksgiving week last year may be the optimal training data to optimally predict the connection attempt outcomes during the week before Thanksgiving week this year, (iii) a set of training data instances associated with a specific month during the year 2008 when the economy was going down may be the optimal training data to optimally predict the connection attempt outcomes during a month when the economy goes down in the future, (iv) a set of training data instances associated with the time slot 10 to 10:30 am on Wednesday August 2nd week last year may be the optimal training data set to predict connection attempt outcomes same time period this year, and (v) a set of training data associated with the time slot 10 to 10:30 am averaged over all Wednesdays of August last year may be the optimal training data to optimally predict connection attempt outcomes during the same time each Wednesday of August this year.

There may exist correlation between different sets of training data instances that may be used to train a computer learning method and the characteristics associated with the time period when of the output needs to be predicted. One having ordinary skill in the art would appreciate that for a given predicted output, over time, there is an opportunity to compare the predicted output with actual output. A system and method may be developed that analyzes and learns the correlation among training data set, predicted output, corresponding actual output, characteristics of the training data set, and characteristics associated with the output; and based on such learning predict which optimal training data may be used to train a given computer learning method to yield optimal prediction accuracy to predict output having certain characteristics. It should be noted that the characteristics associated with training data set and characteristics associated with predicted output, may include, but is not limited to, characteristics associated with the time period when the training data set was collected and when the output is predicted. For example, week before Thanksgiving week, month when the economy was going down, and the like may be characteristics associated with a time period.

Training data instances having common characteristics may be grouped together to create a specific set of training data instances. Such characteristics may include but not limited to, leads associated with a specific industry, leads associated with certain job titles, time period associated with a specific time of the day, time period associated with a specific weekday, time period associated with a specific week in a year, time period associated with a specific month in a year, time period associated with when the economy went down last time, time period associated with last year school vacation, and the like.

Besides many different sets of training data instances, there may be many different of computer learning methods to consider. There is many-to-many combination between the one or more training data and one or more computer learning methods. It is desirable to have a system and a method that analyzes and learns any correlation among characteristics various training data sets, characteristics of various outputs that needs to be predicted (referred to herein as the "output characteristics"), and prediction accuracies of various computer learning methods predicting the output when trained with the various training data sets. Based on such learning, the system and method may select a computer learning method and a training data set that provides optimal prediction accuracy for a given characteristics of output that needs to be predicted. Such system and a method is referred to herein as the "computer learning method selector." It should be noted that the computer learning method selector may be one or more computer learning methods that learn the above mentioned correlation and selects/predicts the optimal computer learning method and optimal training data set, for a given future time period. As new training data sets to train the computer learning method selector become available, the computer learning method selector may need to be trained on an on-going basis to keep improving its selection/prediction accuracy.

Returning back to derived connection attempt data, few examples of derived connection attempt data associated for phone call based connection attempts are given below. For example, derived connection attempt data may be derived by aggregating data associated with multiple calls, the calls made during a specific time period may be taken into account and such time period is referred to herein as the "Aggregation Time Interval." Further elaborating the foregoing example, in an embodiment of a computer learning method, the system may utilize/aggregate connection attributes of calls made during an Aggregation Time Interval of fifteen minutes time period on each weekday to arrive at (i) a derived connection attempt data that indicates the ratio of number of calls answered versus total number of calls made for leads whose phone numbers belong to a specific area code (for example: 781), (ii) a derived connection attempt data that indicates the ratio of number of calls answered versus total calls made for leads that belong to a specific area code (for example: 781) and also belong to a specific industry (for example: "software products" industry), (iii) a derived connection attempt data that indicates the ratio of number of calls answered versus total number of calls made for leads that belong to a specific area code (for example: 781), belong to a specific industry (for example: "software products" industry), and also having a title CEO, and the like.

Based on implementation preferences, values associated with a connection attempt data attribute may be mapped to a set of standard values and such mapping may allow the creation of one or more derived connection attempt data attributes associated with those standard values. For example, a lead's title may include, but is not limited to, CEO, CFO, CIO, CTO, Vice President, Director, Manager, Team leader, supervisor and the like, however, the standard title values may be limited to 3 values namely, C-Level Title, Director-Level, and Manager-Level, and each lead's title value may be mapped to one of the 3 standard title values. Such mapping allows the creation of derived connection attempt data associated with the standard title values, for example, the system may arrive at (i) a derived connection attempt data that indicates the number of calls answered by the leads whose title is mapped to "C-Level," (ii) a derived connection attempt data that indicates the number of calls answered by the leads whose title is mapped to "Director-Level," and (iii) a derived connection attempt data that indicates the number of calls answered by the leads whose title is mapped to "Manager-Level." It should be noted, based on implementation preferences, in addition to or in lieu of the "number of calls answered by the leads" the system may calculate/arrive at "number of calls not answered" in the foregoing examples. Further, in addition to or in lieu of the "number of calls" the system may calculate/arrive at "percentage of calls."

Based on implementation preferences, the system may have an option to configure/customize the settings associated with arriving at one or more training data sets. For example, such settings may include but not limited to, Aggregation Time Interval to create derived connection attempt data, time period associated with the training data set (for example, HCID related to a specific calendar week), how often the derived connection attempt data may be refreshed/updated (for example, once nightly, every hour, and the like), and the like. It should be noted that the derived connection attributes may or may not be stored in a data structure different from the data structure where lead data and/or connection attempt data may be stored. One having ordinary skill in the art would appreciate that the data structure may include, but is not limited to, table, index, cluster, file, and the like, within a database or file system or another type of storage, and such data structure may be refreshed periodically.

Numerous embodiments of the System 70 (FIG. 1) are provided below, describing variety of ways of using one or more computer learning methods to predict answers/decisions to variety of vital issues. One having ordinary skill in the art would appreciate that computer learning method may be utilized to predict answers/decisions to vital issues listed herein and vital issues that are not listed herein.

In an embodiment of the computer learning method, for each lead record in a list, the system may utilize a machine learning method to arrive at a prediction score (referred to herein as the "connect prediction score") that represents the probability of a connection attempt resulting in establishing a successful connection. Further, the connect prediction score may be used to order the leads for connection attempts. That is, the computer learning method may predict the order of leads for connection attempts that may yield optional results. It should be noted that the time of a day when a connection attempt is to be made may be one of the attributes along with the HCID and/or marketing analysis data (defined elsewhere in the specification), which is used as input by the computer learning method to predict the connection attempt outcome and/or arrive at the connect prediction score. During the usage of the system associated with the embodiment, since the time of the day when the connection attempt is to be made keeps changing as time goes on, the order of the leads for connection attempts may need to updated on an on-going basis to yield optimal connection attempt outcomes. Based on implementation preferences, the user may be given the option of ordering the lead records in a list, for connection attempts, based on one or more fields of the lead records specified by the user for sort order or allowing the system to order the lead records based on the connect prediction score associated with each lead. It should be noted that based on implementation preferences, connect prediction score associated with a lead may be shown in the agent computer.

In an embodiment of the System 70 (FIG. 1), whenever the need arises to select/predict the next lead record for making the communication attempt, the system may determine the connect prediction score for each lead in the list that is yet to be attempted or connected, and select the appropriate next lead record (for example, the lead with the highest connect prediction score) for connection attempt, which may yield optimal connection attempt outcome. Further, in another embodiment of the System 70 (FIG. 1), instead of selecting one record at a time to make the next connection attempt, the system may use the connect prediction score (determined/updated recently or determined/updated dynamically on the fly) to select a batch of one or more lead records ("batch selection") at a time to make connection attempt next, wherein the selected batch comprises of lead records with high connect prediction scores, which may yield optimal connection attempt outcomes. It should be reminded that such batch selection based implementation allows (i) the user to view and/or update one or more attributes (such as allowed-to-call, Do Not Call Until, and the like) associated with one or more lead records that are part of the selected batch, and (iii) if the system is yet to initiate a connection attempt to a lead record associated with the batch, any update made to the lead record may in turn enable the system to proceed with the connection attempt, not to proceed/skip the connection attempt for the lead record, not to make connection attempt until a specific date and time, and the like. Further, based on implementation preferences, the system may be allowed to decide the next lead record or the next batch of one or more lead records based on the connect prediction score, as well as, taking into consideration the inputs or updates (for example, provided by a user) to certain relevant settings or lead records such as priority information that may indicate how many times to make connection attempts to connect with a lead during a communication session or a specific custom time period, time gap between two successive connection attempts associated with a lead, whether to override the system predicted order of connection attempts and move a lead to up or down in remaining list of leads for connection attempts, and the like. One having ordinary skill in the art would appreciate that based on implementation preferences, in the foregoing embodiment of the System 70 (FIG. 1), if the user is acting as a talker/texting rep and the dialing agent/texting agent function is fully or automated (or eliminated and having the function of the dialing agent/texting agent be performed by the talker/texting rep), the computer used by the user may do one or more of the following: (i) distinguish in a first manner one or more leads that are yet to be attempted for connection (and associated with one or more batches) differently from the other leads, and (ii) distinguish in a second manner a lead that is currently being attempted for connection or selected for connection attempt next differently from the other leads, wherein the talker/texting rep may make the connection attempt without assistance from dialing agent/texting agent (if dialing agent/texting agent function is eliminated), wherein the distinguished lead in the second manner is part of the one or more batches. In the foregoing situation, in the case of text-based communication, there may be more than one lead that are attempted concurrently for connection, and accordingly the said more than one lead may be distinguished in the second manner. Further, if dialing agent/texting agent is involved in facilitating connection between the user (talker/texting rep) and a lead, the computer used by the user may distinguish in a third manner a lead associated with a connection that is currently being transferred to being between the talker/texting rep and the lead differently from the other leads. The term "distinguishing a lead" may refer to distinguishing one or more lead records associated with the lead, and based on implementation preferences distinguishing may involve highlighting in a particular way.

In a "batch selection" embodiment, if the batch size is large it may take longer time to call through the leads in the batch, and in turn, the predicted order of connection attempts (based on predictions score determined prior to selecting the previous batch) may not be accurate (to yield optimal connection attempt outcomes) as time goes on when the lead records in the selected batch are getting processed to make connection attempts. To minimize the inaccuracy in the foregoing situation, the batch size may be adjusted to an optimal size that may provide optimal results. For example, if a batch size is 50 and a batch of lead records selected at Monday: 9:00 is still being processed for connection attempts at 9:18, as of 9:15 the order of the remaining lead records that are yet to be processed may not represent the optimal order to yield optimal connection attempt outcomes; however, if the batch size is reduced to 15 and a batch of lead records selected at Monday: 9:00 may be completely processed by 9:15, and the system may select a new batch with optimal order at 9:15, which in turn may yield optimal connection attempt outcomes. It should be noted that based on implementation preferences, the Aggregation Time Interval used to derive the derived connection attempt data and the batch size may be adjusted to optimal values to yield improved prediction accuracy and in turn yield optimal connection attempt outcomes.

In an embodiment of the System 70 (FIG. 1), for a given set of leads, the system may utilize one or more machine learning methods to predict one or more optimal time slots for executing connection attempts that may yield optimal results. For the given set of leads, the system may (i) determine the connect prediction score associated with each lead for each time slot if connection attempts were to take place at that time slot, and (ii) for each time slot determine a score (referred to herein as the "time slot connect prediction score") that predicts the number of successful connections that may occur in the time slot if the communication attempts were to take place at that time slot. Based on implementation preferences, for each time slot, the time slot connect prediction score may be based on the connect prediction scores of the leads associated with that time slot. For example, the connect prediction scores of the leads may be added to arrive at the time slot connect prediction score that may act as a representative score for the predicted number of successful connections that may occur in that time slot if the connection attempts were to take place at that time slot. In the foregoing embodiment, based on implementation preferences, the prediction of one or more optional time slots may be based on the time slot connect prediction scores associated with various time slots.

In a variation of the foregoing embodiment involving phone call based phone call based connection attempts and Scheduling App, for a given set of leads, the system may utilize a machine learning method to determine/predict the time slot connect prediction score for each time slot that may be available for a talker to execute communication attempts (such time slot availability determined in the Scheduling App), wherein the availability of one or more dialing agents at various times may determine the availability of such time slots. Such time slot connect prediction score associated with each available time slot may represent the predicted number of phone calls answered if a dialing session were to be executed at that time slot, and the system may recommend the time slots in the order based on the time slot connect prediction scores, optionally showing the time slot connect prediction score for each time slot. The user may select the one or more of the recommended time slots and proceed to schedule the dialing session(s). It should be noted that a given set of leads may be associated with one or more lead lists. Further, it should be noted that the time slot may be defined based on implementation preferences, for example, the time slot may be of duration 15 minutes, 30 minutes, 40 minutes, 60 minutes, 3 hours, and the like.

In another embodiment of the System 70 (FIG. 1), the system may utilize one or more machine learning methods to learn correlation among marketing analysis data (defined elsewhere in this document) and other relevant data associated with leads including, but not limited to, data stored in a customer relationship management system (CRM) and the like, and arrive at a score (referred to herein as the "sale prediction score") associated with each lead that represents the probability of the lead moving to a particular step in the sales process. Such particular step in the sales process may be based on implementation preferences, including but is not limited to, the lead becoming not interested in a product, interested in seeing a demo of a product, interested in trying to use a product on a trial basis, closing a sale of a product for a purchase of smaller volume or shorter duration usage, closing a sale of a product for a purchase of larger volume or longer duration usage, and the like. Further, based on implementation preferences, the system may analyze a given set of leads or leads in a given database (or another data source) and order them based on certain criteria that defines optimal outcomes (for example, probability of closing a sale in short term, by utilizing sale prediction score), and such ordering may allow a sales rep/talker/texting rep to put effort towards those leads (such as making connection attempts to connect with those leads, via one or more phone call based and/or non-phone call based communication modes) that may yield optimal results, and which in turn may yield optimal results. A variation of the foregoing embodiment may utilize one or more features/benefits of the System 70 (FIG. 1) and DCA to make connection attempts. It should be noted that an embodiment of the System 70 (FIG. 1) utilizing machine learning method for prediction the communication mode may be phone call based or non-phone call based (such as text-based or other type of message based communication).

It should also be noted that when there is a reference to utilizing one or more type of data (for example, lead data, connection attempt data, connection attempt outcome data, agent data, agent availability data, and the like) for analysis and/or learning correlation among the attributes of the data, based on implementation preferences, one or more of the following may be applicable: (i) all or few groups of the said data may be utilized; (ii) for each group of data utilized, all or portion of the such group of data may be utilized, (iii) prior to utilizing a group of data, such group of data may be enriched with other data from one or more appropriate data sources, and (iv) specific weightage (referred to herein as the "weightage") may be assigned for one or more group of data, to increase or decrease the importance if a lead matches with a required pattern within such group of data, when generating a prediction score (such as sale prediction score, connect prediction score, time slot connect prediction score, or the like). The foregoing term "group" refers to one or more attributes of a particular type of data grouped together for learning patterns and correlation (for example, patterns and correlation among leads, among connection attempt data and connection attempt outcome data, and the like). It should be noted that the foregoing patterns and correlation learned may be used to generate a prediction score for a lead (such as sale prediction score, connect prediction score, time slot connect prediction score, or the like). It should also be noted that the term "data" may refer to a plurality of data, based on the context.

As a way of example, "Technology Data" may be a group that comprises data attributes associated with various technologies installed or used by a lead or the business associated with the lead; "Intent Data" may be a group that comprises data attributes associated with intent of a lead or other user(s) of the business associated with the lead to purchase a product or service; "Firmographic Data" may be a group that comprises data attributes/characteristics of the business associated with the lead (example, business size, revenue, age, location, ownership, growth stage, and the like) that may be used for segmenting a business; "Contactability Data" may be a group that comprises data attributes associated with the ability to connect with a lead such as whether a valid phone number is available, whether a valid email address is available, whether the lead has been verified to be associated with a specific business, whether the lead confirmed a preferred communication mode to connect with, probability of connecting with the lead via a communication mode at a given time, and the like.

Figure 14:
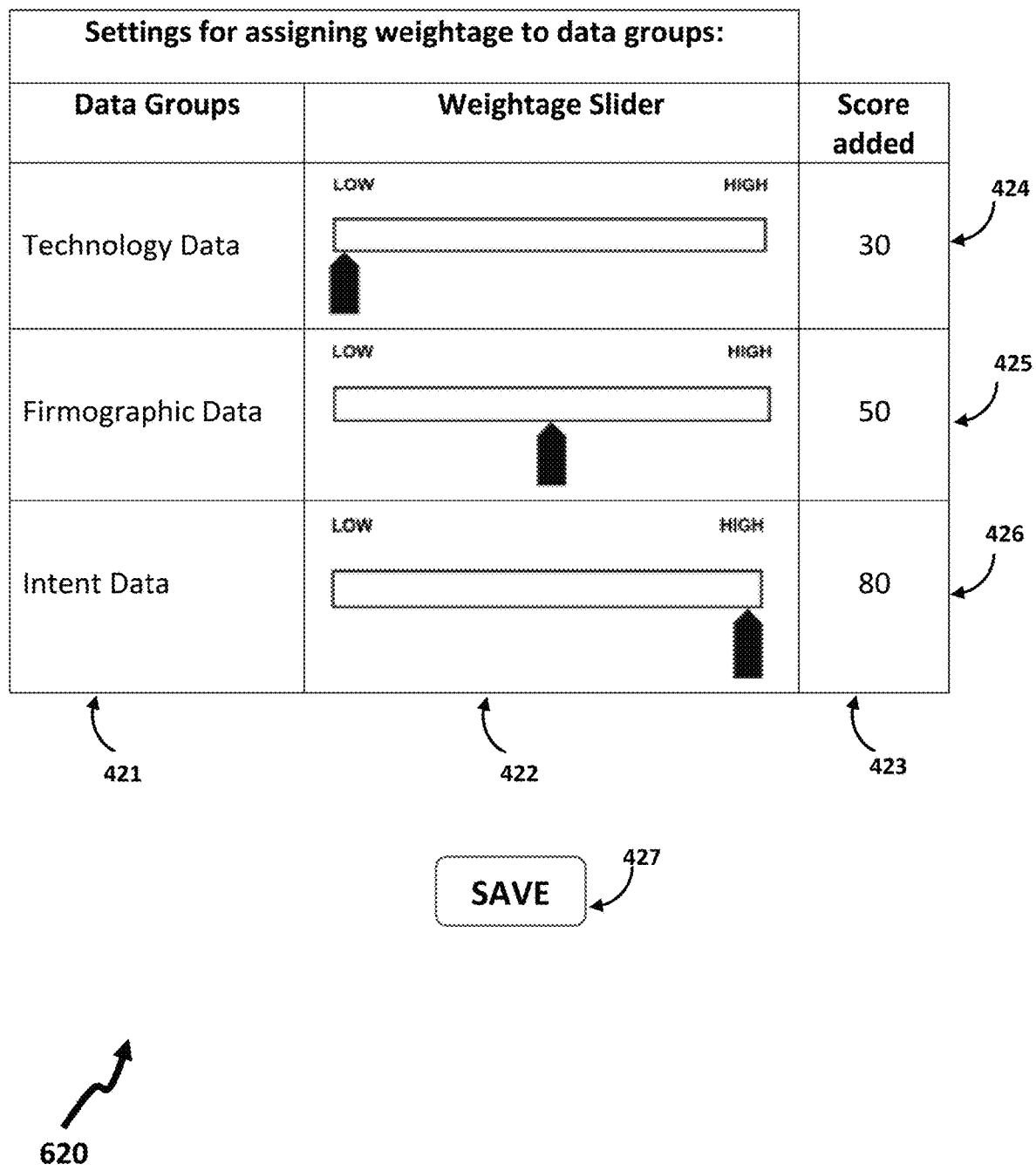
FIG. 14 is an exemplary screen view illustrating an interface that allows a user to assign weightage for data groups, in accordance with an embodiment of the system 70 (FIG. 1) that generates sale prediction score.

FIG. 14 is an exemplary screen view illustrating an interface that allows a user to assign weightage for data groups, in accordance with an embodiment of the system 70 (FIG. 1), wherein the system allows a user of the system to update/customize the weightage of one or more groups of data, wherein based on such weightage the system generates sale prediction score for a given lead.

As shown in FIG. 14, column 421 shows data group name; column 422 shows the selected position in a sliding control as an indicator of weightage assigned to the data group in the same row; and column 423 shows the score added when a lead matches with a required pattern within the data group located in the same row. Row 424 shows a slider with a position set to near "Low" for the data group "Technology Data," wherein if the lead matches with a required pattern within the Technology Data a score of 30 may be added by the system to the generated sale prediction score; row 425 shows a slider with a position set to near "Medium (in between Low and High)" for the data group "Firmographic Data," wherein if the lead matches with a required pattern within the Firmographic Data a score of 50 may be added by the system to the generated sale prediction score; and row 426 shows a slider with position set to near "High" for the data group "Intent Data," wherein if the lead matches with a required pattern within the Intent Data a score of 80 may be added by the system to the generated sale prediction score. It should be noted that in the foregoing example, if a lead matches the required patterns in all three data groups, the system may add 160 (30 plus 50 plus 80) to the overall sale prediction score. The save button 427 allows the user to save the setting specified in the interface shown in FIG. 14. It should be noted that the term "required pattern" associated with a specific data group, as referenced in the foregoing paragraph may be defined by a user in the system.

Based on implementation preferences, a user may be allowed to set the position in a slider control, but the score added associated with the slider control in the same row may be calculated automatically by the system based on the selected slider position. Based on implementation preferences, the lowest and highest score to be added to the sale prediction score may be customized (for example, in the exemplary interface shown in FIG. 14, the lowest score to added may be 25 and the highest score to be added may be 85 based on the left most and right most sliding control positions selected). Further, based on implementation preferences, instead of providing a sliding control to a user, the interface may allow the user to directly input the score that may be added if a lead matches with a required pattern within a data group.

In an embodiment of the system 70 (FIG. 1) that utilizes sale prediction score and connect prediction score to order leads for communication attempts, based on implementation preferences, a specific priority/importance/weightage may be given to one type of prediction score in comparison to the priority/importance/weightage given to the other. For example, sale prediction score may be given higher priority/importance/weightage than the connect prediction score, connect prediction score may be given higher priority/importance/weightage than the sale prediction score, both sale prediction score and connect prediction score are given equal priority/importance/weightage, or the like. One having ordinary skill in the art would appreciate the various types of prediction scores and various ways of assigning priority/importance/weightage to one type of prediction score in comparison to the other type(s) of prediction score(s), based on implementation preferences.

In yet another embodiment of the system 70 (FIG. 1), the system may utilize one or more machine learning methods to learn correlation among marketing analysis data (defined elsewhere in this document) and other relevant data associated with leads including, but not limited to, data stored in a customer relationship management system (CRM) and the like, and for a given lead predict one or more of the following: (i) optimal communication mode to connect with the lead next, (ii) optimal time to execute the next connection attempt, and (iii) optimal content/message that may yield optimal outcome during the next connection attempt.

Based on implementation preferences, the system may take into account (a) a variety of information associated with a lead including, but not limited to, previous connection attempts, previous connection attempt execution timings, previous connection attempt outcomes, and order of different connection attempts via different communication modes and their outcomes, and/or (b) any correlation learned from historical activities, which may include, but not limited to, touch specific outcome correlation data (defined elsewhere in this document), marketing outcome correlation data (defined elsewhere in this document), and order of different connection attempts via different communication modes and overall outcome (defined elsewhere in this document).

In an embodiment of the System 70 (FIG. 1), the system may learn the correlation among a variety of content/messages communicated with leads and marketing analysis data (defined elsewhere in this document). Such learned correlation is referred to herein as the "message based outcome correlation data." It should be noted that the marketing analysis data may include outcome that is associated with actions such as a specific link is clicked in an email delivered to a lead, downloading a whitepaper (or other electronic material) or placing an order using a specific code sent in the email, opted out from further communication, and the like. For an example of such correlation, a message with a specific content ("message 1") may yield a higher connect rate with leads when the connection attempt using message 1 is executed at 9 am on a Tuesday, for a specific group of leads, and the touch is executed as a $2^{nd}$ touch in the order of touches in the associated MTMC (defined elsewhere in this document). However, another message with a different content ("message 2") may yield a higher connect rate with leads when the connection attempt using message 2 is executed at 4 pm on a Friday (as the work week is about to wind down), for a specific group of leads, and the touch is executed as a $1^{st}$ touch in the order of touches in the associated MTMC. Further, continuing the foregoing example, the message2 may yield higher touch outcome than message1, however, message1 may yield overall outcome that is of interest to the business (described elsewhere in the document). One having ordinary skill in the art would appreciate that there may be numerous scenarios for coming up with other examples, associated with message based outcome correlation data.

It should be noted that the content/message may be communicated to a lead may be via phone call based or non-phone call based communication mode. For example, different content/messages communicated by an agent via phone call may have an effect on the outcome.

The system may predict (or recommend or come up with) an appropriate content/message based on the time when a connection attempt is executed, to yield an optimal connection attempt outcome. It should be noted that, for an agent based touch, such a connection attempt execution time may depend on agent availability, among other dependencies. For example, based on an execution time for an email based connection attempt, the system may come up with an effective email message that may yield optimal outcome (such as the lead responding back requesting to move to a next step in the sales process). Based on implementation preferences, such email message may be sent by the system automatically or after an agent reviews and confirms to send. For another example, based on an execution time for a text based connection attempt (or in a specific step within a text-based connection between an agent and the lead), the system may come up with an effective text message that may yield optimal outcome (such as the lead agreeing to move to a next step in the sales process). For yet another example, based on an execution time for a phone call based connection attempt, the system may come up with an effective script for the agent to use when communicating via phone call, that may yield optimal outcomes (such as the lead agreeing to move to a next step in the sales process).

One having ordinary skill in the art would appreciate that the Scheduling App (described in the U.S. patent application Ser. No. 14/204,505) may: (i) facilitate one or more talkers to be disciplined in time management by pre-scheduling and adhering to the pre-scheduled communication sessions. The foregoing benefit is similar to the benefits associated with pre-scheduling events in a calendar and managing time effectively, (ii) provide a feature that allows a user to schedule one or more recurring events/communication sessions, and (iii) store and retrieve information in a database (or other mechanisms, including but not limited to, a file system).

One having ordinary skill in the art would appreciate that based on implementation preferences, the central communication server 150 (FIG. 1) of the system 70 (FIG. 1) may be located at the location of a talker or closer to geographical location of the talker, which may eliminate the phone communication costs associated with long distance phone connectivity between the talker's phone and the central communication server 150 (FIG. 1). Further, the central communication server 150 (FIG. 1) may be owned and/or hosted by the business associated with the talker, in which case the Vendor (described in the U.S. patent application Ser. No. 14/204,505) may not incur costs associated with hosting the central communication server 150 (FIG. 1) and any associated phone communication costs. The foregoing implementation preferences may provide flexibility in business model choices for the Vendor due to reduction in operating costs.

It should be noted that based on implementation preferences, if the System 70 (FIG. 1) uses non-phone call based communication, the component of the system that enables connectivity between an agent and a lead (i) may be located at the location of the agent or closer to geographical location of the agent, and/or (ii) may be owned and/or hosted by the business associated with the agent, to provide flexibility and reduce costs associated with communication. For example, in the case of text-based communication, the text-based connectivity between a texting rep and a lead may be established by the central communication server 150 (FIG. 1) that is located at the business associated with the texting rep, wherein the central communication server 150 (FIG. 1) has text-based communication capability. In the foregoing example, if the texting agent is present (that is, the texting agent functionality is not fully automated), based on implementation preferences the text-based communication between the texting agent and the lead may be established by the central communication server 150 (FIG. 1).

One having ordinary skill in the art would appreciate that the system 10 (FIG. 1) disclosed in the U.S. patent application Ser. No. 13/278,764 may be modified to allow a talker (or another authorized user) to create one or more campaigns, wherein each campaign may have one or more attributes with values specific to that campaign, and the value for one or more attributes may be optional. Based on implementation preferences, a campaign attribute may include but is not limited to, one or more of the following fields/attributes: campaign identifier, campaign name, campaign start time, campaign end time, a field to identify one or more talkers, a field to identify one or more dialing agents, a field to identify one or more customers for attempting to connect with, and the like.

One having ordinary skill in the art would appreciate that based on implementation preferences and ease of use, the system 10 (FIG. 1) disclosed in the U.S. patent application Ser. No. 13/278,764 may be implemented to do one or more of the following: (i) one or more talkers may be assigned to be part of a list referred to herein as the "talker list," (ii) one or more dialing agents may be assigned to be part of a list referred to herein as the "dialing agent list," (iii) a talker may be assigned to be part of one or more talker lists, (iv) a dialing agent may be assigned to one or more dialing agent lists, (v) when creating/updating a campaign, one or more dialing agents may be specified by selecting one or more dialing agent lists, (vi) when creating/updating a campaign, one or more talkers may be specified by selecting one or more talker lists, and (vii) when creating/updating a campaign, one or more customers may be specified by selecting one or more customer lists.

The term "personal characteristics" refers to one or more characteristics associated with a person, including but not limited to, linguistics characteristics, language skill, management skill, technical skill, product skill, certification in certain skill, geographical location, cost, and the like. One or more dialing agents may be assigned to be part of a dialing agent list based on personal characteristics of the one or more dialing agents. One or more talkers may be assigned to be part of a talker list based on personal characteristics associated with the one or more talkers. One or more customers may be assigned to be part of a customer list based on one or more characteristics associated with the one or more customers, wherein the characteristics of a customer may include but is not limited to, language, knowledge of certain products, geographical region, personal characteristics associated with the customer, and the like.

Further, one having ordinary skill in the art would appreciate that the system 10 (FIG. 1) disclosed in the U.S. patent application Ser. No. 13/278,764 may be implemented to do one or more of the following: (i) maintain the relationship between a customer list and one or more talker lists compatible/allowed to be associated with the customer list, (ii) maintain the relationship between a customer list and one or more dialing agent lists compatible/allowed to be associated with the customer list, and (iii) upon the user (who is creating or updating a campaign) selecting/specifying a customer list as part of the campaign, automatically prefill or aid to prefill one or more talkers (or talker lists) and/or one or more dialing agents (or dialing agent lists) compatible/allowed to be associated with the customer list.

One having ordinary skill in the art would appreciate that there may be a many-to-many relationship between customer lists and dialing agent lists, wherein the relationship between a customer list and a dialing agent list may be based on the compatibility between the personal characteristics of the dialing agents and the requirement to achieve reasonably effective communication with the customers associated with the customer list. Further, there may be a many-to-many relationship between customer lists and talker lists, wherein the relationship between a customer list and a talker list may be based on the compatibility between the personal characteristics of the talkers and the requirements to effectively communicate with the customers associated with the customers list.

The Telephone Consumer Protection Act (TCPA) is a federal law with new rules which took effect on Oct. 16, 2013 that prohibit companies from contacting consumers with automated phone calls or text messages to their mobile/wireless phone numbers without their prior consent. It is a violation of this rule if a business autodials a mobile number or sends a text to a mobile number using an automated system without having a prior written consent from the current owner of that mobile number to communicate using such automated telephone technology. The challenges are: (i) phone numbers are easily migrated from landline to mobile and vice versa with a quick turn-around time for such migration, and (ii) a phone number may be migrated from one owner to another owner easily and a large number of phone numbers are recycled/reassigned to new owners. For example, a business may have confirmed that a particular phone number is a landline a few days ago, but as of today that phone number may no longer be a landline, and instead it may have been migrated to a mobile phone number. For another example, a business may have obtained a prior written consent a few days ago from the owner of a mobile phone number for contacting using an automated system, but as of today there may be a new owner to that mobile phone number and the previously obtained consent may no longer be valid. Violation of TCPA may end up resulting in costly legal bills and penalties.

Hence, it is desirable to have a module in the System 70 (FIG. 1) that automates the verification of one or more of the following: (i) whether a phone number associated with a customer is a mobile phone number or a landline phone number, (ii) whether the customer is the current owner/subscriber of the phone number, and/or (iii) whether the business using the System 70 (FIG. 1) has obtained a prior written consent from the current owner of the phone number. Such module is referred to herein as the "TCPA compliance module." One having ordinary skill in the art would appreciate that the TCPA compliance module may help one or more businesses and/or users using the System 70 (FIG. 1) to be compliant with TCPA and other relevant laws, rules, and regulations. Besides offering the benefit of compliance with TCPA rules, by improving the accuracy of the data (including but not limited to, phone type and current owner) the TCPA compliance module may further help the businesses and users of the System 70 (FIG. 1) to dramatically improve connect rates (number of connection attempts that result in connecting with the customer or lead) as well as operational efficiencies by allowing them to reach the right customers with the right message. It should be noted that based on implementation preferences the System 70 (FIG. 1) may not fall under the automated dialing technology.

In an embodiment of the System 70 (FIG. 1) having a TCPA compliance module, based on implementation preferences, the customer records/lead records that do not comply with the TCPA rules may be distinguished in variety of ways, including but not limited to, highlighting differently, blinking, shading, being shown in a specific area of the screen, being shown in a separate computer screen, not showing such records by filtering them out, and the like. It should be noted that one or more features/benefits of the TCPA compliance module may be implemented as a standalone system or as a module as part of an embodiment of the System 70 (FIG. 1).

The TCPA compliance module may utilize consistent up-to-date phone data ("customer phone data") that enables verification of whether a given phone number is a mobile (wireless) or landline (wireline) phone, and further allows verification of whether a given customer name and phone number go together or whether the phone number now belongs to a different person. If a given phone number and a given customer name are verified go together, then the user of the system can be confident that they are contacting the right person. It should be noted that the customer phone data may be provided by one or more third parties. Instead of using the customer phone data provided by third party companies, one may choose to build a database with the phone type and phone ownership associated with each phone number and keep such a database up-to-date by gathering changes to the data from various sources (including, but not limited to, different phone companies), however, building/maintaining such a database may be cumbersome. Further, the TCPA compliance module may utilize up-to-date customer consent data ("customer consent data") that maintains a record of consent provided by a customer along with relevant data that may include but not limited to, customer name, whether consent was obtained, time when consent was obtained, and the like, and the TCPA compliance module may distinguish the phone numbers that should not be contacted using an automated system.

Figure 15:
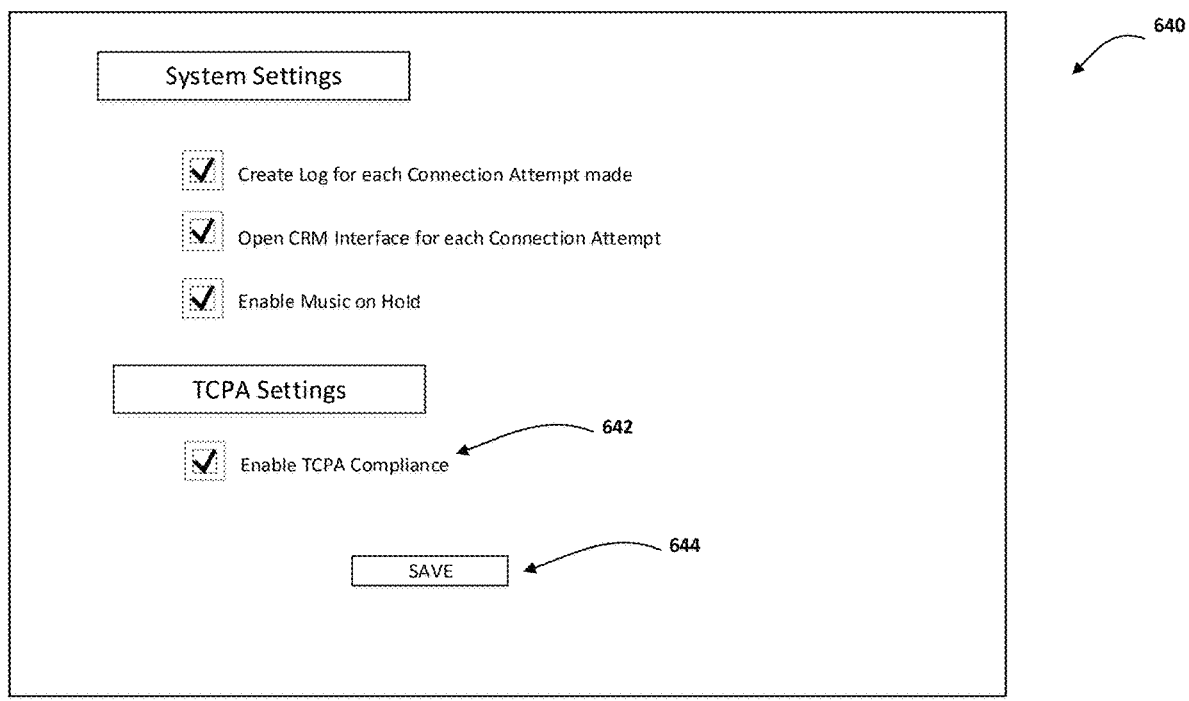
FIG. 15 is an exemplary screen view illustrating an interface that allows a user to enable Telephone Consumer Protection Act (TCPA) compliance feature, in accordance with an embodiment of TCPA compliance module.

FIG. 15 is an exemplary screen view illustrating an interface that allows a user to enable TCPA compliance feature, in accordance with an embodiment of TCPA compliance module. As shown by FIG. 15, a user may enable the TCPA compliance feature by selecting (checking off) a checkbox 642. The user may click a save button 644 to save the updated settings in the interface. Upon saving the value associated with the selected checkbox 642 the system enables the functionality of the TCPA compliance module.

Figure 16:
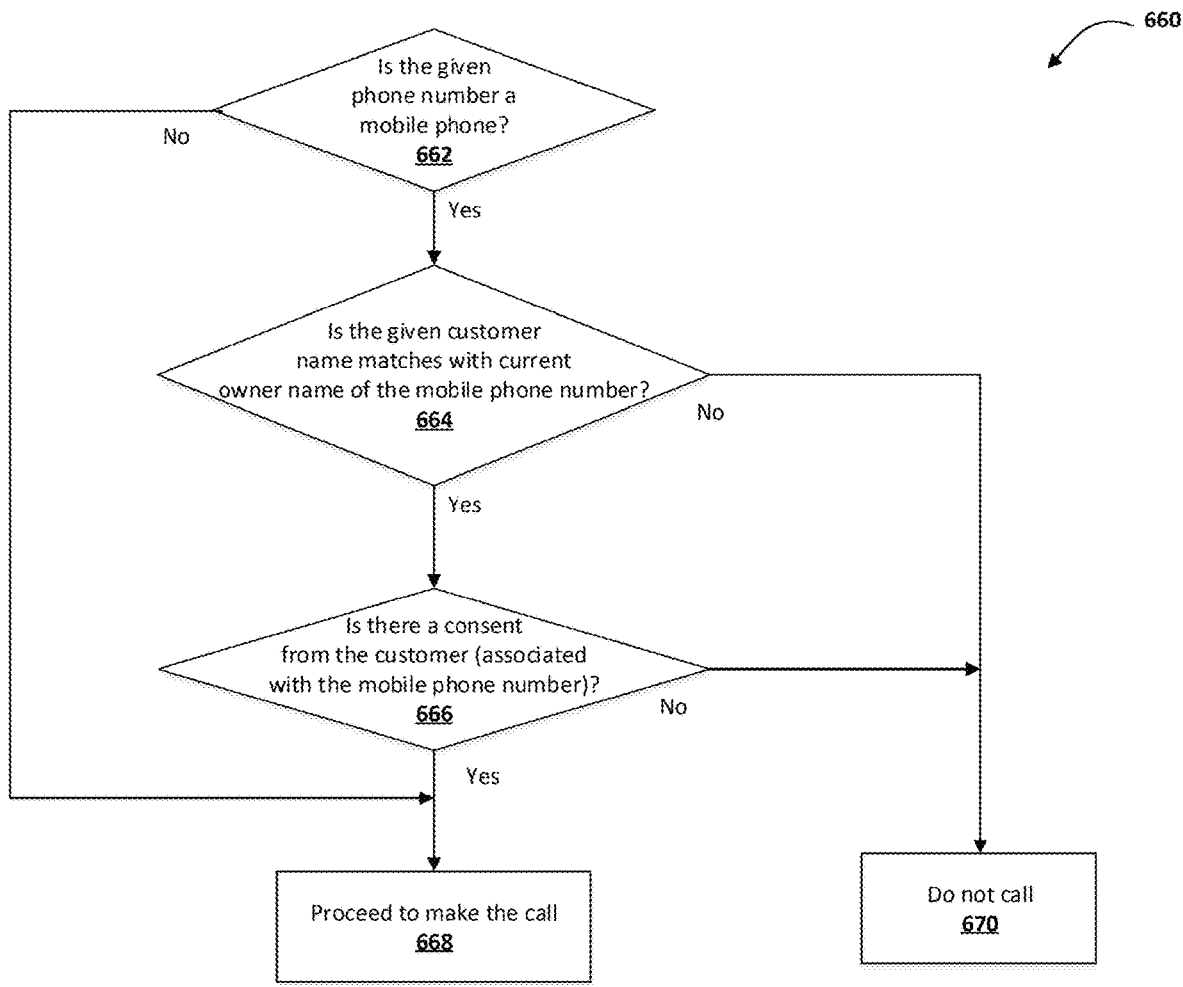
FIG. 16 is a flowchart illustrating actions performed when processing a given customer name and a given phone number associated with the customer name to validate whether the phone number is a mobile phone number and if it is a mobile phone number whether consent is received from the current owner of the phone number, in accordance with an embodiment of TCPA compliance module.

FIG. 16 is a flowchart illustrating actions performed when processing a given customer name and a given phone number associated with the customer name to validate whether the phone number is a mobile phone number and if it is a mobile phone number whether consent is received from the current owner of the phone number, in accordance with an embodiment of TCPA compliance module. As shown by block 662, the system checks whether the given phone number is a mobile phone number, by verifying the phone number against the customer phone data. If the system determines that the given phone number is not a mobile phone number in block 662 then the system proceeds to make the phone call to the phone number, without further verification (since TCPA compliance functionality is relevant only if the phone number is a mobile phone number), as shown by block 668. However, if the system determines that the phone number is a mobile phone number in block 662 then the system proceeds to further check whether the given owner name associated with the given phone number (in this case, mobile phone number) matches with the current owner name associated with the said mobile phone number, as shown by block 664, by verifying whether the given customer name matches with the current customer name associated with the said mobile phone number. If the system determines that the given customer name does not match with the current owner name associated with the said mobile number in block 664, the system does not make the call to the given number, as shown by block 670. However, if the system determines that the given customer name matches with the current owner name associated with the said mobile number in block 664, then the system further checks whether there is a consent obtained from the customer associated with the given customer name (in this case, same as the current customer of the said mobile number), as shown by block 666. If the system determines that there is no consent obtained from the given customer in block 666, the system does not make a call to the given phone number, as shown by block 670. However, if the system determines that there is a consent obtained from the given customer in block 666, the system proceeds to make a call to the given phone number, as shown by block 668.

There may be other laws similar to TCPA that may prohibit one to contact a customer via phone call (or non-phone call) based communication mode. One having ordinary skill in the art would appreciate that a module may be implemented using a variant of one or more of the techniques taught in the foregoing description of the TCPA compliance module.

As described in the U.S. patent application Ser. No. 13/278,764 and in this document, the selection of customer records associated with a dialing session and/or the selection of a customer for calling next may be dynamically decided by the system 70 (FIG. 1) based on variety of factors, including but not limited to, priority information associated with a customer, a new update made to one or more attributes of a customer record, a calendar event scheduled for follow-up with a customer, one or more customer records newly becoming available (such a newly available customer record is referred to herein as the "new customer record") that meet the criteria to be part of the list of customers associated with the dialing session, and the like. Further, in accordance with the foregoing system, such dynamically selected customer records may be selected as a batch of one or more customer records and transmitted to be available in one or more talker computers and/or one or more dialing agent computers, wherein the list of customer records (and associated customer data) shown on the one or more dialing agent computers may or may not be the same as that shown in the one or more talker computers, at any given time. Also, in an embodiment of the system 70 (FIG. 1), the function of a dialing agent and a dialing agent computer may be automated by one or more modules located in one or more of the following: central data server 100 (FIG. 1), central communication server 150 (FIG. 1), and talker computer 24 (FIG. 1), wherein the dialing agent and the dialing agent computer may not be present, and in such embodiment, a talker may be referred more appropriately as an agent and the taker computer may be referred more appropriately as the agent computer.

One having ordinary skill in the art would appreciate that the criteria to select a batch of one or more records associated with a dialing session may include a criterion that selects one or more customer records newly becoming available. Such new customer records may become available automatically based on the customer information submitted by one or more customers through variety of methods (for example, via a web form, phone call, email, text message, and the like) or the information related to one or more new customers may be gathered and the associated one or more new customer records may be created/entered/made available by a user of the system (or a user of another system).

Further, based on implementation preferences in an embodiment of the System 70 (FIG. 1) utilizing phone call based communication mode, one or more of the following may happen: (i) the one or more new customer records may not be made available in the System 70 (FIG. 1) and instead may be made available in a data source other than the System 70 (FIG. 1), and in that case, the System 70 (FIG. 1) may obtain the new customer records via data synchronization and make the one or more customer records available as a batch of one or more customer records to the dialing session, and (ii) the one or more new customer records may be assigned a specific priority and the system may select the one or more new customer records for calling next, at a time including but not limited to, immediately after the one or more new customer records became available, after a specific amount of delay (based on implementation preferences), or after receiving an acknowledgement from a talker (or another user of the system) to select the one or more new customer records for calling, based on the position of a new customer record within the order of the customer records, and the like. One having ordinary skill in art would appreciate that in the case when the talker (or user) is required to provide the foregoing acknowledgement, the talker (or user) may have the option to start calling a new customer (associated with a new customer record) immediately after completing the then currently on-going call, after suspending/dropping the then currently on-going call or the like. One having ordinary skill in the art would appreciate that based on implementation preferences, if a dialing agent is present in the foregoing embodiment (that is, the dialing agent function is not automated), when calling a new customer associated with a new customer record, such call attempt may be made by an available dialing agent, or such call attempt may be made by a talker. If the dialing agent is not present in the foregoing embodiment, the call attempt (referred in the foregoing sentence) may be made by the talker.

One having ordinary skill in the art would appreciate that in an embodiment of the System 70 (FIG. 1) having no dialing agent present/participating, the dialing agent function may be fully automated or partially automated or no part of dialing agent function is automated (and any portion of the dialing agent function that is not automated may be performed by a talker). Further, the order of the customer records (including but not limited to the one or more new customer records) for communication attempts, at any given time, may be based on variety of factors including but not limited to, prioritization information, order predicted by one or more computer learning methods (described elsewhere in this document), and the like. One having ordinary skill in the art would appreciate that based on implementation preferences, when a new customer record becomes available, such new customer record may be stored/shown/processed in variety of ways, including but not limited to, the new customer record may be inserted at an appropriate position within a set of customer records previously available in a talker computer, appended along with the previously delivered customer records and sorted, or the like. Further, based on implementation preferences, a new customer record may be stored/shown/processed in a dialing agent computer in a variety of ways similar to the talker computer. Based on the context, the reference to a singular new customer record may mean to refer plurality of new customer records.

Further, based on implementation preferences, in a system that processes new customer records in accordance with the present invention, an agent computer (or a talker computer or a dialing agent computer or user computer) may show the one or more new customer records in a variety of ways, including but not limited to, display in the same area of the screen where customer records associated with incoming phone calls (described below) are shown (that is, mixed with the customer records associated with incoming phone calls or shown separately), display in the same area of the screen where other customer records are shown (that is, mixed with other customer records or shown separately), display in one or more separate areas of the screen (or in one or more separate screens, if applicable), distinguishing the new customer records differently from other customer records, and the like. It should be noted that one or more new customer records associated with a new customer that is currently connected with an agent may be distinguished from the other customer records in yet another way. Also, based on implementation preferences, the System 70 (FIG. 1) may utilize one or more communication modes that may be Real Time Based Communication based (for example, phone call) or Non Real Time Based Communication based (for example, text message, email, or the like).

Based on implementation preferences, the functionality described for processing one or more new customer records may be applicable to process a customer record that becomes ready for a communication attempt, wherein such customer record becomes ready based on: (i) a previously scheduled calendar event for follow-up with the customer associated with the customer record, and/or (ii) selection of such customer record to make a connection attempt by a computer learning method that analyzes and learns correlation among lead data (defined elsewhere in this document) and/or marketing analysis data (defined elsewhere in this document).

Figure 17:
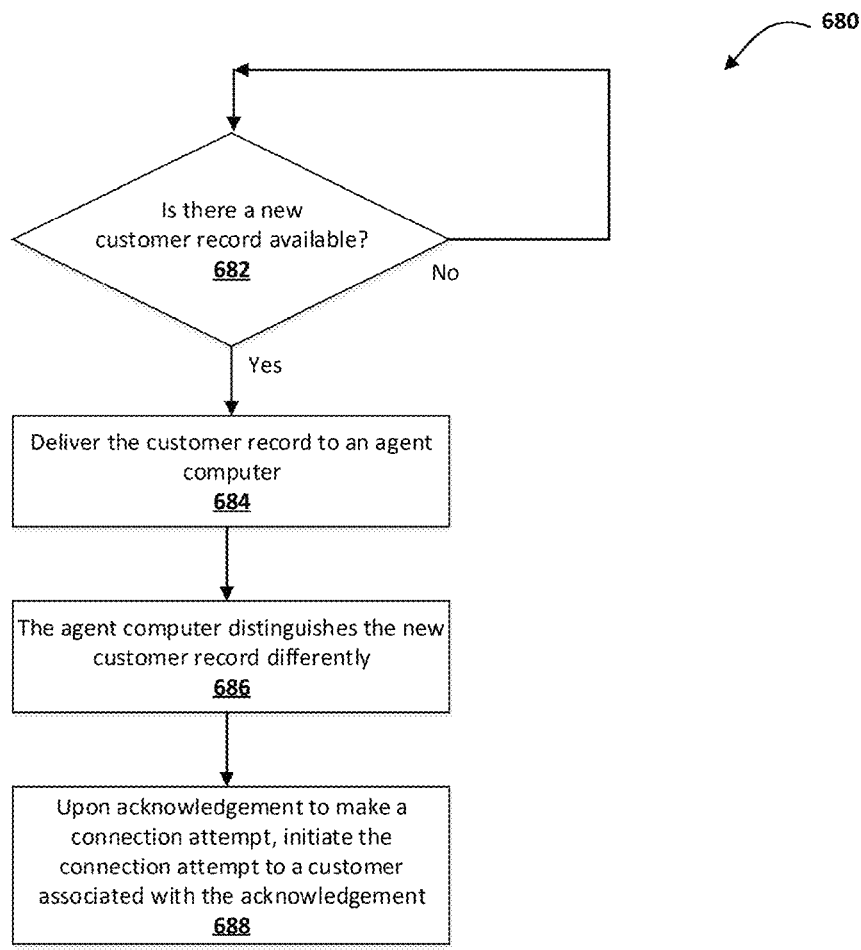
FIG. 17 is a flowchart illustrating actions performed when a customer record is selected for connection attempt, in accordance with an embodiment of system 70 (FIG. 1) that processes new customer records.

FIG. 17 is a flowchart illustrating actions performed when a customer record is selected for connection attempt, in accordance with an embodiment of system 70 (FIG. 1) that processes new customer records. As shown by block 682, the system checks whether there is a new customer available. If there is a new customer available, the system delivers the new customer record to an agent computer, as shown by block 684. In the foregoing step, based on implementation preferences, instead of delivering the customer record the system may deliver a unique identifier (stored in one or more fields/attributes of the customer record) associated with the customer record to the agent computer, which may be used by the agent computer to identify/retrieve the customer record. As shown by block 686, upon receiving the customer record (or an associated unique identifier) the agent computer identifies the customer record and distinguishes differently, for the purpose of an agent associated with the agent computer to recognize the new customer record(s) differently from other customer records. As shown by block 688, upon the agent acknowledge to start the connection attempt to connect with the new customer, the system starts the said connection attempt. It should be noted that based on implementation preferences, the foregoing connection attempt may be phone call based or non-phone call based communication modes such as text based communication mode.

Figure 18:
FIG. 18 is an exemplary screen view illustrating an interface showing new customer records, in accordance with an embodiment of system 70 (FIG. 1) that processes new customer records.

FIG. 18 is an exemplary screen view illustrating an interface showing new customer records, in accordance with an embodiment of system 70 (FIG. 1) that processes new customer records. As shown by FIG. 18, rows 702, 704, and 706 show three new customer records shown in the top section of the tabular view, which are denoted by the symbol "N" in the first column to indicate that they are new customer records. Row 702 is shaded with a lighter shade to indicate that a connection attempt is being made currently (or a connection attempt is scheduled to be made next) to connect with a customer associated with row 702. When needed, the agent may click the stop connection attempt button in the row 702 to end the connection attempt. Based on implementation preferences, the foregoing connection attempt may be phone call based or non-phone call based communication modes such as text based communication mode. The agent may click the start connection attempt button in the row 704 to initiate connection attempt to the customer associated with row 704. Based on implementation preferences, upon initiating a new connection attempt, if there is any other connection attempt is also active the system may end that active connection attempt such active connection attempt may be ended. As shown by FIG. 18, section 708 shows other customer records (other than the new customer records) associated with the communication session (for example, for outbound calling). It should be noted that based on implementation preferences, instead of showing the new customer records in the top section of the tabular view, the new customer records may be mixed/shown with the other customer records shown at the bottom of the tabular view.

One having ordinary skill in the art would appreciate that in an embodiment of the System 70 (FIG. 1) utilizing phone call based communication mode when there is an incoming phone call originated from a customer (or lead) the central communication server associated with the System 70 (FIG. 1) may be configured to recognize such incoming phone call and route the phone call appropriately. Such routing may be based on one or more attributes associated with the incoming phone call and other relevant attributes such as the time when the phone call is received. One having ordinary skill in the art would appreciate that the attributes of a phone call may include, but are not limited to, calling party information, called party information, and the like. Further, called party information may include Caller ID information which typically comprises of the caller's telephone number (CNUM) and caller's name (CNAME). That is, CNUM refers to the telephone number of the calling party on an inbound call, CNAM refers to the name associated with the CNUM of the calling party on an inbound call. Based on implementation preferences, and CNUM and/or CNAM may be presented when an inbound call is received. For an example of routing a phone call, if a phone call has a calling party phone number/CNUM starting with area code 781 it may be routed to a queue called "MA Customers." For another example, if a phone call is received after 5 pm EST the phone call may be routed to a queue called "After Working Hours."

In a conventional system that handles incoming phone calls, when there is integration between the phone system and an agent computer, after recognizing the called party phone number and/or name the system may automatically show a window on the agent computer, displaying information associated with a phone call concurrently sent to that agent's telephone (such window is referred to herein as the "screen pop"). The information associated with a phone call is referred to herein as the "screen pop information," which may be based on one or more attributes associated with the incoming phone call and other relevant attributes such as the time when the phone call is received. For example, the screen pop information may include the caller's first name, last name, title, company name, historical activity notes, and the like. Screen pop information may be obtained from one or more data sources including but not limited to CRM, customer service system, and the like, that may have information associated with phone call.

In a conventional system handling incoming phone calls, one or more phone calls may be routed to a queue where the callers may be waiting and then assigned to an agent upon the agent becoming available. When a phone call from a queue is assigned to an agent, the system may start to obtain the screen pop information (associated with that phone call), and based on the volume of data that may be searched to locate the screen pop information, the speed associated with obtaining and presenting the screen pop information may be significantly slow, and in turn the agent may not be able to see important information associated with the caller in a timely manner. An embodiment of the System 70 (FIG. 1) may overcome the foregoing limitation by doing the following: (i) start searching (and/or fetching) for the screen pop information associated with a phone call upon the incoming phone call being assigned to a queue (which may be ahead of the agent answering the call) and keep the screen pop information ready to be delivered to an agent's computer, and (ii) upon an agent becoming available and the incoming phone call is assigned/bridged/transferred to the agent's phone connection, concurrently transmit/deliver the screen pop information to the agent's computer. The foregoing functionality of the System 70 (FIG. 1) is referred to herein as the "screen pop fetch ahead functionality." Based on implementation preferences, the system may start searching for screen pop information upon receiving the incoming phone call (even prior to routing the call to a queue).

Further, in a conventional system handling incoming phone calls configured to route incoming phone calls (including any call that is transferred) to a queue, the following limitations exist: (i) an agent may not be able to review activity notes history and other relevant information associated with a customer waiting in a queue, ahead of the customer call is assigned/bridged/transferred to the agent, and (ii) the incoming phone calls waiting in the queue may be answered typically in the order the phone calls are received, and an agent (or another user) may not be able to review relevant information associated with customers waiting the queue and update the order of answering the phone calls. An embodiment of the System 70 (FIG. 1) may address/overcome the foregoing limitations by showing relevant information associated with a customer waiting in a queue to the agent associated with the queue, prior to the phone call assigned/bridged/transferred to the agent's phone connection, which may enable the agent to do one or more of the following: (i) be prepared by reviewing activity notes history and other relevant information associated with the customer, ahead of the customer call is transferred, and (ii) change the order in which one or more customers waiting in the queue may be answered, by updating the queue, updating one or more attributes associated with the customers waiting in the queue, or selecting a particular customer waiting in the queue and answering that customer's call, or the like. The foregoing functionality of the System 70 (FIG. 1) is referred to herein as the "queue visibility functionality." Based on implementation preferences, the foregoing embodiment may or may not have the screen pop fetch ahead functionality included. Further, the relevant information associated with a customer may or may not include all or partial of screen pop information.

In an embodiment of the queue visibility functionality, the system may enable a computer used by an agent (associated with a queue where the customers associated with incoming calls or transferred calls are waiting) to distinguish one or more customer records associated with the customer whose call is currently assigned/bridged/transferred to the agent's phone connection, differently from the other customer records. Based on implementation preferences distinguishing (referenced in the foregoing sentence) may be accomplished in a variety of ways, including but not limited to, highlighting in a particular way.

In an embodiment of the queue visibility functionality, the system may employ a computer learning method that utilizes all or portion of the data from a group that comprises of marketing analysis data, marketing outcome correlation data and touch specific outcome correlation data, to order the customers waiting in a queue.

One having ordinary skill in the art would appreciate that there may be more than one agent and more than one queue in a system that handles incoming phone calls. Further, an agent may be assigned/mapped to more than one queue, and more than one agent may be assigned/mapped to a queue. One or more criteria that define the mapping between one or more agents and one or more queues may be based on queue characteristics and agent characteristics. Examples of queue characteristics may include, but are not limited to, an initial greeting to be played to the caller, wait time beyond which the call of the caller may be forwarded (for example, to another phone number, queue, and the like), failover forwarding number for re-routing based on certain criteria, and the like. When an agent is assigned to more than one queue, customer phone calls routed to any one of those queues may be assigned to the agent.

Further, based on implementation preferences, in a system that processes incoming phone calls in accordance with the present invention, an agent computer (or talker computer or a dialing agent computer or user computer) may show the one or more customer records associated with calls waiting in a queue in a variety of ways, including but not limited to, displaying in the same area of the screen where new customer records (described above) are shown (that is, mixed with the new customer records or shown separately), displaying in the same area of the screen where other customer records are shown (that is, mixed with other customer records or shown separately), showing in one or more separate areas of the screen (or in one or more separate screens, if applicable), distinguishing the associated customer records differently from other customer records, and the like. It should be noted that one or more new customer records associated with an incoming phone that is currently connected with an agent may be distinguished from the other customer records in yet another way. Also, based on implementation preferences, in addition to or instead of incoming phone calls, the System 70 (FIG. 1) having the screen pop fetch ahead functionality and/or queue visibility functionality, may utilize such functionality to handle communication originated from one or more customers via one or more Real Time Based Communication and Non Real Time Based Communication modes that may not be phone call based (for example, text message, or the like).

Figure 19:
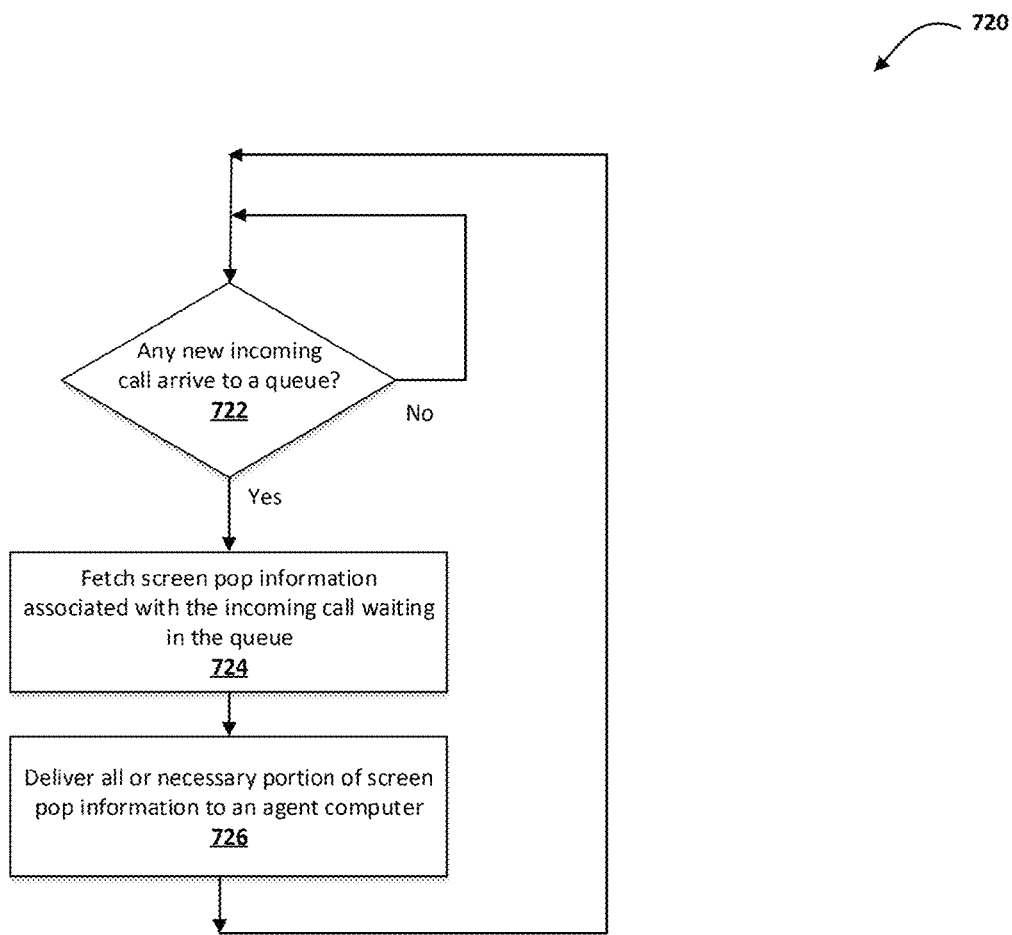
FIG. 19 is a flowchart illustrating actions performed to fetch screen pop information and deliver screen pop information to an agent computer when a new incoming call arrives to a queue, in accordance an embodiment of the system 70 (FIG. 1) that processes incoming phone calls and have queue visibility functionality.

FIG. 19 is a flowchart illustrating actions performed to fetch screen pop information and deliver necessary portion of the screen pop information to an agent computer when a new incoming call arrives to a queue, in accordance an embodiment of the system 70 (FIG. 1) that processes incoming phone calls and have queue visibility functionality. As shown by block 722, the system checks whether there is any new incoming call arrive to an incoming call queue. If there is an incoming call arrive to the incoming queue (block 722), the system proceeds to fetch screen pop information associated with the incoming call, as shown in block 724. Based on implementation preferences, the system may use calling party's caller id associated with the incoming call and look up leads or contacts or accounts stored in CRM and fetch the screen pop information. Upon screen pop information is fetched, the system delivers all or necessary portion of the screen pop information to the agent computer, as shown in block 726. In the agent computer, such delivered portion of the screen pop information may be shown as a customer record associated with the incoming call. Based on implementation preferences, prior to screen pop information is fetched, the system may deliver limited amount of information associated with the incoming call (such as, calling party's caller id).

Figure 20:
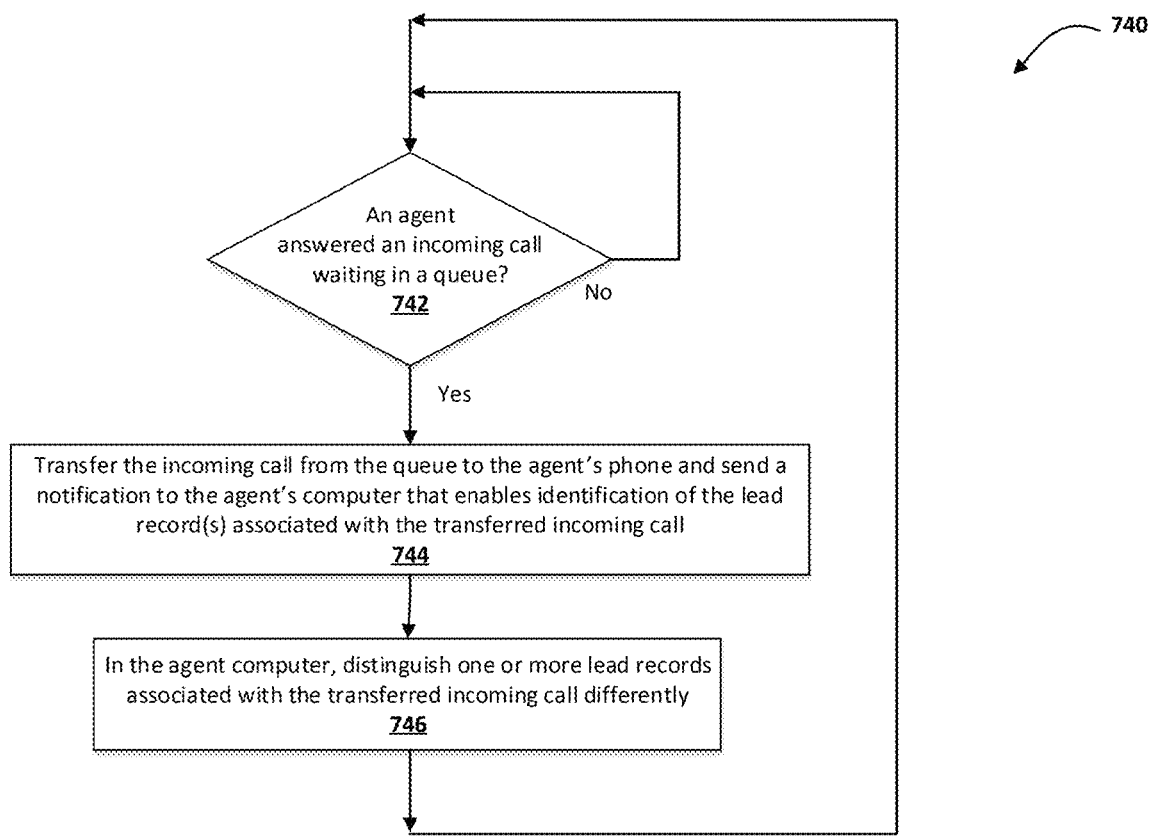
FIG. 20 is a flowchart illustrating actions performed when transferring an incoming call waiting in the queue, to an available agent that answers the incoming call, in accordance with an embodiment of system 70 (FIG. 1) that processes incoming phone calls and have queue visibility functionality.

FIG. 20 is a flowchart illustrating actions performed when transferring an incoming call waiting in a queue, to an available agent that answers the incoming call, in accordance with an embodiment of system 70 (FIG. 1) that processes incoming phone calls and have queue visibility functionality. As shown by block 742, the system checks whether an agent answered an incoming call. If the agent answered the incoming call, as shown by block 744 the system transfers the incoming call from the queue (where the incoming call is waiting) to the agent's phone, and also send notification to an agent computer associated with the agent that enables the agent computer to identify the customer record(s) associated with the transferred incoming call. Based on implementation preferences, such transfer may be performed by transferring the incoming call to a conference bridge the agent's phone may be connected to (that is, the conference bridge where the agent is waiting). Upon receiving the foregoing notification, the agent computer distinguishes one or more customer records associated with the transferred incoming call, as shown by block 746.

FIG. 21 is an exemplary screen view illustrating an interface showing customer records associated with incoming calls waiting in one or more queues, in accordance with an embodiment of system 70 (FIG. 1) that processes incoming calls and have queue visibility functionality. As shown by FIG. 21, rows 762, 764, and 766 show three customer records associated with incoming calls shown in the top section of the tabular view, which are denoted by the symbol "IC" in the first column to indicate that they are customer records associated with incoming calls. It should be noted that a customer record (associated with an incoming call) may have attributes populated from the screen pop information associated with the incoming phone call. Row 762 is shaded with a lighter shade to indicate that the customer record of row 762 is associated with an incoming phone call transferred to the agent's phone. Based on implementation preferences, such transfer may be performed by transferring the incoming call to a conference bridge the agent's phone may be connected to (that is, the conference bridge where the agent is waiting). When needed, the agent may click the end the call button in the row 762 to end the transferred incoming call. The agent may click the answer the call button in the row 764 to answer (or request to connect with) the incoming call associated with the customer record of 764. Based on implementation preferences, upon answering an incoming call, if there is any other phone call is active the system may end such active phone call and proceeds to answer the said incoming call. As shown by FIG. 21, section 768 shows new customer records for connection attempts using a communication mode (for example, via phone call or text based communication), which are denoted by the symbol "N" in the first column to indicate that they are new customer records.

In FIG. 21, section 770 shows other customer records (other than customer records associated with incoming phone call and the new customer records) associated with the communication session (for example, for outbound calling). It should be noted that based on implementation preferences, instead of showing the customer records associated with the incoming phone calls in the top section of the tabular view, the said customer records may be (i) mixed/shown with the new customer records in the middle section of the tabular view shown in FIG. 21, or (ii) mixed/shown with the other customer records shown at the bottom section of the tabular view shown in FIG. 21. Based on implementation preferences, all three types of leads records (customer records associated with incoming phone calls, customer records associated with new customers, other customer records) may be mixed/shown in one section of the tabular view shown in FIG. 21.

It should be noted that a system that embodies the functionality to handle incoming phone calls described herein, if more than one agent is associated with a queue, when an incoming phone call associated with the queue is ready to be presented to an agent for handling, one or more available agents may be selected using various strategies such as round robin, ring all, least busy agent, and the like. One of ordinary skill in the art will appreciate that other forms of selection of agents not disclosed herein that are familiar to those of ordinary skill in the art may be utilized by the foregoing system.

Based on implementation preferences, an agent (or user) in an embodiment of the System 70 (FIG. 1) may create and keep updating one or more lists of customers by associating/disassociating one or more customers with the list, and may use such list for attempting to connect with one or more customers. Such creation and updating of the list is referred to herein as the "List Management." For the purposes of understanding, a static list is a list wherein the one or more customers associated with the list may not change unless a user of the system manually adds/deletes one or more customers to/from the list, however, a dynamic list is a list wherein the one or more customer associated with the list may be identified automatically based on the criteria specified for the dynamic list and thereby the system may dynamically associate/disassociate the one or more customers associated with the dynamic list based on the criteria specified.

For the purposes of definition, a "Rule Triggering Event" means any activity/event taking place in the System 70 (FIG. 1) that may be used as a trigger to initiate execution of one or more Rules Actions (defined below). A "Rule Action" means any activity/event/action taking place in the System 70 (FIG. 1), including but is not limited to, creation, deletion, or updating of one or more fields and/or records in the System 70 (FIG. 1) and/or one or more third party systems, generating a report, sending an email, sending a text, or the like. Based on implementation preferences, one or more Rule Triggering Events and one or more Rule Actions are associated with a workflow profile/rule (referred to herein as the "workflow rule"). Further, one or more authorized users of the System 70 (FIG. 1) may be given access to create/update/delete a workflow rule.

The creation and maintenance of static list (via updating) may be laborious, time consuming, and error-prone due to the manual nature of the process involved in adding/deleting one or more customers to/from the list and/or updating attributes of membership of a customer in a list. For example, certain CRM systems may allow creation of a campaign, associating one or more customers to that campaign, and updating membership attributes associated with each customer's membership in the campaign. Further, in the case of a dynamic list, though the addition/deletion of one more customer to/from the dynamic list may be automated by the system based on criteria specified, keeping the dynamic list updated may be time consuming and error-prone because the specific criteria used by the system to associate/disassociate one or more customers with the list may depend on manual update to one or more attributes associated with the customer, wherein the update may be error-prone.

Further, during a communication session, there may be significant updates taking place in the System 70 (FIG. 1) that may need to be propagated to appropriate data structures/attributes stored within the System 70 (FIG. 1) as well as other third party systems, for the purposes of performing tasks associated with List Management. Such updates may include, but are not limited to, the outcome of a connection with a customer (such an outcome of the connection referred to herein as the "connect disposition"), updates to fields associated with one or more customer records, and the like. It should be noted that the updates taking place in the System 70 (FIG. 1) may be initiated by a user (or a module within the system). Example values of a connect disposition include, but are not limited to, "Meeting scheduled," "Ready to receive proposal," "Call back in 30 days," "Call back in the future," "Not interested," "Not a right contact," "No longer works there," "Reached voice message," "Wrong phone number," or the like.

As a way of example, in an embodiment of the System 70 (FIG. 1) utilizing a phone call based communication mode, a talker may conduct a dialing session to reach customers in a list called "Active prospects to call." Upon completing a connect/phone call with a customer in the Active prospect to Call list, the talker may enter "Call back in the future" as the connect disposition. Then, the talker may manually perform the following List Management tasks: (i) remove/disassociate the customer from the list "Active prospect to call," and (ii) associate/add the customer to a list called "Keep in touch once in 90 days" for the purposes of communication attempt to the customer once in 90 days. In the foregoing example, instead of moving the customer from one list to another manually, the talker may update a field associated with the customer called "Follow-up category" with a value "Once in 90 days" and upon such update the customer may be disassociated and moved from the list "Active prospects to call" to "Keep in touch once in 90 days" (if both of those lists are configured as dynamic list with criteria that enables such automatic disassociation of the customer from the first list and association with second list). It should be noted that in the foregoing example, the talker may perform the one or more List Management tasks in the System 70 (FIG. 1) and/or one or more external systems.

The tasks associated with the List Management are laborious, time consuming, and error-prone if performed manually or in a semi-automated process. Hence, it is desirable to have a workflow module (referred to herein as the "Workflow Module") that provides one or more of the following functionality: (i) allow one or more users of the system to define/configure one or more rule that upon one or more occurrences of one or more Rule Triggering Events, may cause the execution of one or more Rule Actions, (ii) automatically associate or disassociate one or more customers to/from one or more lists upon the criteria for such association or disassociation is met, (iii) allow one or more users of the system to define/configure data access criteria that includes, but is not limited to, settings information that specifies which user may access a field and whether the user may have read-only access or read-write access or read-write-delete access to one or more fields and/or records, and (iv) the like. It should be noted that the word "associate" as in "associate the customer to the list" may mean "add" or "attach" or "link," and the word "disassociate" as in "disassociate the customer from the list" may mean "remove" or "detach" or "separate." It should be noted again that based on the context the word "customer" may refer to the "one or more customer record" associated with the customer. Further, the word "update" as in "update a field" or "update a record" means create or update or delete a field/record.

By way of an example, in an embodiment of the System 70 (FIG. 1) utilizing phone call based communication mode, a user of the Workflow Module may specify that a dialing agent can have read-only access to the fields account name, contact first name, and contact last name associated with a customer record, however, the dialing agent may have read-write access to title and phone number fields that allows the dialing agent to update those fields if necessary, and the dialing agent may not have access to the field "purchase history" that has sensitive purchase history information that the dialing agent does not have a need to know.

It should be noted that any update taking place in accordance to the Workflow Module, may take place in System 70 (FIG. 1), or take place in one or more external systems, or any combination thereof. Further, the nature of such an update and the number of attributes/fields getting updated may not be identical across each system. One having ordinary skill in the art would appreciate that there may be more than one user of the system using the Workflow Module concurrently, and also there may be more than one activity/event in the Workflow Module happening concurrently which may result in more than one update taking place concurrently.

Further, it should be noted that if a Rule Action involves updates to a third party system, the system may have configuration settings that specify when to update, what data to update, and how to update the third party system. There may be connectivity between the System 70 (FIG. 1) and a third party system (from which customer records are uploaded, wherein updates may be sent to the third party system to update the customer records that were uploaded) that enables synchronization of appropriate data in both systems. One having ordinary skill in the art would appreciate various techniques that may be used to accomplish such synchronization including, but are not limited to, having a module in the System 70 (FIG. 1) to push or pull the data to/from the third party system, having a module in the third party system to pull or push the data from the System 70 (FIG. 1), having a separate system that synchronizes the data between the System 70 (FIG. 1) and the third party system, or the like.

It should be noted that based on implementation preferences, when the System 70 (FIG. 1) is trying to access a third party system for synchronization and if the third party system is not responding in a timely manner, the System 70 (FIG. 1) may temporarily stop communication with the third party system and resume after period of delay (which may be based on settings). During such a delay, the System 70 (FIG. 1) may store the data that needs to be pushed to the third party system, and in the future when the third party system becomes accessible, the necessary synchronization may take place. Such mechanism enables fault tolerance in the System 70 (FIG. 1) during a situation when the third party system becomes unavailable and avoids any associated data loss.

It should be noted that there may be no connectivity between the System 70 (FIG. 1) and a third party system, and in such a setup, synchronization of appropriate data in both systems may be accomplished by implementing the System 70 (FIG. 1) to export the appropriate data into one or more files (in appropriate format) and import those files into the other system and vice versa, along with optionally using workflow rules in both systems. One having ordinary skill in the art would appreciate that exporting to one or more files and importing from one or more files into the System 70 (FIG. 1) may be automated using Rule Action(s) in the Workflow Module.

In an embodiment of the System 70 (FIG. 1), based on implementation preferences, a workflow rule may be created with a Rule Triggering Event based on a pre-scheduled time (for example, Friday 5 pm, every Sunday 6 pm, or the like) specified by a user and a Rule Action that (i) generates one or more reports specified by the user, and (ii) sends the one or more reports via one or more communication modes (such as email, text, and the like) to one or more recipients specified by the user and/or publishes to user specified websites including, but not limited to, a company website, an intranet, a social media website, and the like. It should be noted that based on implementation preferences, the foregoing functionality may be implemented as a custom feature in the System 70 (FIG. 1) without using Workflow Module.

Figure 22:
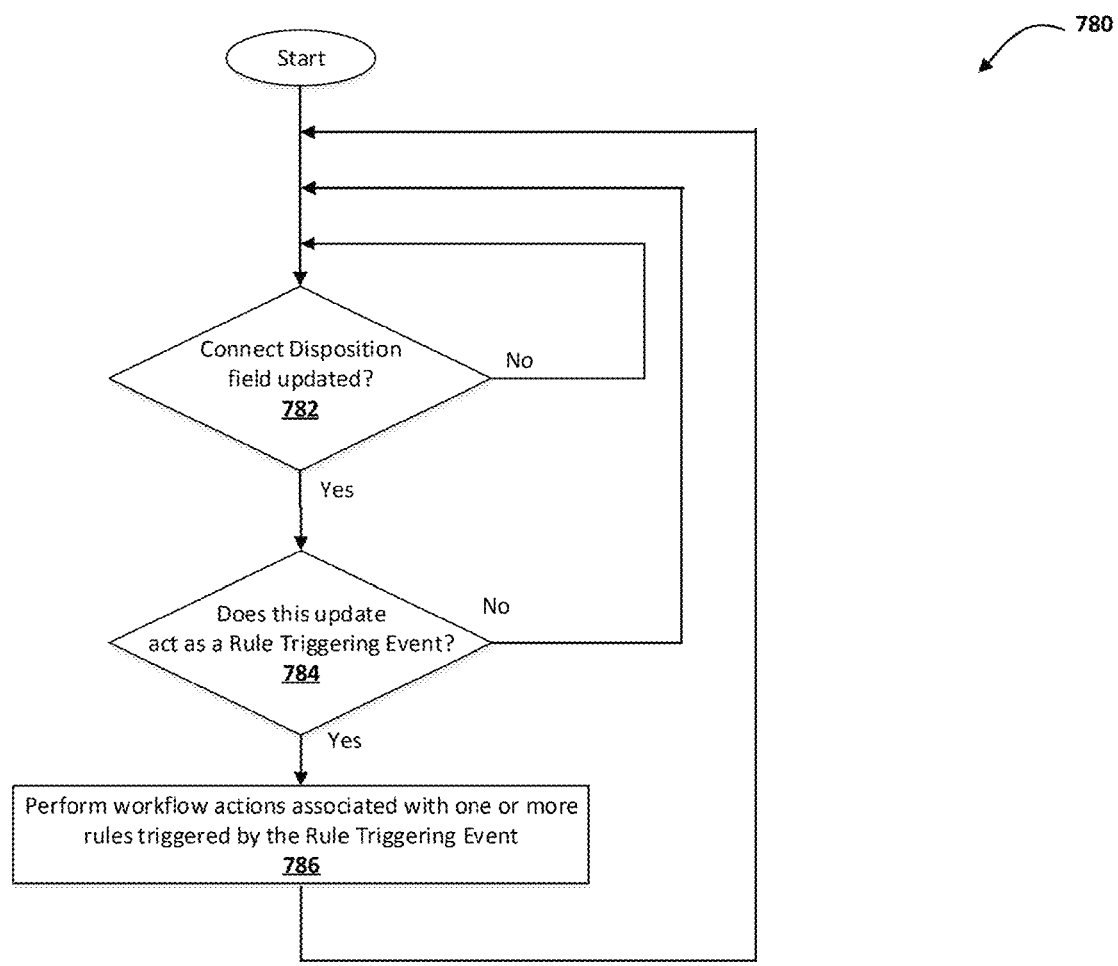
FIG. 22 is a flowchart illustrating actions performed when connect disposition field is updated, in accordance with an embodiment of Workflow Module.

FIG. 22 is a flowchart illustrating actions performed when connect disposition field is updated, in accordance with an embodiment of Workflow Module. As shown by block 782, the system checks whether a connect disposition is updated. If the connect disposition is updated (in block 782), the system proceeds to check whether the connect disposition update as a Rule Triggering Event that may act as a trigger for executing a rule, as shown in block 784. If the update to the connect disposition act as a Rule Triggering Event (in block 784), the system proceeds to perform/execute workflow actions associated with the rule that was triggered by the connect disposition update (acting as the Rule Triggering Event), as shown by block 786. Based on implementation preferences, the foregoing Rule Triggering Event may trigger one or more than one rule, wherein the actions associated with the one or more than one rule may be executed concurrently or sequentially or a combination of the two.

Figure 23:
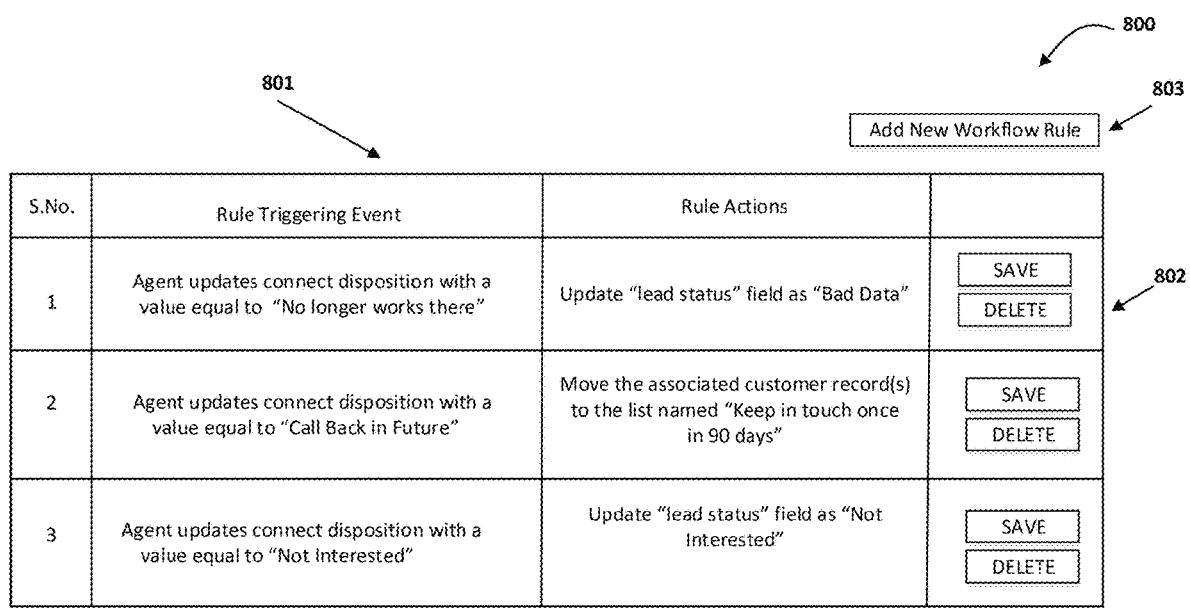
FIG. 23 is an exemplary screen view illustrating an interface showing a list of workflow rules configured, in accordance with an embodiment of Workflow Module.

FIG. 23 is an exemplary screen view illustrating an interface showing a list of workflow rules configured, in accordance with an embodiment of Workflow Module. As shown in FIG. 23, a tabular list 801 shows three workflow rules, wherein for each rule/row the Rule Triggering Event and associated actions associated with the rule are shown under the respective columns. Row 802 shows a workflow rule with "an agent updates connect disposition with a value equal to "No longer works there" as a Rule Triggering Event definition, and Update "lead status" field as "Bad Data" as the action. Add New Workflow Rule button 803 may be clicked to add a new workflow rule.

When a user/talker or a person designated by the user or a business associated with the talker (referred to herein as the "Purchaser") needs to purchase a license to use the System 70 (FIG. 1) for one or more dialing sessions, typically the Purchaser may be required to communicate with a representative of the Vendor (the term Vendor is defined in the U.S. patent application Ser. No. 14/204,505) via phone or email to purchase the license. Such a process to purchase the license may be time consuming, cumbersome, take significant time for the Purchaser to purchase, and add cost overhead to the Vendor which in turn may discourage the Vendor from selling dialing sessions of smaller quantity/volume. Further, it should be noted that after purchasing a license there may be significant delay to provide access to the system, which in turn may not enable the user to get started right away. Hence, there is a need for a module or system providing electronic commerce functionality that enables a Purchaser to purchase, a Vendor to sell license for one or more dialing sessions, and the Purchaser (or another authorized user) to start using the system without delay. Such electronic commerce functionality is referred to herein as the "Ecommerce Functionality." Ecommerce Functionality may allow a Vendor to sell dialing sessions of varying volume, and dialing sessions having various characteristics (described below); and thereby providing flexibility in business model choices for the Vendor.

It should be noted that in an embodiment of the System 70 (FIG. 1) utilizing phone call based and non-phone call based communication modes, the Purchaser may be able to purchase licenses for products utilizing phone call based and non-phone call based communication modes. For exemplary purposes, one or more embodiments of the System 70 (FIG. 1) utilizing phone call based communication modes and having Ecommerce Module, are provided below.

A dialing session may have one or more characteristics that include, but are not limited to, (a) duration of the dialing session, (b) minimum number of dialing agents that need to be actively engaged to make/navigate calls concurrently, (c) maximum number of dialing agents that may be engaged to make/navigate calls concurrently, (d) minimum number of dials that need to be made/navigated by the dialing agents within the specified session duration, (e) minimum number of live calls connected with customers that are transferred to one or more talkers, (f) characteristics of the dialing agents that are allowed to provide services for the dialing session, (g) geographical location from where the dialing agents are from and/or living, (h) type and configuration of system resources (including but not limited to type and configuration of communication links, type and configuration of computers, whether multi-tenant or dedicated, or the like) to be utilized for the dialing session, or (i) the like.

It should be noted that the dialing agent characteristics may include but are not limited to, technical skills, aptitude, linguistics, or the like. Further, it should be noted that the geographical region where the dialing agents are from and/or living may be of significance because their regional accent and communication skills may be different based on the geographical location. Based on implementation preferences, each dialing session may or may not have additional criteria such as whether a purchased dialing session may be split into more than one dialing sessions, criteria to have each dialing session of specific minimum duration, criteria to start a dialing session at the top of the hour or middle of the hour, criteria such as a dialing session may not be scheduled during specific time period and once scheduled the dialing session may be cancelled only by providing specific cancellation notice or may not be cancelled, or the like. One having ordinary skill in the art would appreciate that a dialing session may have many other characteristics not explicitly described herein and all such characteristics are included in the Ecommerce Functionality described herein. One having ordinary skill in the art would understand that Ecommerce Functionality may enable the Vendor to sell dialing sessions having various combinations of characteristics, which otherwise may not be commercially feasible without Ecommerce Module due to various factors including, but not limited to, time and cost involved in configuring dialing sessions having various such combination of characteristics and selling to Purchaser via traditional methods.

For purposes of selling and purchasing with ease, a license for each dialing session with certain characteristics may be designated as a product (referred to herein as the "Product"). For example, a license for a dialing session of 1 hour duration having dialing agents that speak and understand English who are from the United States may be packaged as Product 1, a license for a dialing session to make 200 dials having dialing agents that speak and understand French who are from France may be packaged as Product 2, a license for a dialing session to provide 8 live calls connected with the customers and transferred to one or more talkers and having dialing agents that speak and understand Spanish who are from Spain may be packaged as Product 3, and the like. A person having ordinary skill in the art would appreciate that there may be many different Products created having different characteristics and the price for each such Product may vary accordingly. In accordance with the Ecommerce Functionality, a Vendor may pre-configure several Products and make it available as pre-configured Product templates for ease of selecting and purchasing by the Purchaser. Further, a Purchaser may be allowed to customize a pre-configured Product template or configure a new Product by selecting the necessary characteristics and save each such custom configuration as a new Product template in the System 70 (FIG. 1), wherein such new Product template may be used during the future purchase(s).

An exemplary embodiment of the Ecommerce Functionality implemented as a module in System 70 (FIG. 1) is referred to herein as the "Ecommerce Module." The Ecommerce Module may require the Purchaser to provide information about the Purchaser's identity, such as first name, last name, business name, title, phone number, email address, or the like. Further, an option may be provided to the Purchaser to allow the Ecommerce Module to create a login with a user name and password which may be used for a future login in the Ecommerce Module. Further, after selecting one or more Products with associated quantities, the Ecommerce Module may provide option for the Purchaser to make payments in various modes, including but not limited to, online payment through credit card, online payment through debit card, electronic fund transfer, payment through check, payment through third party systems, electronic money or digital currency, or the like, or any combination thereof. It should be noted that a payment amount may be split and paid through one or more payments through one or more payment modes. Further, a Purchaser of the System 70 (FIG. 1) may be forced to review and electronically acknowledge license terms and conditions during the purchase of license for one or more dialing sessions in the Ecommerce Module, or as part of the process creating the login in the Ecommerce Module, or before starting a dialing session, or the like. In an embodiment of the Ecommerce Module, based on implementation preferences, the system may recommend one or more products based on the business solution the Purchaser is looking for, and facilitate the purchasing process.

Further, during the purchase process, a Purchaser may be allowed to enter one or more promotion/coupon codes and the price associated with a Product may be adjusted accordingly. The Ecommerce Module may automatically apply one or more promotion codes and adjust the price associated with one or more Products selected for purchase, based on: (a) the referring website from where the Purchaser came to a website offering Ecommerce Functionality, (b) historical data associated with the Purchaser's visits to the website, which may be tracked using cookie(s) stored in the Purchaser's computer device(s). Based on implementation preferences, the foregoing price adjustment may be applied with or without the knowledge of the Purchaser. One having ordinary skill in the art would appreciate that the foregoing functionality related to electronically tracking a profile of a Purchaser, history of the Purchaser's visits to a website offering Ecommerce Functionality, metrics associated with navigation pattern of the Purchaser within the website offering Ecommerce Functionality (including, but not limited to, time spent on each link and repeated visits to certain links), and the like, may be implemented by developing a module with such functionality or by integrating with a Prior Marketing Automation System or Enhanced Marketing Automation System (defined in the U.S. patent application Ser. No. 14/204,505) that provides tracking functionality for marketing purposes.

Upon a Purchaser purchasing a license for one or more dialing sessions, the Ecommerce Module may automatically update the appropriate information (related to the purchase) to a Scheduling App (defined in the U.S. patent application Ser. No. 14/204,505), wherein the Scheduling App may be implemented as a module as in the System 70 (FIG. 1) or as a separate system outside of the System 70 (FIG. 1). It should be noted that the Scheduling App may keep track of the number of dialing sessions (with associated characteristics) purchased, how much has been used, how much is remaining to be used in the future, and the like.

A person with ordinary skill in the art would appreciate that the System 70 (FIG. 1) may provide access to a dialing session reasonably quickly from the time the Purchaser is ready to start the dialing session soon after purchasing a license, by having the Ecommerce Module and Scheduling App implemented as envisioned by the invention described herein, wherein the Purchaser may purchase a dialing session using Ecommerce Module, schedule the dialing session, start the dialing session, and the like in a reasonably short period of time (for example, within few minutes). Based on implementation preferences, scheduling a dialing session (or other communication session via phone call or non-phone call based communication mode) may be optional, wherein a Purchaser may use the communication session based on on-demand model/walk in without pre-scheduling. It should be noted that a license purchased through the Ecommerce Module may involve, but is not limited to, a dialing session that includes human dialing agents, a dialing session wherein the function of one or more dialing agents are automated, a texting session that comprises human texting agents, a texting session wherein the function of one or more texting agents are automated, a voice message drop Service Request, sending an email Service Request, and the like. One of ordinary skill in the art would appreciate that other forms of customization of Product that are not disclosed herein that are familiar to those of ordinary skill in the art may be offered by a system embodying Ecommerce Functionality.

Figure 24:
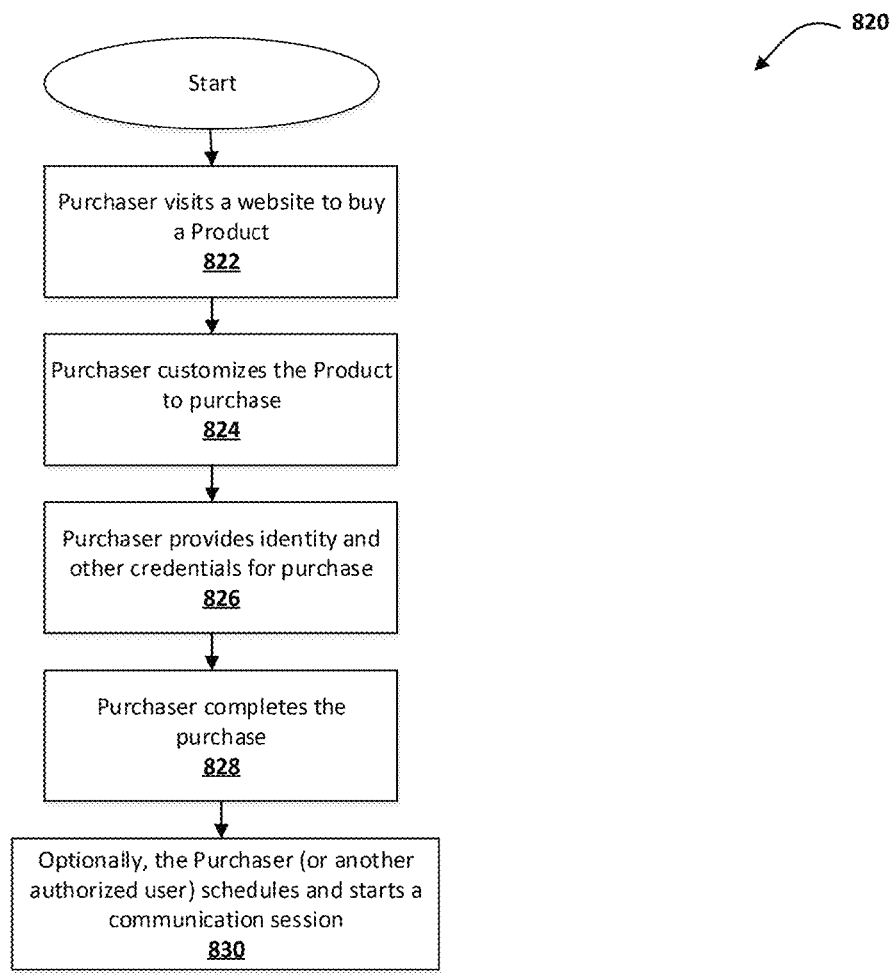
FIG. 24 is a flowchart illustrating actions performed by a Purchaser during a purchase, in accordance with an embodiment of the Ecommerce Functionality.

FIG. 24 is a flowchart illustrating actions performed by a Purchaser during a purchase, in accordance with an embodiment of the Ecommerce Functionality. As shown by block 822, a Purchaser visits a website to buy a Product. As shown by block 824, the Purchaser customizes the Product to purchase. As shown by block 826, the Purchaser provides the Purchaser's identification and other credentials relevant for the purchase. As shown by block 828, the Purchaser completes the purchase. As shown by block 830, the Purchaser (or another authorized user) may schedule and start a communication session based on the purchased Product. Based on implementation preferences, the foregoing step as shown by block 830 may be optional and it may not immediately follow the step as shown by block 828. Further, scheduling a communication session (as shown by block 830) may be optional (that is, based on implementation preferences, the Purchaser or another authorized user may start a communication session without scheduling the communication session).

Figure 25:
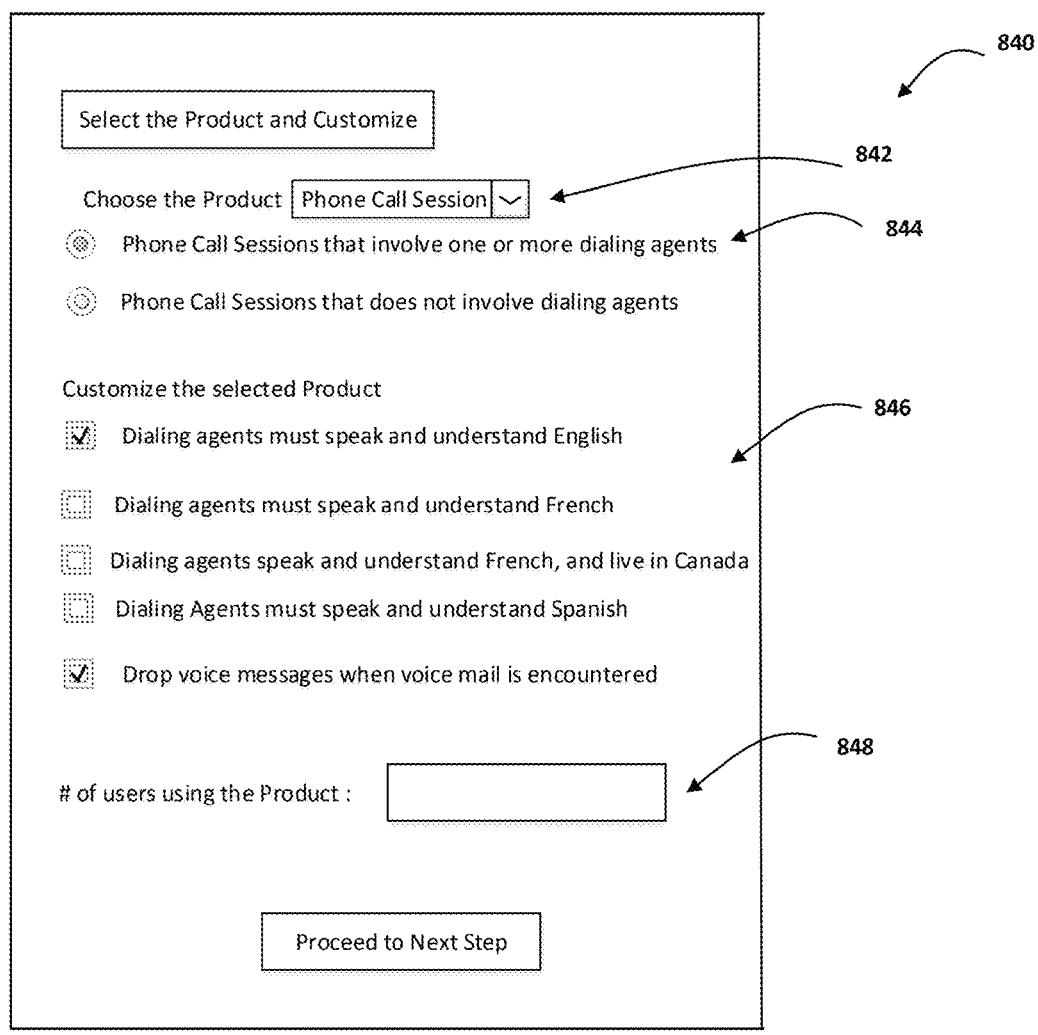
FIG. 25 is an exemplary screen view illustrating an interface showing a first step when a Purchaser purchases a Product, in accordance with an embodiment of the Ecommerce Functionality.

FIG. 25 is an exemplary screen view illustrating an interface showing a first step when a Purchaser purchases a Product, in accordance with an embodiment of the Ecommerce Functionality. As shown in FIG. 25, a Purchaser may select a Product in drop down list control 842, and upon selecting the Product, the section below the Product may show appropriate controls (which may be based on the selected Product) that allows the Purchaser to further specify/customize the attributes associated with the selected Product. Upon selecting Phone Call Session as the Product, radio button 844 may be selected/enabled by the Purchaser to specify that the selected Product Phone Call Session involves one or more dialing agents. Further, under the section "Customize the selected Product" there may be one or more checkboxes 846 that allows the Purchaser to customize the selected Product further. Text box 848 allows the Purchaser to specify the number of users that may be using the Product. The Purchaser may click "Proceed to Next Step" button at the bottom of the interface to go to the next step in the purchasing process as shown in FIG. 26.

Figure 26:
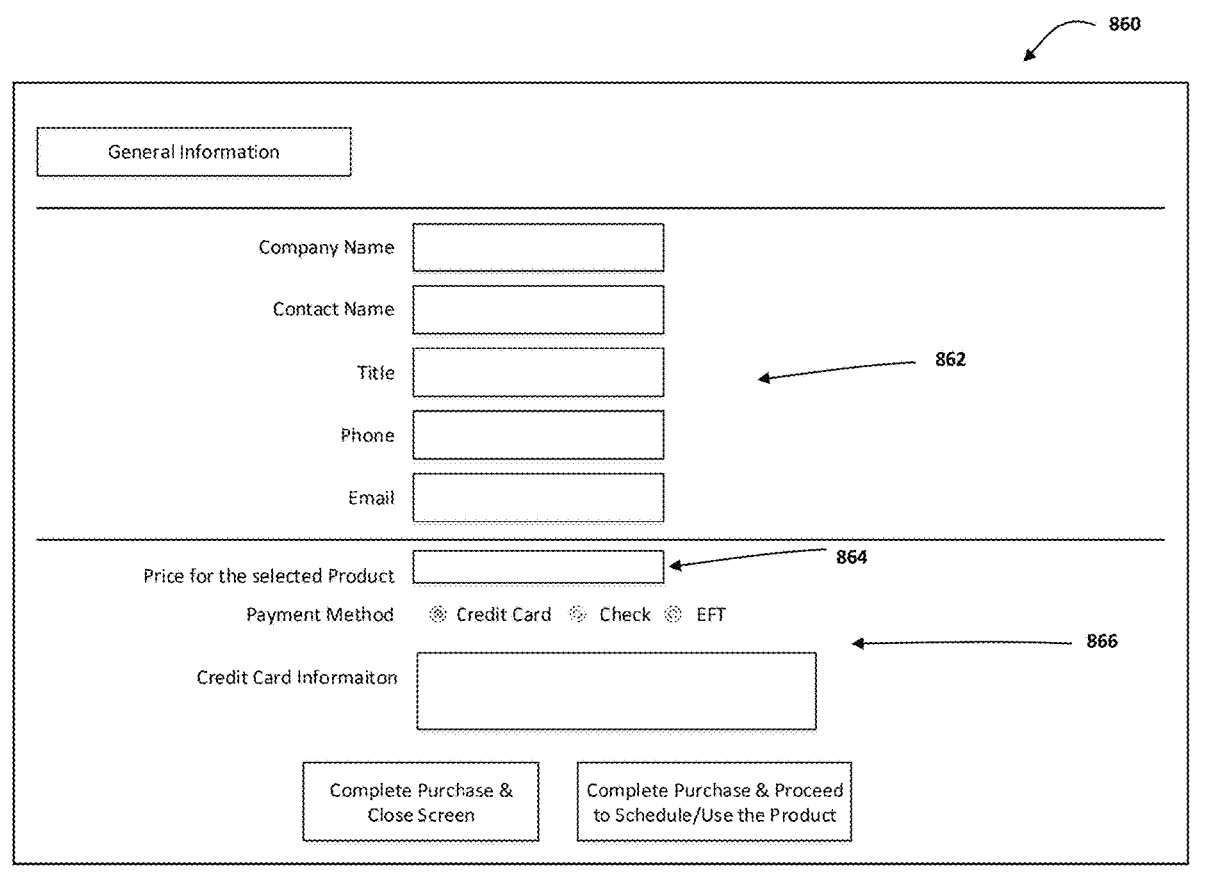

FIG. 26 is an exemplary screen view illustrating an interface showing a second step when a Purchaser purchases a Product, in accordance with an embodiment of the Ecommerce Functionality. As shown in FIG. 26, section 862 shows controls that allow the Purchaser to input the values for the fields associated with Purchaser's identification. Price field 864 shows the price for the Product that was selected/customized during the first step of the purchasing process as shown in FIG. 26, wherein the price shown in 862 may be calculated by the system automatically. Section 866 shows the controls for the Purchaser to input the payment method and credit card information. At the bottom of the interface, the Purchaser may click the "Complete Purchase & Close" button to complete the purchasing process and close the screen, or the Purchaser may click the "Complete Purchase & Proceed to schedule/Use the Product" button to complete the purchasing process and proceed to schedule and/or use the Product that was purchased (which may take the Purchaser to the next step in the purchasing process as shown in FIG. 27).

Figure 27:
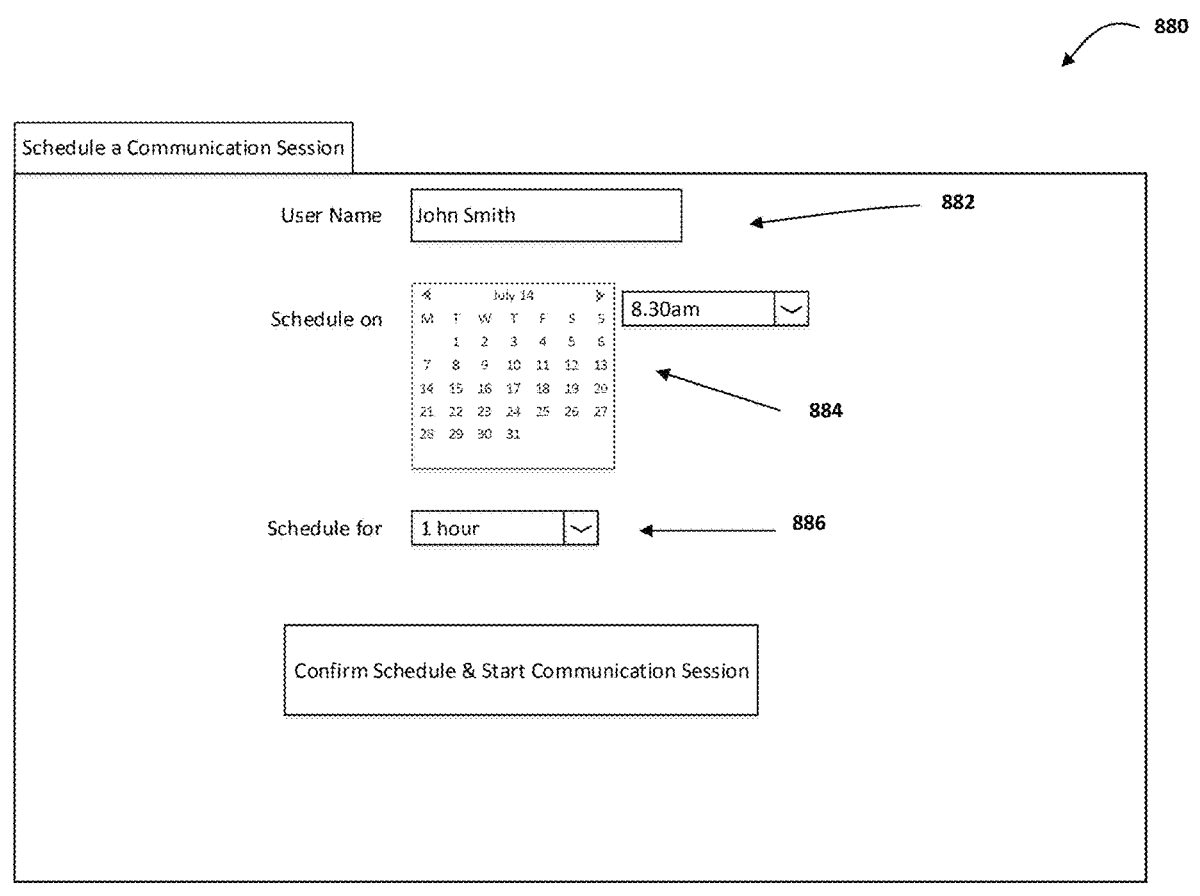

FIG. 27 is an exemplary screen view illustrating an interface showing a third step when a Purchaser purchases a Product, in accordance with an embodiment of the Ecommerce Functionality. As shown in FIG. 27, the Purchaser or a user of the system, Text field 882 allows entering the user name of the person for whom the usage of the purchased Product is scheduled. Control 884 enables selecting date and time for using the product by the user identified in 882. Drop down list 886 allows specifying the usage duration when the Product is used at the scheduled date and time specified in 884. At the bottom of the interface, upon clicking the "Confirm Schedule & Start Communication Session" button, the specified schedule is confirmed and the system may begin the Communication Session.

One having ordinary skill in the art would appreciate that the System 70 (FIG. 1) may have one or more users (such as talkers, dialing agents, texting reps, texting agents, Call Handlers, Third Party Call Participants, and/or other users) concurrently performing a role associated with each such user. The behavior of each such user in the System 70 (FIG. 1), may affect the outcome of using the System 70 (FIG. 1). That is, if the behavior of a user meets certain required standards/best practices associated with the role of the user, the outcome of using the System 70 (FIG. 1) may meet the expectation. However, if the behavior of the user does not meet the required standards/best practices associated with the role of the user, the outcome may not be favorable and fall short of the expectation. The foregoing reason may necessitate tracking of the behavior of a user and taking corrective action. If such tracking and taking corrective action is performed manually it may be time consuming and cumbersome, and hence it is desirable to have a module in the System 70 (FIG. 1) that automates the tracking of the behavior of a user and taking corrective action if necessary. Such module is referred to herein as the "Behavior Tracking and Learning Management System" or "BTLMS" or "BTLMS module."

One having ordinary skill in the art would appreciate that there may be different behavioral actions associated with each role played by a user in the System 70 (FIG. 1). For example, the behavior of a user performing the role of a talker may include, but is not limited to, selecting/uploading one or more customer lists for dialing, scheduling a dialing session, conducting the dialing session, reviewing notes history of the customers that are being dialed or scheduled to be dialed next, attending and talking to a customer in a transferred call in a timely manner, wrapping up the call and entering notes in a timely manner after the call ends with the customer, taking a break from dialing for only specified amount of time, taking training courses periodically, or the like. As a way of another example, behavior of a user performing the role of a dialing agent may include, but is not limited to, logging in and making the dialing agent available, navigating a phone call promptly by engaging phone trees or operators and getting past them, quickly recognizing when a customer answers a call and transferring the call in a timely manner to a talker, taking a break from dialing for only specified amount of time, taking training courses periodically, or the like.

An embodiment of the BTLMS module may learn the behavior of a user in the System 70 (FIG. 1) and upon the user behavior matching a pre-defined pattern (such pattern is referred to herein as the "Pre-defined Pattern") of behavior associated with not meeting performance standards for the role played by the user, the BTLMS module may recognize that the user is deviating from the required performance standards/best practices associated with the role of the user, and may recommend or force the user to take one or more training courses. It should be noted that based on implementation preferences, the Pre-defined Pattern may involve behavior for a specific role associated with meeting performance standards and in which case, the BTLMS module may expect behavior of all users (associated with the role) to match with the Pre-defined Pattern and if there is not a match it will be recognized as a deviation. One having ordinary skill in the art would appreciate that there may be a variety of ways to implement a Pre-defined Pattern and to recognize a user behavior deviating from the expected behavior, based on which the BTLMS module may recommend or force the user to take one or more training courses.

It should be noted that the Pre-defined Pattern may have one or more actions (associated with the user behavior), and the one or more actions may or may not be in a specific order. Further, to deem that a user behavior matches a Pre-defined Pattern, there may be numerous combinations that may be defined and determined. For example, to deem that a user behavior matches a Pre-defined Pattern, any one or more actions of the user behavior may need to match with any one or more actions associated with the Pre-defined Pattern, or all of the actions of the user behavior may need to match with all of the actions associated with the Pre-defined Pattern, or the like. It should be noted that an action associated with a Pre-defined Pattern for a role of a user may require the user to take a particular training course once in specific time duration. For example, an action associated with a Pre-defined Pattern for the role of a talker may require the talker to take a training course that teaches the talker about the features of the System 70 (FIG. 1) that are relevant to the role of the talker and how to use them effectively, once in 6 months.

As a first example of a Pre-defined Pattern for the role of a talker, a pattern of behavior that defines the behavior of a talker deviating from the required best practice is defined as follows: a talker responding to a transferred call with a delay of more than one-fourth of a second and such delayed response takes place for more than 5% of the transferred calls during a period of one month. Upon the behavior of a talker matching the Pre-defined Pattern provided in the foregoing first example, the talker may be recommended or forced to take a course that teaches the importance of: responding without delay when a call is transferred to the talker, ramifications of not addressing the delay, benefits of addressing the delay, and the like. As a second example of a Pre-defined Pattern for the role of a talker, a pattern that involves: a talker taking more than five minutes of time to enter notes/wrap up a call after the transferred call is ended with the customer. Upon the behavior of a talker matching the Pre-defined Pattern provided in the foregoing second example, the talker may be recommended to take a course that teaches the importance of wrapping up the transferred call and entering notes within a specified amount of time after the transferred call is ended, ramifications of not wrapping up the call in a reasonable amount of time, benefits of wrapping up the call in a reasonable amount of time, and the like. As a third example of a Pre-defined Pattern for the role of a dialing agent, a pattern that involves a dialing agent recognize a live customer answering a call and initiating the transfer of the call with a delay of more than one-fourth of a second and such delayed transfer take place for more than 2% of the transferred calls during a period of a week. Upon the behavior of a dialing agent matching the Pre-defined Pattern provided in the foregoing third example, the dialing agent may be recommended to take a course that teaches the importance of transferring a call without delay, ramifications of not addressing the delay, benefits of addressing the delay, and the like. One having ordinary skill would appreciate that there may be numerous combinations of behavioral actions to define many Pre-defined Patters and all those Pre-defined Patterns are anticipated by the present invention associated with BTLMS.

Taking a course may include, but is not limited to, a user taking/learning and completing a course electronically using a computer of the user at a pace of the user or at the pace defined in the course or associated with the course, taking an instructor-led course electronically using the computer of the user, or taking a classroom based instructor-led course by attending a classroom training, or the like. Further, taking a course may include additional criteria including, but not limited to, a requirement to answer one or more questions or take one more tests associated with the course and achieve a passing score.

Further, based on implementation preferences of BTLMS, alerts (email or text or in other forms) may be generated by the system to provide reminder to individual(s) that are recommended or forced to take one or more training courses. Also, at specific times or time intervals, the system may automatically generate/send status report(s) to specific recipients (with appropriate information that is of interest to the recipients) or allow authorized personnel to manually generate such report.

A conventional learning management system (referred to herein as the "LMS") that exists presently may provide functionality including, but not limited to, allowing one or more users to learn by accessing content disseminated via the LMS, allowing one or more users to author the content, allowing one or more users to review/approve the content, enrollment of different types of users, tracking user activity within the LMS (such as which user took what course, whether the course was yet to be completed, if the course if partially completed where did the user leave off, when was the course completed, what was the score, or the like), and other functionality customary to LMS. One having ordinary skill in the art would appreciate that the BTLMS may be able to accomplish certain features (that are readily provided in a typical LMS system) by integrating with a LMS system or implementing those features as part of the BTLMS. It should be noted that when comparing to a typical LMS, the BTLMS has distinctive differences in functionality including, but is not limited to, tracking the behavior of a user in the System 70 (FIG. 1) and taking corrective action when the behavior is matching (or not matching, based on implementation preferences) with one or more Pre-defined Pattern. Hence, the BTLMS improves adherence to best practices without increasing time and cost investment, and thereby improves the chances of favorable outcome of using the system 70 (FIG. 1).

Figure 28:
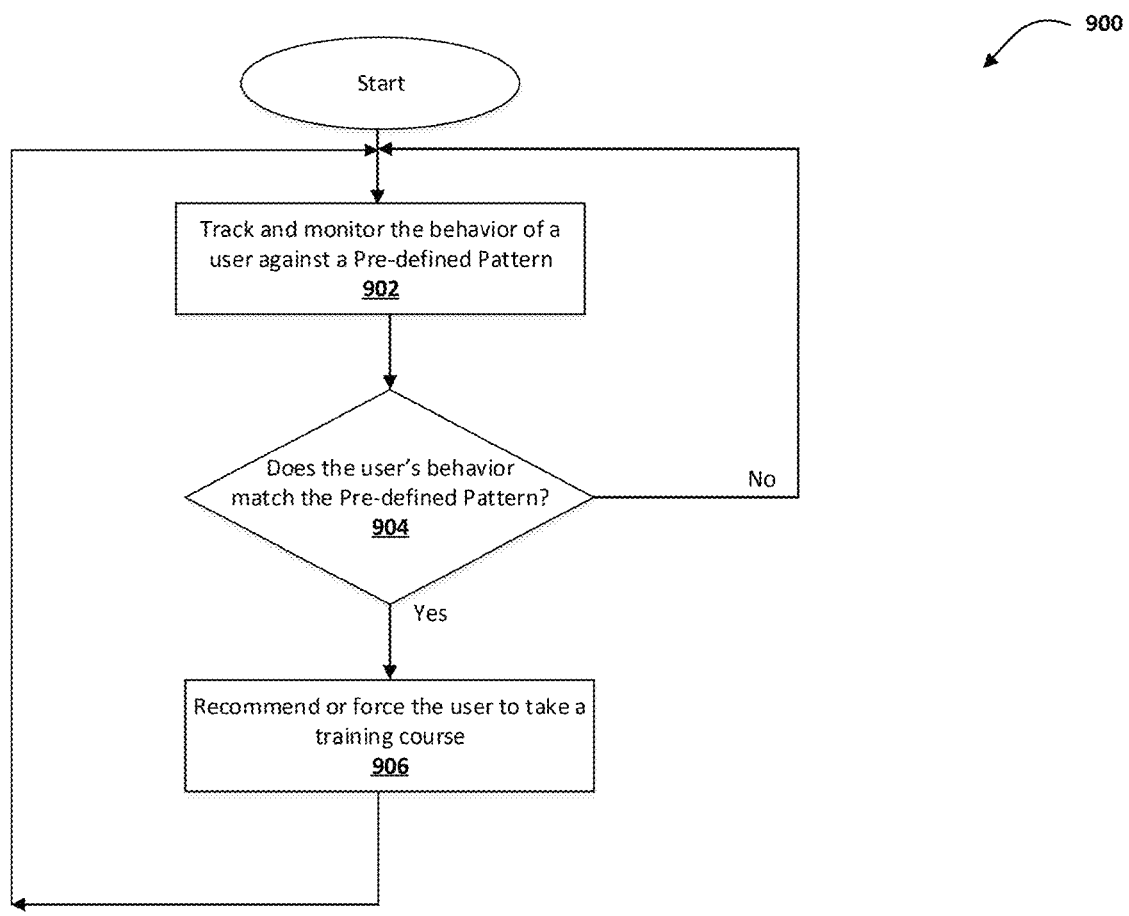
FIG. 28 is a flowchart illustrating actions performed to track and monitor a user behavior, in accordance with an embodiment of Behavior Tracking and Learning Management System (BTLMS).

FIG. 28 is a flowchart illustrating actions performed to track and monitor a user behavior, in accordance with an embodiment of BTLMS. As shown by block 902, the system may track and monitor the behavior of a user against a Pre-defined Pattern (defining one or more unacceptable behaviors). As shown by block 904, the system checks whether the user's behavior matches the Pre-defined Pattern. If the system determines that the user's behavior matches the Pre-defined Pattern (in block 904), the system may proceed to recommend or force the user to take a training course (more training courses) for correcting/mitigating the unacceptable behavior associated with the Pre-defined Pattern, as shown by block 906.

Figure 29:
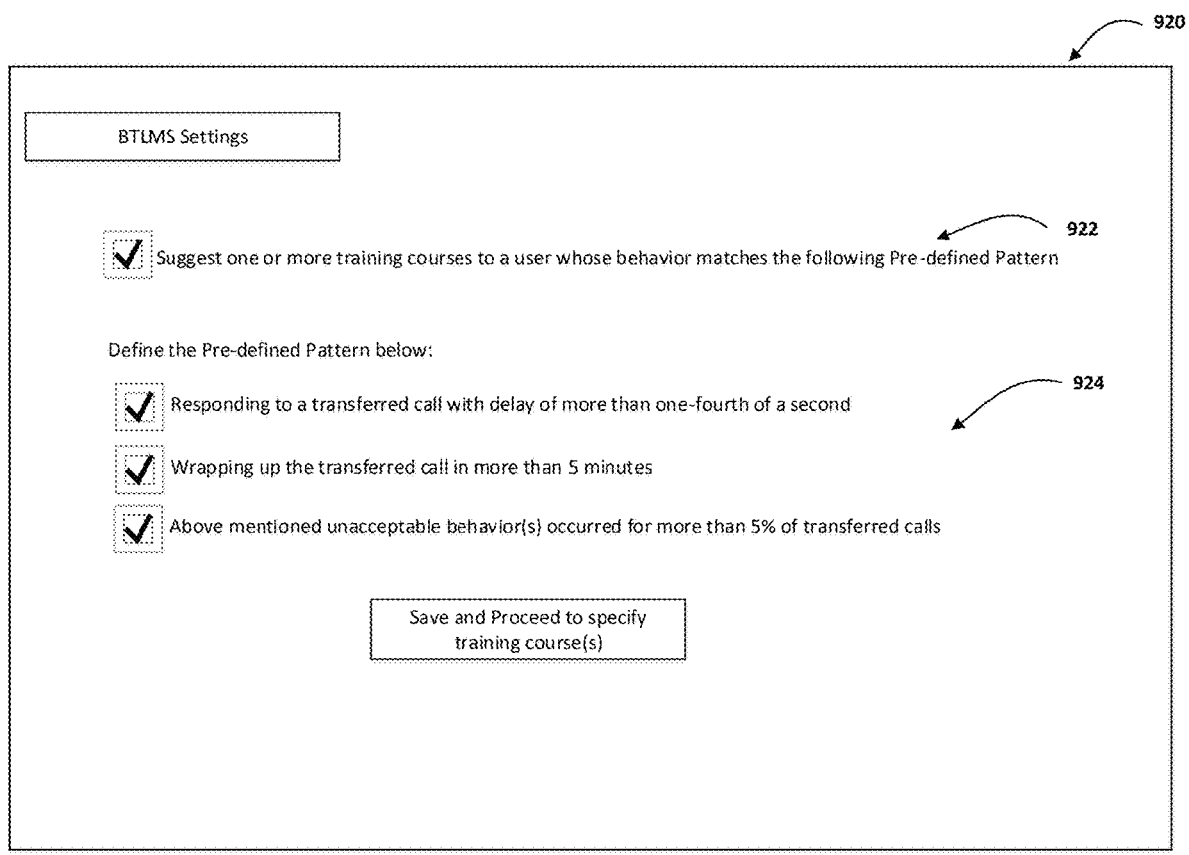
FIG. 29 is an exemplary screen view illustrating an interface showing a first step in defining a Pre-defined Pattern and associated training course(s), in accordance with an embodiment of BTLMS.

FIG. 29 is an exemplary screen view illustrating an interface showing a first step in defining a Pre-defined Pattern and associated training course(s), in accordance with an embodiment of BTLMS. As shown in FIG. 29, checkbox 922 allows an authorized user to enable the system to suggest one or more training courses to a user whose behavior matches the Pre-defined Pattern (of unacceptable behavior) defined below. Section 924 allows the authorized user to specify one or more unacceptable behaviors associated with the Pre-defined Pattern. At the bottom of the interface, when the authorized user clicks the "Save and Proceed to specify training course(s)" button the system proceeds to the next interface (as shown in FIG. 30).

Figure 30:
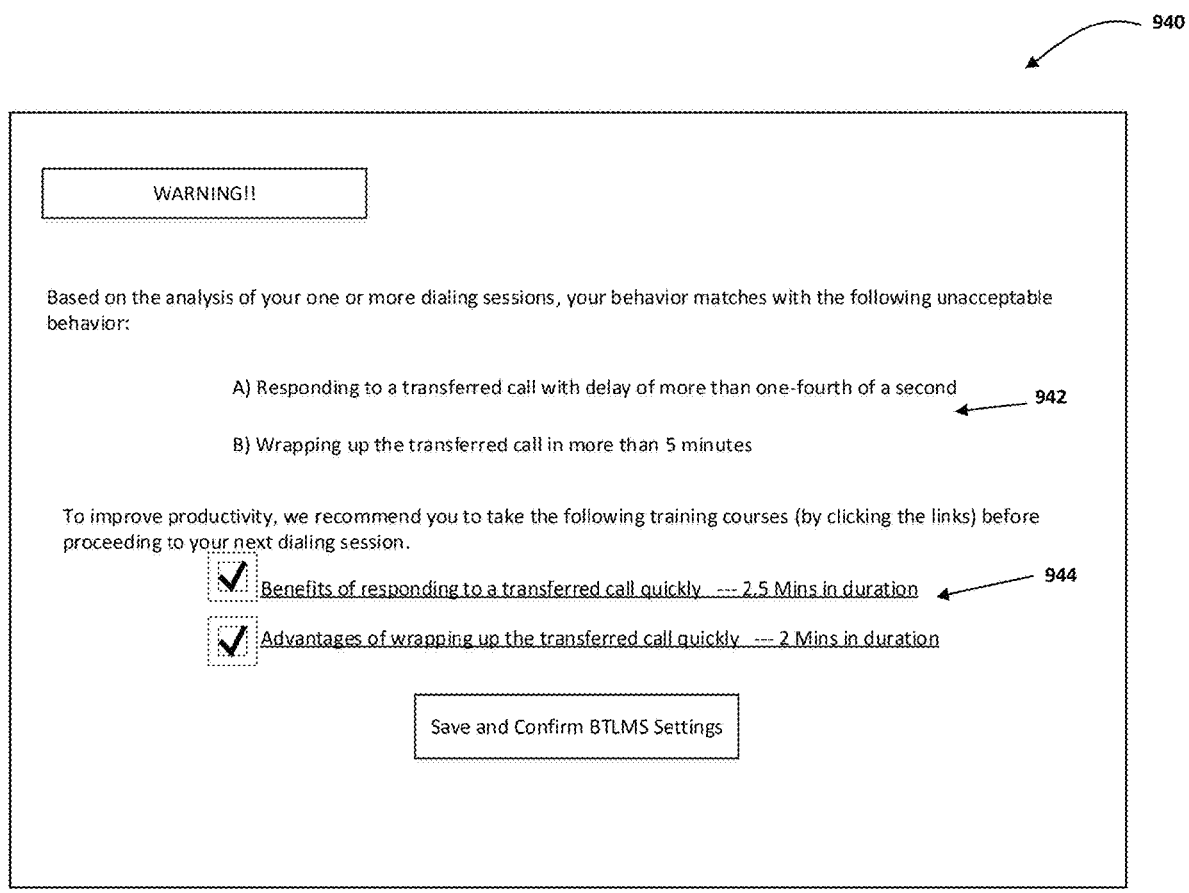
FIG. 30 is an exemplary screen view showing a second step in defining a Pre-defined Pattern and associated training course(s), in accordance with an embodiment of BTLMS.

FIG. 30 is an exemplary screen view showing a second step in defining a Pre-defined Pattern and associated training course(s), in accordance with an embodiment of BTLMS. As shown in FIG. 30, section 942 shows a message describing which unacceptable user behavior have been observed by the system, shown to a user upon the user's behavior matching with the Pre-defined Pattern of unacceptable behavior. It should be noted that the unacceptable behavior shown in 942 is based on the unacceptable behavior(s) associated with the Pre-defined Pattern specified in the first step (as shown in FIG. 29). Section 944 shows one or more training courses recommended by the system for the user to take (by clicking the links associated with the courses) before proceeding to the next communication session (dialing session, in this case). The authorized user configuring the BTLMS settings, may select or de-select one or more of the recommended training courses to be presented when a user's mates with the Pre-defined Pattern of unacceptable behavior. It should be noted, based on implementation preferences, a training course may be a training video. For example, section 944 lists 2 training videos (first one 2.5 minutes in duration and the second one 2 minutes in duration) as the training courses and the user is recommended to view those videos (which may be considered as taking training courses). At the bottom of the interface, when the authorized user clicks the "Save and Confirm BTLMS Settings" button the system saves and enables the BTLMS settings for the Pre-defined Pattern of unacceptable behavior. It should be noted that in the foregoing exemplary interface shown in FIG. 30 only one Pre-defined Pattern may be configured in the system. One having ordinary skill in the art would appreciate that based on implementation preferences, the system may allow configuration of more than one Pre-defined Pattern.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

I claim:

1. A system for establishing a communication with a customer by an agent, comprising:
an agent computer comprising a first processor and a first memory configured to store non-transitory instructions that when executed by the first processor performs the step of:
receiving a batch notification identifying a batch of one or more customer records in the agent computer, for communication in the near future, wherein the one or more customer records is associated with one or more customers; and a second computer comprising a second processor and a second memory configured to store non-transitory instructions that when executed by the second processor performs the step of:

providing the batch notification identifying the batch of one or more customer records in the agent computer, wherein the system connects the agent with the customer associated with a customer record selected by the agent, and the selected customer record is part of the batch.

2. The system of claim 1, wherein the batch of one or more customer records is associated with customers in one or more of the group consisting of customers who are on inbound phone calls, customers who are new customers, and customers selected based on selection criteria specified by a user of the system.

3. The system of claim 1, wherein the system is further configured to connect the agent with a customer who is on an inbound phone call.

4. The system of claim 1, wherein the agent computer is further configured to identify a customer record associated with a selected customer that is being attempted for communication or selected for communication attempt next, wherein the batch comprises at least one customer record associated with the selected customer.

5. The system of claim 1, further comprising a third computer comprising a third processor and a third memory configured to store non-transitory instructions that when executed by the third processor performs the step of:

providing a transferred notification acknowledging that a transferred customer that has been attempted for communication has been transferred, wherein the batch comprises at least one customer record of the transferred customer.

6. The system of claim 1, further comprising a communication assistance module configured to:

provide a transferred notification confirming that a transferred customer that has been attempted for communication has been transferred, wherein the batch comprises at least one customer record of the transferred customer; and partially or fully automate a communication attempt with the transferred customer and the interaction with the transferred customer up until prior to the transfer.

7. The system of claim 1, wherein the communication includes one or more of the group consisting of a phone call, a voice message, a communication using automated phone technology, interactive voice response (IVR) system, an email, a text message, a chat, an instant message, a video, a short message service (SMS) message, and a multimedia messaging service (MMS) message.

8. The system of claim 1, wherein the system is further configured to predict a schedule timeslot of the agent by taking into account one or more of the group consisting of a number of agent based touches that may need to be executed at various timeslots, agent availability data associated with the agent, agent availability data associated with other agents, touch specific outcome correlation data, and marketing outcome correlation data.

9. The system of claim 1, wherein the system is further configured to determine an order of customer records for communication attempts by taking into account one or more of the group consisting of touch specific outcome correlation data, marketing outcome correlation data, and time when the communication attempt is taking place.

10. The system of claim 1, wherein the system is used by the agent and a third party call participant, wherein the second computer is further configured by the memory to perform the steps of:

receiving a request participation notification from the third party call participant that the third party call participant has requested to participate in the call between the agent and the customer; and providing a participate notification that enables the third party call participant to participate in the call between the agent and the customer, wherein the third party call participant is connected to the call between the agent and the customer in one or more modes, wherein at least one of the modes is selected from the group consisting of a listen only mode, a listen and talk mode, and a whisper mode, wherein the listen only mode enables the third party call participant to only listen to both the agent and the customer, wherein in the listen only mode the third party call participant may participate in the call with or without knowledge of the agent or the customer, wherein the listen and talk mode enables the third party call participant to listen as well as talk to both the agent and the customer, wherein in the listen and talk mode the third party call participant, agent, and the customer all or some may have knowledge of presence of others in the call, and wherein the whisper mode enables the third party call participant to listen to both the agent and the customer, but talk to only the agent, wherein in the whisper mode the third party call participant may participate in the call without knowledge of the customer.

11. A method for a computer controlled communication system comprising a processor and a memory for establishing a communication with a customer by an agent, comprising the steps of:

receiving a batch notification identifying a batch of one or more customer records, for communication in the near future, wherein the one or more customer records is associated with one or more customers; and connecting the agent with the customer associated with a customer record selected by the agent, wherein the selected customer record is part of the batch.

12. The method of claim 11, wherein the batch of one or more customer records is associated with customers in one or more of the group consisting of customers who are on inbound phone calls, customers who are new customers, and customers selected based on selection criteria specified by the user of the system.

13. The method of claim 11, further comprising the step of connecting the agent with a customer who is on an inbound phone call.

14. The method of claim 11, further comprising the step of identifying a customer record associated with a selected customer that is being attempted for communication or selected for communication attempt next, wherein the batch comprises at least one customer record associated with the selected customer.

15. The method of claim 11, further comprising the step of: providing a transferred notification acknowledging that a transferred customer that has been attempted for communication has been transferred, wherein the batch comprises at least one customer record of the transferred customer.

16. The method of claim 11, further comprising the steps of:
provide a transferred notification confirming that a transferred customer that has been attempted for communication has been transferred, wherein the batch comprises at least one customer record of the transferred customer; and
partially or fully automate a communication attempt with the transferred customer and the interaction with the transferred customer up until prior to the transfer.

17. The method of claim 11, wherein the communication includes one or more of the group consisting of a phone call, a voice message, a communication using automated phone technology, interactive voice response (IVR) system, an email, a text message, a chat, an instant message, a video, a short message service (SMS) message, and a multimedia messaging service (MMS) message.

18. The method of claim 11, further comprising the step of predicting a schedule timeslot of the agent by taking into account one or more of the group consisting of a number of agent based touches that may need to be executed at various timeslots, agent availability data associated with the agent, agent availability data associated with other agents, touch specific outcome correlation data, and marketing outcome correlation data.

19. The method of claim 11, further comprises the step of determining an order of customer records for communication attempts by taking into account one or more of the group consisting of touch specific outcome correlation data, marketing outcome correlation data, and a time when the communication attempt is taking place.

20. The method of claim 11, wherein the method is used by the agent and a third party call participant, the method further comprising the steps of:
providing a request participation notification that the third party call participant has requested to participate in the call between the customer and agent;
receiving the request participation notification that the third party call participant has requested to participate in the call between the agent and the customer; and
providing a participate notification that enables the third party call participant to participate in the call between the agent and the customer,
wherein the third party call participant is connected to the call between the agent and the customer in one or more modes, wherein at least one of the modes is selected from the group consisting of a listen only mode, a listen and talk mode, and a whisper mode, wherein the listen only mode enables the third party call participant to only listen to both the agent and the customer, wherein in the listen only mode the third party call participant may participate in the call with or without knowledge of the agent or the customer, wherein the listen and talk mode enables the third party call participant to listen as well as talk to both the agent and the customer, wherein in the listen and talk mode the third party call participant, agent, and the customer all or some may have knowledge of presence of others in the call, and wherein the whisper mode enables the third party call participant to listen to both the agent and the customer, but talk to only the agent, wherein in the whisper mode the third party call participant may participate in the call without knowledge of the customer.

* * * * *